(12) United States Patent
Staples

(10) Patent No.: US 12,208,850 B2
(45) Date of Patent: Jan. 28, 2025

(54) BICYCLE DROPPER SEAT POST ASSEMBLY WITH A BOTTOM MOUNTED GAS SPRING CARTRIDGE

(71) Applicant: D3 Innovation Inc., Squamish (CA)

(72) Inventor: Jonathan Staples, Garibaldi Highlands (CA)

(73) Assignee: D3 Innovation Inc., Squamish (CA)

( * ) Notice: Subject to any disclaimer, the term of this patent is extended or adjusted under 35 U.S.C. 154(b) by 0 days.

(21) Appl. No.: 18/348,441

(22) Filed: Jul. 7, 2023

(65) Prior Publication Data

US 2024/0116587 A1  Apr. 11, 2024

Related U.S. Application Data

(63) Continuation of application No. 17/959,090, filed on Oct. 3, 2022, now Pat. No. 11,834,121.

(60) Provisional application No. 63/329,444, filed on Apr. 10, 2022.

(51) Int. Cl.
*B62J 1/08* (2006.01)
*B62K 19/36* (2006.01)

(52) U.S. Cl.
CPC .............. *B62J 1/08* (2013.01); *B62K 19/36* (2013.01); *B62J 2001/085* (2013.01)

(58) Field of Classification Search
CPC .................................................. B62J 2001/085
See application file for complete search history.

(56) References Cited

U.S. PATENT DOCUMENTS

| | | | |
|---|---|---|---|
| 3,208,767 | A | 9/1965 | Alexander |
| 3,730,019 | A | 5/1973 | Ballard |
| 4,354,398 | A | 10/1982 | Porter |
| 4,421,357 | A | 12/1983 | Shimano |
| 4,807,856 | A | 2/1989 | Teckenbrock |
| 4,916,968 | A | 4/1990 | Kabaya |
| 4,995,753 | A | 2/1991 | Shook |
| 5,044,648 | A | 9/1991 | Knapp |

(Continued)

FOREIGN PATENT DOCUMENTS

| | | |
|---|---|---|
| CN | 105539641 A | 5/2016 |
| CN | 206031585 U | 3/2017 |

(Continued)

OTHER PUBLICATIONS

Office Action (Notice of Allowance and Fees Due (PTOL-85)) dated Feb. 23, 2024 for U.S. Appl. No. 17/959,258 (pp. 1-15).

(Continued)

*Primary Examiner* — Timothy J Brindley
(74) *Attorney, Agent, or Firm* — Marks & Clerk; Kevin W. Shipley

(57) ABSTRACT

A dropper post assembly can include an outer tube and an inner tube with a lower end that is within the outer tube and include a tube engagement. A spring cartridge assembly can include: a cartridge tube providing a cylinder; a piston movably received within the cylinder to provide a first chamber a lower side of the piston and a second chamber between the piston; a cartridge rod; and a second engagement member configured to releasably engage the tube engagement member thereby fastening the cartridge tube to the lower end of the inner tube so that the cartridge tube is axially fixed to the inner tube and movable with the inner tube relative to the outer tube.

38 Claims, 25 Drawing Sheets

(56) References Cited

U.S. PATENT DOCUMENTS

| | | |
|---|---|---|
| 5,226,624 A | 7/1993 | Kingsbery |
| 5,244,301 A | 9/1993 | Kurke |
| 5,466,042 A | 11/1995 | Herman |
| 5,649,738 A | 7/1997 | Thomson |
| 5,664,829 A | 9/1997 | Thomson |
| 5,722,718 A | 3/1998 | Still |
| 5,829,733 A | 11/1998 | Becker |
| 5,857,657 A | 1/1999 | Yamamoto |
| 5,881,988 A | 3/1999 | Liu |
| 5,899,530 A | 5/1999 | Tedesco |
| 5,909,890 A | 6/1999 | Sachs |
| 5,979,978 A | 11/1999 | Olsen |
| 6,220,582 B1 | 4/2001 | Wandschneider |
| 6,276,756 B1 | 8/2001 | Cho |
| 6,688,331 B2 | 2/2004 | Demersseman |
| 7,007,587 B2 | 3/2006 | Zanden |
| 7,025,522 B2 | 4/2006 | Sicz |
| 7,059,592 B2 | 6/2006 | Huh |
| 7,083,180 B2 | 8/2006 | Turner |
| 7,231,866 B2 | 6/2007 | Seong |
| 7,306,206 B2 | 12/2007 | Turner |
| 7,721,640 B2 | 5/2010 | Lee |
| 7,845,602 B1 | 12/2010 | Young |
| 8,079,772 B1 | 12/2011 | Brennan |
| 8,167,373 B2 | 5/2012 | Allison |
| 8,177,251 B2 | 5/2012 | Shirai |
| 8,191,964 B2 | 6/2012 | Hsu |
| 8,308,124 B2 | 11/2012 | Hsu |
| 8,328,454 B2 | 12/2012 | Mcandrews |
| 8,550,551 B2 | 10/2013 | Shirai |
| 8,752,893 B2 | 6/2014 | Chien |
| 8,814,109 B2 | 8/2014 | Laird |
| 8,926,216 B2 | 1/2015 | McAndrews |
| 9,073,592 B2 | 7/2015 | Hsu |
| 9,376,159 B2 | 6/2016 | Kuo |
| 9,688,331 B1 | 6/2017 | Shirai |
| 9,878,753 B2 | 1/2018 | Tsai |
| 9,969,448 B1 | 5/2018 | Chen |
| 10,189,522 B2 | 1/2019 | Pittens |
| 10,450,022 B2 | 10/2019 | Watson |
| 10,513,300 B2 | 12/2019 | Bowers |
| 10,549,803 B2 | 2/2020 | Shipman |
| 10,787,215 B1 | 9/2020 | Staples |
| 10,974,781 B2 | 4/2021 | Staples |
| 11,104,395 B2 | 8/2021 | Staples |
| 11,180,212 B2 | 11/2021 | Shirai |
| 11,364,963 B2 | 6/2022 | Staples |
| 11,447,201 B2 | 9/2022 | Coaplen |
| 11,479,314 B2 | 10/2022 | Staples |
| 11,767,073 B2 | 9/2023 | Staples |
| 11,780,520 B1 | 10/2023 | Staples |
| 11,834,121 B2 | 12/2023 | Staples |
| 11,964,722 B2 | 4/2024 | Staples |
| 2002/0185581 A1 | 12/2002 | Trask |
| 2003/0234144 A1 | 12/2003 | Fox |
| 2004/0065238 A1 | 4/2004 | Chen |
| 2004/0070168 A1 | 4/2004 | Mckinnon |
| 2005/0067863 A1 | 3/2005 | Roizen |
| 2006/0066074 A1 | 3/2006 | Turner |
| 2006/0152045 A1 | 7/2006 | Okajima |
| 2006/0280552 A1 | 12/2006 | Turner |
| 2007/0046081 A1 | 3/2007 | Shook |
| 2007/0063554 A1 | 3/2007 | Liao |
| 2007/0286671 A1 | 12/2007 | Meggiolan |
| 2009/0066124 A1 | 3/2009 | Pirovano |
| 2009/0108642 A1 | 4/2009 | Hsu |
| 2009/0266656 A1 | 10/2009 | Murakami |
| 2009/0266657 A1 | 10/2009 | Murakami |
| 2010/0052377 A1 | 3/2010 | Hsu |
| 2010/0148412 A1 | 6/2010 | Murakami |
| 2011/0097139 A1 | 4/2011 | Hsu |
| 2011/0291446 A1 | 12/2011 | Bourgeois |
| 2012/0027510 A1 | 2/2012 | Chen |
| 2012/0098175 A1 | 4/2012 | Wu |
| 2012/0181824 A1 | 7/2012 | Hsu |
| 2012/0217686 A1 | 8/2012 | Pelot |
| 2013/0269655 A1 | 10/2013 | Yamazaki |
| 2014/0239682 A1 | 8/2014 | Tisue |
| 2014/0305253 A1 | 10/2014 | Tseng |
| 2015/0091271 A1 | 4/2015 | Ikeda |
| 2015/0145294 A1 | 5/2015 | Kench, III |
| 2015/0191208 A1 | 7/2015 | Hsu |
| 2015/0232142 A1 | 8/2015 | Shirai |
| 2015/0232158 A1 | 8/2015 | Bouse |
| 2017/0096184 A1 | 4/2017 | Hara |
| 2017/0096185 A1 | 4/2017 | Hara |
| 2017/0166275 A1 | 6/2017 | McPherson |
| 2017/0225731 A1 | 8/2017 | Hsu |
| 2017/0341692 A1 | 11/2017 | Shirai |
| 2018/0015976 A1 | 1/2018 | Hermansen |
| 2018/0057087 A1 | 3/2018 | Jhou |
| 2018/0127041 A1 | 5/2018 | Tsai |
| 2019/0039680 A1 | 2/2019 | Angell |
| 2019/0263464 A1 | 8/2019 | Staples |
| 2019/0283827 A1 | 9/2019 | Shipman |
| 2019/0300088 A1 | 10/2019 | Jordan |
| 2019/0301497 A1 | 10/2019 | Jordan |
| 2019/0308681 A1 | 10/2019 | Staples |
| 2020/0023918 A1 | 1/2020 | Shirai |
| 2020/0070913 A1 | 3/2020 | Staples |
| 2020/0140029 A1 | 5/2020 | Shipman |
| 2020/0247492 A1 | 8/2020 | Coaplen |
| 2020/0317282 A1 | 10/2020 | Staples |
| 2020/0317283 A1 | 10/2020 | Staples |
| 2021/0179217 A1 | 6/2021 | Staples |
| 2021/0214031 A1 | 7/2021 | Liao |
| 2022/0106005 A1 | 4/2022 | Shirai |
| 2022/0111919 A1 | 4/2022 | Staples |
| 2022/0153371 A1 | 5/2022 | Tung |
| 2022/0281546 A1 | 9/2022 | Staples |
| 2023/0019338 A1 | 1/2023 | Staples |
| 2023/0211844 A1 | 7/2023 | Lin |
| 2023/0322318 A1* | 10/2023 | Staples ................. B62K 19/36 297/209 |
| 2023/0322319 A1 | 10/2023 | Staples |
| 2023/0322320 A1 | 10/2023 | Staples |
| 2023/0348004 A1 | 11/2023 | Staples |
| 2024/0109617 A1 | 4/2024 | Staples |

FOREIGN PATENT DOCUMENTS

| | | |
|---|---|---|
| EP | 2657113 | 10/2013 |
| EP | 3196107 A1 | 7/2017 |
| EP | 3348465 | 7/2018 |
| FR | 2409182 A1 | 6/1979 |
| GB | 2506465 | 4/2014 |
| TW | 201219256 A | 5/2012 |
| TW | M451292 U | 4/2013 |
| TW | M510270 | 10/2015 |
| TW | M510270 U | 10/2015 |
| TW | 201545930 | 12/2015 |
| TW | 201545930 A | 12/2015 |
| TW | M513153 | 12/2015 |
| TW | M517710 U | 2/2016 |
| TW | I562922 | 12/2016 |
| TW | I562922 B | 12/2016 |
| TW | 201730032 | 9/2017 |
| TW | 201801969 A | 1/2018 |
| TW | M562805 | 7/2018 |
| TW | M575784 U | 3/2019 |
| WO | 2016029301 | 3/2016 |

OTHER PUBLICATIONS

Mad Suspension Manic Drop Post, information found onine at https://www.xfusionshox.com/products_detail/44.htm 2020.

Fox Transfer Hydraulic Infinite Adjust Seat Post, information found online at https://www.ridefox.com/family.php?m=bike&family=seatpost 2020.

KS Suspension LEV Intergra dropper post, information found online at https://www.kssuspension.com/product/lev-integra/ 2020.

9point8 The Fall Line dropper post, information found online at

(56) References Cited

OTHER PUBLICATIONS https://www.9point8.ca/index.php?route=product/product&path=42&product_id=213 2020.

Third party prior art submission made to German patent office dated Feb. 9, 2022 regarding related German application No. 10 2020 109 014.5, including references i) TW 1562922, ii).

Notice of third party opinion art submission made to TW IPO dated Sep. 1, 2021 in related ROC (Taiwan) Pat. Appln. No. 109111138.

Translation of Office action issued Mar. 3, 2022 in related ROC (Taiwan) Pat. Appln, No. 109111138.

Translation of Office action issued Nov. 17, 2021 in related ROC (Taiwan) Pat, Appln, No. 109111138.

A webpage entitled "Model: 2017 LEV/LEV 272" showing product specifications and figures of a bicycle seat tube provided by Kind Shock Hi-Tech Co., Ltd. and downloadable from the Wayback Machine at https://web.archive.org/web/20170610095807/kssuspension.com/wp-content/uploads/2016/12/2017-Lev-drawing.pdf, available at least as early as Jun. 10, 2017.

A webpage entitled "Model: LEV 272" showing an exploded view of a bicycle seat tube provided by Kind Shock Hi-Tech Co., Ltd. and downloadable from the Wayback Machine at https://web.archive.org/web/20170629100108/http://kssuspension.com/wp-content/uploads/2015/12/LEV-272.PDF, available at least as early as Jun. 10, 2017.

Contact SL Switch Seatpost. Online at <https://www.giant-bicycles.com/ca/contact-sl-switch-seatpost> 2019.

Crankbrothers Kronolog Adjustable Seat Post. Online at <https://www.pinkbike.com/news/Crankbrother-Kronolog-Adjustable-Seat-Post.html> 2019.

RASE Components, LLC Launches The Mamba Rapid Adjust Seatpost. Online at https://www.pinkbike.com/news/rase-mamba-rapid-adjust-post-2008.html 2019.

2018 LEV dropper post drawings from Kind Shock Hi-Tech Co., dated Jan. 4, 2018.

Third Party Submission of Prior Art on Jan. 28, 2022 in related Canadian application No. 3,077,761.

Office Action (Non-Final Rejection) dated Jan. 25, 2024 for U.S. Appl. No. 18/347,864 (pp. 1-5).

Notice of Allowance dated Mar. 4, 2024 for U.S. Appl. No. 17/959,258 (pp. 1-22).

Office Action (Notice of Allowance and Fees Due (PTOL-85)) dated Mar. 14, 2024 for U.S. Appl. No. 17/949,587 (pp. 1-4).

Office Action (Notice of Allowance and Fees Due (PTOL-85)) dated Mar. 27, 2024 for U.S. Appl. No. 18/347,864 (pp. 1-8).

Office action issued on TW112111622 on Apr. 8, 2024.

Office action issued on TW112129711 on May 14, 2024.

Office Action (Notice of Allowance and Fees Due (PTOL-85)) dated May 24, 2024 for U.S. Appl. No. 18/347,864 (pp. 1-2).

Office Action (Notice of Allowance and Fees Due (PTOL-85)) dated May 23, 2024 for U.S. Appl. No. 18/344,452 (pp. 1-7).

Office Action (Notice of Allowance and Fees Due (PTOL-85)) dated May 30, 2024 for U.S. Appl. No. 17/959,258 (pp. 1-4).

Office Action (Notice of Allowance and Fees Due (PTOL-85)) dated Jun. 14, 2024 for U.S. Appl. No. 17/750,506 (pp. 1-2).

Cunningham, Richard "OneUp Components' Travel-Adjustable Dropper Post—First Ride"; online article available Apr. 18, 2018 at https://www.pinkbike.com/news/oneup-components-travel-adjustable-dropper-post-first-look.html.

"OneUp Announces Droppers in Every Length from 100mm to 210mm" online article available Apr. 11, 2019 at https://www.pinkbike.com/news/oneup-announces-droppers-in-every-length-from-100mm-to-210mm.html.

"OneUp Announces New V3 Dropper Post" online article available at Jan. 16, 2024 https://www.pinkbike.com/news/oneup-announces-new-v3-dropper-post-2024.html.

Bike Yoke Revive 1.0—Aug. 17, 2016; online article available at https://enduro-mtb.com/en/bikeyoke-revive-dropper-post-bleed-button/.

Bike Yoke Devine SL (2018)—available to the public as of Oct. 23, 2018 online at https://bikeyoke.com/en/divine-sl/divsl-80-309-0-0.

Kind Shock Hi-Tech Co., Ltd., Model:LEV (2012-2018).

Kind Shock Hi-Tech Co., Ltd., Model:LEV Integra (2016-2018).

Kind Shock Hi-Tech Co., Ltd., Model: LEV Integra (A12) (2019-2020).

Kind Shock Hi-Tech Co., Ltd., Model:LEV-C221 (2019-2020).

RockShox Reverb Review, article available online as of Nov. 30, 2011, at https://www.pinkbike.com/news/rockshox-reverb-review-2011.html.

BikeYoke Revive Dropper Post Reviewed, article available online as of Feb. 5, 2019 at https://nsmb.com/articles/bikeyoke-revive-dropper-post-reviewed/.

Fox Transfer Dropper Seat Post - Review, article available online as of Jun. 7, 2016 at https://www.pinkbike.com/news/fox-transfer-dropper-seat-post-review-2016.html.

OneUp Components Press Release entitled "Oneup Components Dropper Post", dated Apr. 15, 2018, 9 pages, retrieved at <https://www.vitalmtb.com/news/press-release/0 Neu P-CO M Pone NTS-D ROPP E R-POST,2096# :-: text= The%20world's %20shortest,%20long%2otravel%20dropper> (Year: 2018).

OneUp Components Vimeo video and description entitled "OneUp Components Dropper Post Shim Install", dated May 16, 2018, 1 page plus 26 pages of video screenshots, retrieved at <https://vimeo.com/270135438> (Year: 2018).

* cited by examiner

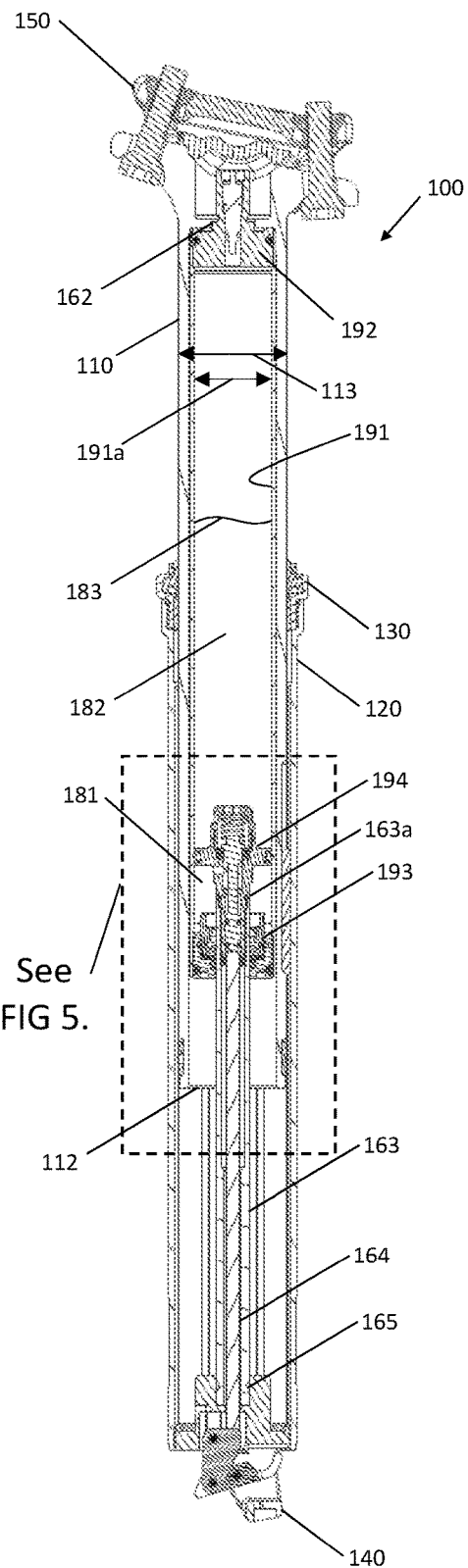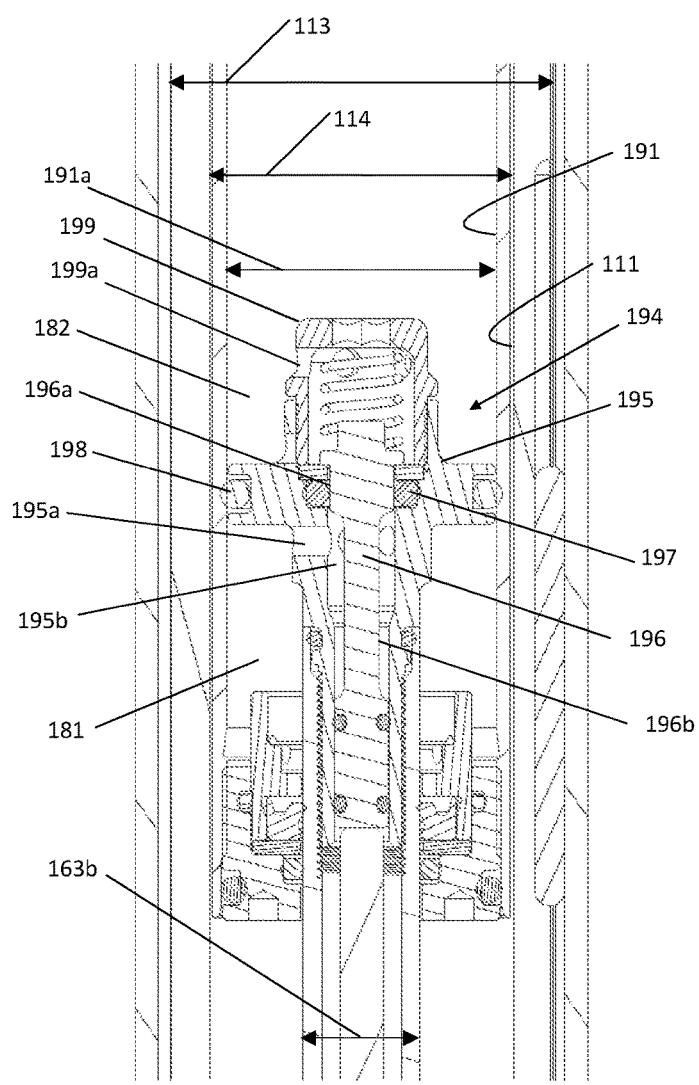
FIG 4.
FIG 5.

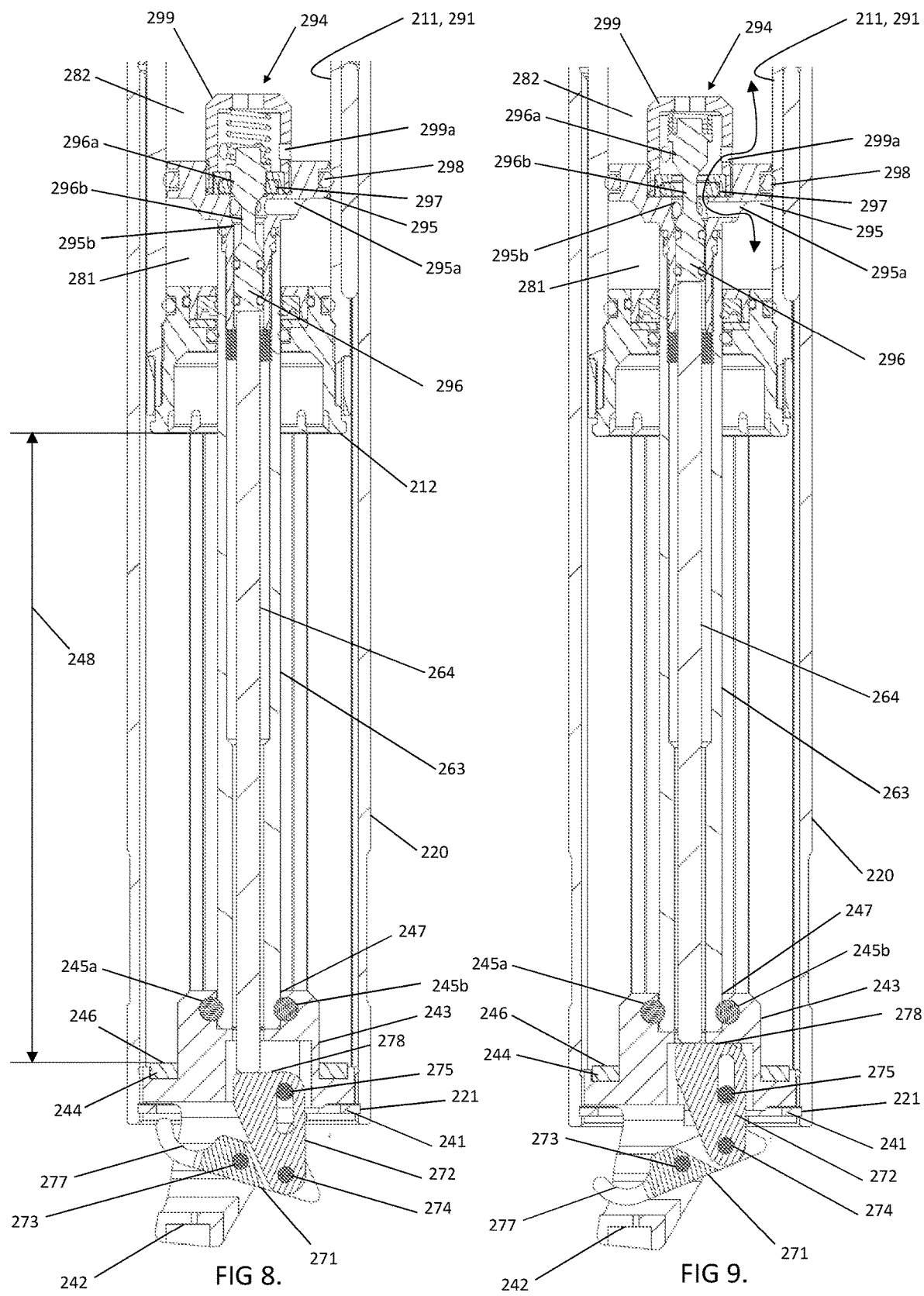

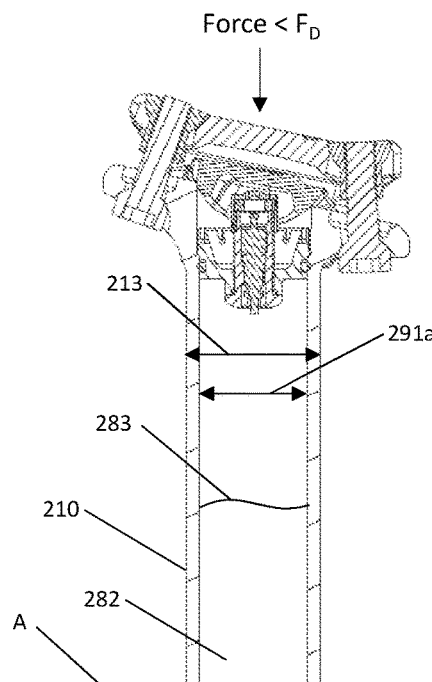
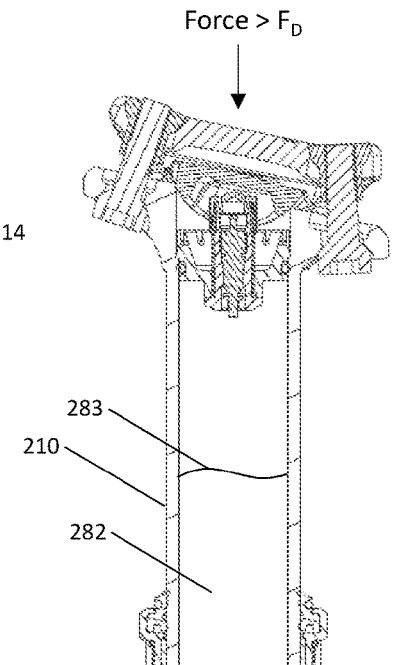
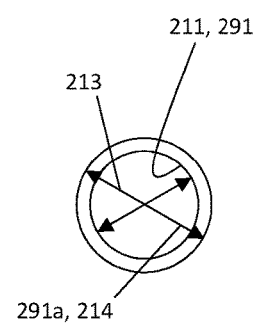
FIG 12.
FIG 13.
FIG 14.

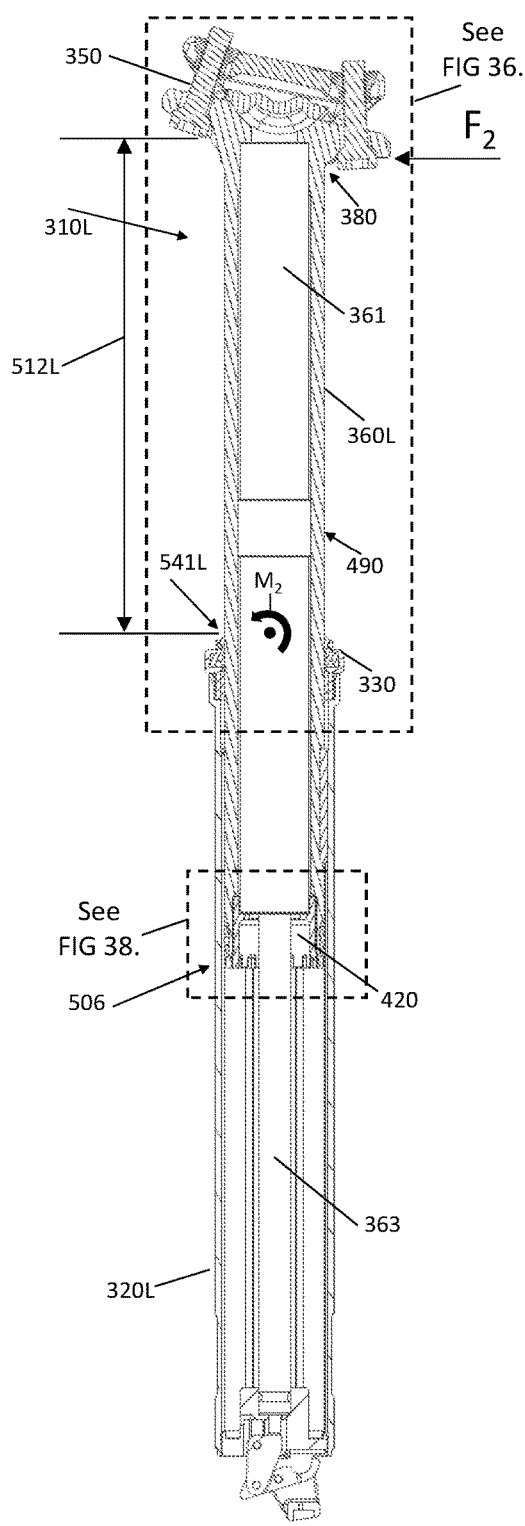
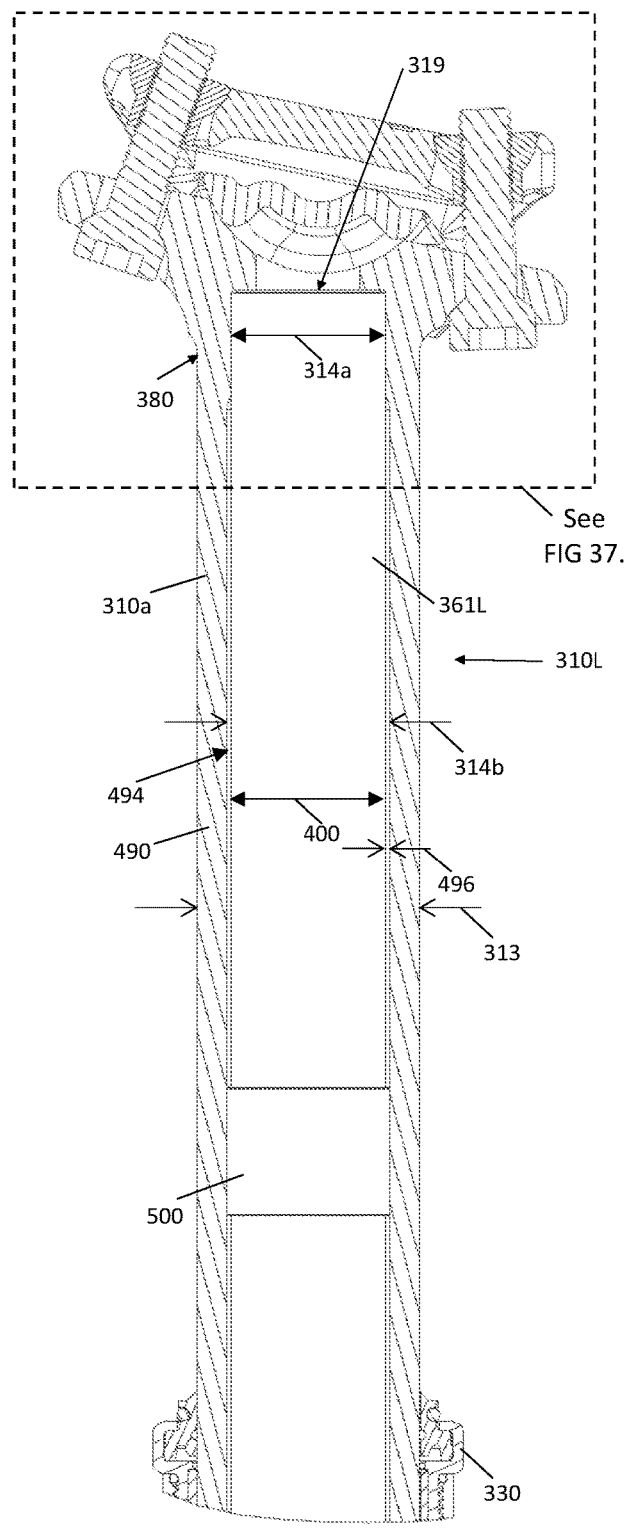
FIG 35.
FIG 36.

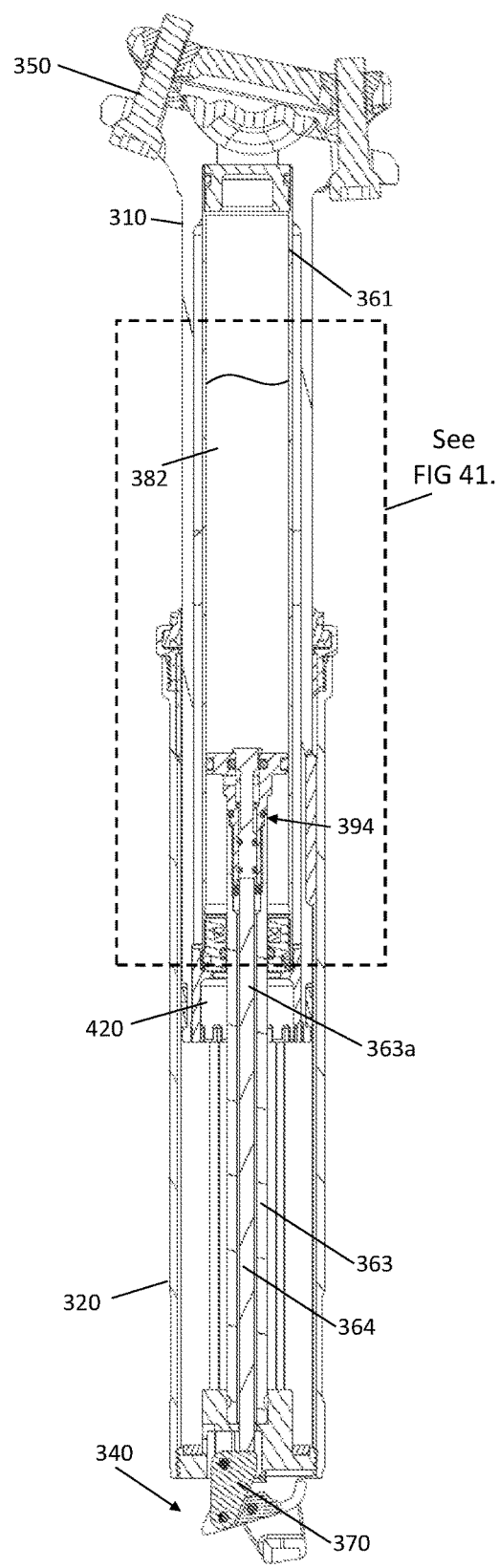
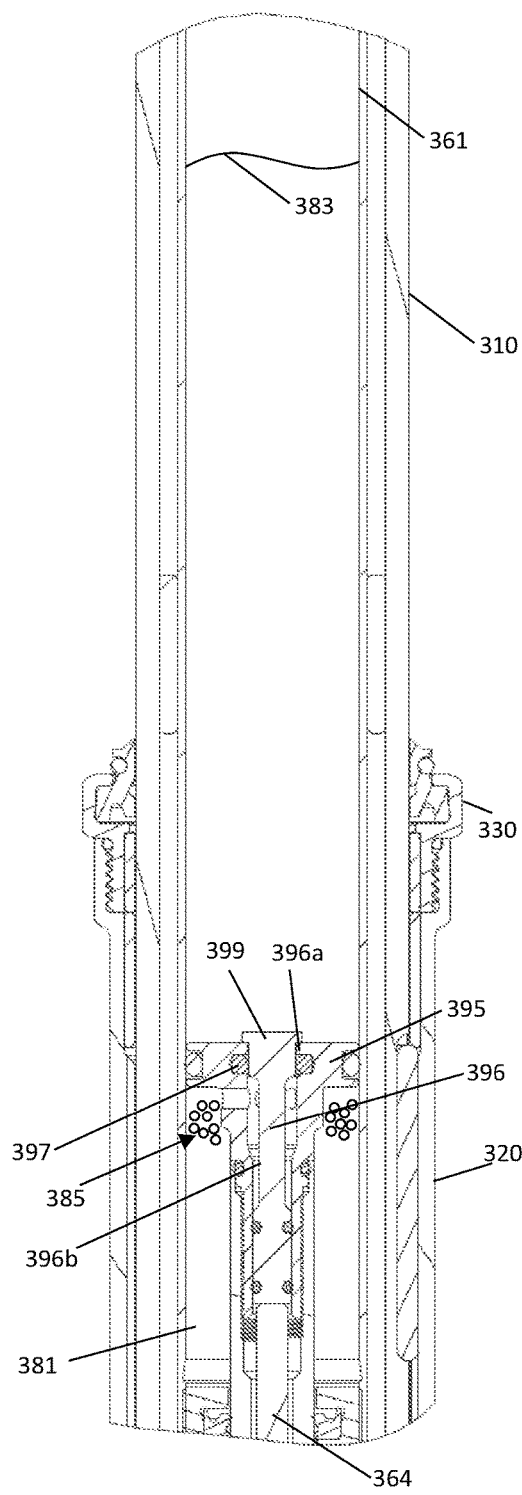
FIG 40.                    FIG 41.

BICYCLE DROPPER SEAT POST ASSEMBLY WITH A BOTTOM MOUNTED GAS SPRING CARTRIDGE

CROSS REFERENCE TO RELATED APPLICATION

This present application is a continuation of U.S. patent application Ser. No. 17/959,090 filed Oct. 3, 2022 and entitled Bicycle Dropper Seat Post Assembly With A Bottom Mounted Gas Spring Cartridge, which claims priority to and the benefit of U.S. U.S. provisional patent application No. 63/329,444, filed Apr. 10, 2022, and entitled Bicycle Dropper Seat Post Assembly with A Bottom Mounted Gas Spring Cartridge, the entirety of which is incorporated herein by reference.

TECHNICAL FIELD

The present invention relates to a locking spring cartridge used to control the height of a dropper seat post on a bicycle, and a dropper post assembly including the same, and more specifically to a dropper seat post assembly that can include a novel cartridge assembly design and in which a lower end of the cartridge tube, rather than its upper end, is secured to the seat post tube to axially restrain the cartridge tube relative to the seat post tube.

INTRODUCTION

U.S. Pat. No. 5,881,988 discloses a seat assembly includes a seat tube in which a seat post is movably received therein which has a clamping member with a seat disposed thereto. The seat post has two plain portions defined diametrically opposite in an outer periphery thereof and the seat tube has two wedge-shaped recesses defined diametrically opposite in an inner periphery thereof so as to receive two wedge-shaped blocks therein. The seat post extends through a nut member which is threadedly mounted to the seat tube.

U.S. Patent Publication No. 2020/070913 discloses a bicycle seat post assembly in which the travel distance of the seat post can be adjusted. The seat post assembly includes an outer tube that is configured to telescopically receive an inner tube. The inner tube is axially slidable relative to the outer tube between a retracted position and an extended position, the extended position being determined by an extension assembly in which an inner contact member engages an outer contact member, thereby setting the upper limit of axial extension of the inner tube. The extension of the inner tube can be limited to an intermediate position that lies between the retracted and extended positions by an insertable shim that is positionable between the inner and outer contact members.

Taiwan patent publication no. TW201801969A discloses a casing gap filling structure for a bicycle seat tube, which comprises a casing set having an outer tube and an inner tube which are sleeved onto each other and move linearly; a rotation constraining set which is arranged between the inner tube and the outer tube and provided with a first constraining groove arranged on the inner diameter edge of the outer tube and a second constraining groove arranged on an outer diameter edge of the inner tube, the first and second constraining grooves forms a constraining space together, and at least one metal constraining member made of a metal material is accommodated in the constraining space and capable of conducting synchronous linear displacement with the inner tube; a gap filler set is disposed in the constraining space and provided with at least one plastic constraining member made of a plastic material, the gap filler set and the metal constraining member respectively overlapping with each other in the constraining space along the axial direction of the inner and outer tubes, and the plastic constraining member is able to effectively fill the constraining space so as to eliminate the gaps among the plastic constraining member and the first and second constraining grooves; in this way, the rotation constraining set and the gap filler set are used to achieve the dual function of constraining the rotation and eliminating the gaps between the inner tube and the outer tube at the same time. The manufacturing cost of the filling structure is low because the overall components are simple and easy to be assembled quickly. Further, the gaps among the components generated by the fit tolerance and the manufacturing tolerance are reduced with no requirement of tight rotation actions, the automatic filling function is thus achieved and compatible with the lifting seat tube and the suspension seat tube.

U.S. Pat. No. 10,974,781 discloses a bicycle seat post assembly in which the travel distance of the seat post can be adjusted. The seat post assembly includes an outer tube that is configured to telescopically receive an inner tube. The inner tube is axially slidable relative to the outer tube between a retracted position and an extension position, the extension position being determined by an extension assembly in which a slider engages an upper retainer surface, thereby setting the upper limit of axial extension of the inner tube. The extension of the inner tube can be limited to an intermediary extension position that lies between the retracted and extension positions by an insertable extension stopper that is positionable under the upper retainer surface.

Taiwan utility model publication no. TWM517710U discloses a bicycle gas hydraulic seat tube assembly related to bicycles, especially a bicycle hydraulic pressure seat tube assembly. The common gas-oil seat tube adopts the gas compressible characteristic to match the flow of hydraulic oil in the space, so that the relative position change between the seat tube and the seat post is achieved, thereby achieving the effect of adjusting the height of the seat cushion. For example, as disclosed in the Republic of China Announcement No. M332057, the upper and lower displacements of the valve stem are used to switch the flow state of the adjustment flow path, so that the seat tube can achieve the effect of adjusting the height. However, in the aforementioned patent case, the inner and outer spaces for storing the hydraulic oil are disposed between the relatively exposed seat tube and the adjustment seat and are not located in the relatively closed riser. The risk of leakage is therefore necessary for structural improvements. The main purpose of this creation is to provide a bicycle gas pressure seat tube assembly that reduces the risk of oil and gas leakage.

Taiwan utility model publication no. TWM513153 shows a post in which a lifting adjustment unit 40 is housed inside seatpost 30 and secured by threadedly engaging lower end cap 48 to the lower end of seatpost 30. An external air chamber 60 is formed between seat post 30 and tube body 49 that is in fluid communication with internal air chamber 66 via lower air holes 482. External air chamber 60 can further fluidly communicate with an air valve on upper end cover 47 via upper air hole 472. Both lower end cap 48 and upper end cap 47 are o-ring sealed to seat tube 30 so that air pressure held in external air chamber 60 and internal air chamber 66 cannot escape to atmosphere. As such if lifting adjustment unit 40 is removed from and reinstalled into seat post 30, by unthreading lower end cap 48, the gas pressure would be lost, and the system would need to be recharged via the air valve on upper end cap 47.

SUMMARY

Dropper seat posts are telescopic posts that allow the rider to change the height of their seat without having to stop and adjust a mechanically tightened seat post collar. It can be generally advantageous to lower the bicycle seat as far as possible when riding through technical terrain to allow the rider to change body position or bend their knees deeply without contacting the seat.

Some known dropper post locking spring cartridges are configured with two or more chambers containing liquid (i.e., hydraulic oil), gas (i.e., air) or a combination thereof. There is typically an internal piston valve controlled by an actuator/remote and an actuation rod translatable between an open and a closed position. When the piston valve is closed and a rider sits on a seat attached to the top of the post, the chamber containing, by design, only oil is placed in compression thereby allowing the post to be loaded without retracting.

In this configuration, when the piston valve is opened the piston travels into the oil only chamber. Because the oil in the oil only chamber is substantially incompressible it is typically more difficult to open the valve while the upper tube is being urged toward the retracted position. This causes the rider to have to exert more force on the actuator/remote than may be comfortable, and/or that may put unwanted loads on the actuator system, to overcome this resistance and open the valve.

In this configuration, if the rider sits down on the seat too fast/hard while the piston valve is locked (closed), for example if a rider were to have one or both feet slip off the pedals and fall onto the seat with substantially all of their body weight, the seat post would generally not retract and therefore the seat would not move/lower to absorb and the rider could be injured by the seat and/or cause damage to the dropper post or seat.

Also, in this configuration air can sometimes enter the oil only chamber unintentionally. Once there, the presence of the relatively compressible air/gas within the chamber that is intended to contain only oil/liquid may allow the post to compress slightly under a relatively low force while the piston valve is, and remains, locked. This relatively low force sponginess is seen by consumers as being generally undesirable and as an indicator of a low-quality design. Correcting and a generally expensive and/or complicated rebuild is required to fix the problem.

In view of some of the shortcomings of the known dropper posts, including those known designs referred to herein, there remains a general desire for a sealed locking spring cartridge that can be used in a dropper post assembly and that can be installed or removed without requiring the removal of the seat clamps. This may allow the spring cartridge to be serviced, replaced or otherwise accesses without requiring the removal of the seat clamps and the seat any seat that is attached.

There also remains a general desire for a sealed locking spring cartridge that can be constrained to the lower end of the seat post inner tube rather than the upper end of the seat post inner tube, and preferably regardless of the relative difference between the seatpost inner tube inner diameter and the cartridge outer tube outer diameter. This could allow the sidewalls of the seat post inner tube to be modified to help achieve other desirable functions/attributes (such as increased strength or reduced weight) without requiring significant modification or redesign of the spring cartridge. This could help allow a common spring cartridge to be used with two or more different seatpost inner tube designs.

There also remains a general desire for a sealed locking spring cartridge that does not require a threaded hole or protrusion at the top end of the seatpost inner tube. This can help facilitate the use of closed-top seatpost inner tube. Using a closed-top seatpost inner tube may help simply manufacturing of the seatpost inner tube, may modify its strength or other parameters and/or may help provide a more sealed arrangement that can prevent dirt or other debris from getting into the interior of the seatpost inner tube via the opening that would otherwise be required to accommodate the upper fastener on conventional spring cartridges.

There also remains a general desire for a sealed locking spring cartridge that can be removed and reinstalled into the seatpost inner tube without having the recharge the gas pressure in the system. This can simplify and the maintenance and/or assembly of the dropper post assemblies and may allow portions of the dropper post assembly to be serviced by a user and/or without the need for specialized tools and equipment that could be required to open a pressurized spring cartridge and/or recharge the cartridge once installed.

In accordance with one broad aspect of the teachings described herein, a dropper post assembly for supporting a bicycle seat may include an outer tube extending axially along a post axis between a lower end and an upper end and an inner tube extending axially between an upper end that is connectable to a bicycle seat and a lower end that is disposed within the outer tube and has a tube engagement member. The inner tube may be axially movable relative to the outer tube between an extended position and a retracted position. A spring cartridge assembly may be configurable in an unlocked configuration in which the spring cartridge assembly biases the inner tube toward its extended position and a locked configuration. The spring cartridge assembly may include a cartridge tube providing a cylinder and being disposed within and movable with the inner tube. The cartridge tube may extend between an upper end disposed at the upper end of the inner tube and a lower end that is disposed at the lower end of the inner tube. A lower seal assembly may be disposed at a lower end of the cartridge tube and may seal a lower end of the cylinder. A piston may be movably received within the cylinder to provide a first chamber defined between the piston and the lower seal assembly and disposed on a lower side of the piston, and a second chamber between the piston and an upper end of the cylinder and disposed on an opposing, upper side of the piston. Moving the inner tube toward the retracted position may expand the first chamber, the piston may include including a valve that is configurable in an open position in which fluid communication is established between the first chamber and the second chamber and the spring cartridge assembly is in the unlocked configuration, and a closed position in which the first chamber is fluidly isolated from the second chamber and the spring cartridge assembly is in the locked configuration. A cartridge rod may extend axially through the lower seal assembly between an inner end engaging the piston and an outer lower end at the lower end the outer tube. A second engagement member may be configured to releasably engage the tube engagement member thereby fastening the cartridge tube to the lower end of the inner tube so that the cartridge tube may be axially fixed to the inner tube and movable with the inner tube relative to the outer tube. An actuator may have a body disposed adjacent the outer end of the cartridge rod and being operable to actuate the valve to change the spring cartridge assembly between the locked configuration and the unlocked configuration.

The cartridge tube may be axially removable via the lower end of the inner tube when the second engagement member is disengaged from the tube engagement member and the spring cartridge assembly remains operation when removed from the inner tube.

The tube engagement member may be integrally formed on an inner surface of the inner tube, and preferably comprises threads formed in the inner surface of the inner tube.

The upper end of the cartridge tube does may not include a fastening mechanism engaging the inner tube in a manner that restrains axial movement of the cartridge relative to the inner tube.

An axially upper most portion of the spring cartridge may be disposed within the inner tube and does not extend axially beyond the upper end of the inner tube, whereby an entirety of the spring cartridge is disposed axially inboard of the upper end of the inner tube.

The inner tube may include an upper end wall that covers the upper end of the inner tube, and the cartridge tube may include an axially facing upper cap surface that opposes the upper end wall when the cartridge tube is disposed within the inner tube. The upper cap surface and upper end wall may be complimentary to each other and generally planar and the cartridge tube may be located axially inboard of the upper end wall.

An openable seat clamp assembly may be connected to the upper end of the inner tube and may be configured to releasably retain a bicycle seat. The second engagement member may be disengagable from the tube engagement member so that the spring cartridge can be removed from the inner tube without opening the seat clamp assembly.

When the spring cartridge is axially removable via the lower end of the inner tube after disengaging the second engagement member from the tube engagement member and wherein the cylinder remains sealed, and the spring cartridge assembly remains operable when the spring cartridge assembly is removed from the inner tube.

A fastening member may be removably insertable in the lower end of the inner tube. The fastening member may include the second engagement member and an abutment surface, wherein when the fastening member is inserted so that the second engagement member engages the tube engagement member the cartridge tube is compressed axially between the abutment surface and the upper end of the inner tube.

The fastening member may include a captive sidewall extending axially from the abutment surface and cooperating with the abutment surface to at least partially define a tube recess sized to accommodate the lower end of the cartridge tube. When the fastening member is inserted, the captive sidewall may be disposed laterally between the cartridge tube and the inner tube.

The captive sidewall may surround the tube recess and may define a recess diameter that is substantially the same as an outer diameter of the cartridge tube so that the and lateral movement of the lower end of the cartridge tube relative to the fastening member and the lower end of the inner tube is inhibited cartridge tube is closely/snugly in the tube recess so that when the fastening member is inserted lateral movement between the lower end of the cartridge tube and the lower end of the inner tube is inhibited.

The second engagement member may be disposed toward a lower end of the fastening member and the abutment surface may be disposed toward an opposing, upper end of the fastening member.

An inner surface of the lower end of the fastening member may include a drive portion configured to be engaged by a corresponding driving tool used to secure the fastening member within the inner tube.

Optionally, when the fastening member is inserted, it may be at least partially axially nested within the inner tube, and preferably when the fastening member is inserted it is entirely axially nested within the inner tube.

An openable seat clamp assembly may be connected to the upper end of the inner tube and may be configured to releasably retain a bicycle seat. The fastening member may be insertable and removable from the inner tube independently from opening the seat clamp assembly, whereby the second engagement member is disengagable from the tube engagement member without opening the seat clamp assembly.

The inner tube may include an upper captive portion at its upper end having a first internal diameter that is substantially the same as an outer diameter of the cartridge tube so that the upper end of the cartridge tube is closely/snugly received in the upper captive portion but remains axially removable and lateral movement between the cartridge tube and the inner tube is inhibited.

The inner tube may include a clearance portion axially inboard from the upper captive portion and having a second internal diameter that is greater than the first internal diameter and the outer diameter of the cartridge tube, whereby an annular gap may be formed within the clearance portion between an outer surface of the cartridge tube and an opposing inner surface of the inner tube.

A bumper may be positioned laterally between the cartridge tube and the inner tube within the annular gap and inhibiting lateral movement of the cartridge tube relative to the inner tube.

The bumper may laterally encircle the cartridge tube and may have a length in the axial direction that is less than 20% of an axial length of the cartridge tube.

The bumper ay be located within an axially middle portion of the cartridge tube, and optionally may be located at the axial midpoint of the cartridge tube.

The lower end of the inner tube may include an engagement region that includes the tube engagement member and has a third internal diameter that is greater than the second internal diameter.

The inner diameter of the inner tube may increase from its upper end to its lower end.

The inner engagement member may be formed on an outer surface of the cartridge tube.

The first chamber may contain substantially only a liquid and the second chamber may contain a mixture of a liquid and a gas. When the dropper post assembly is oriented so that the second chamber is above the first chamber the spring cartridge assembly may operate as a self-bleeding cartridge, in which when the valve is in its open position gas contained in the first chamber escapes through the valve and is collected in the second chamber.

BRIEF DESCRIPTION OF THE DRAWINGS

FIG. 4 is a cross-sectional view of the dropper post of FIG. 2, taken along line 4-4;

FIG. 5 is an enlarged view of a portion of the cross-sectional view of FIG. 4;

FIGS. 8 and 9 are enlarged views of another portion of the cross-sectional view of FIG. 6;

FIGS. 10-13 are additional cross-sectional views of dropper post of FIG. 6; and

FIG. 14 is a cross-sectional view of a portion of the dropper post of FIG. 12, taken along Plane A;

FIG. 35 is a partial cross-section view of another example of a dropper post assembly;

FIG. 36 is an enlarged view of a portion of FIG. 35;

FIG. 40 is a partial cross-section view of a dropper post assembly in a locked configuration;

FIG. 41 is an enlarged view of a portion of FIG. 40;

DESCRIPTION

Figure 1:
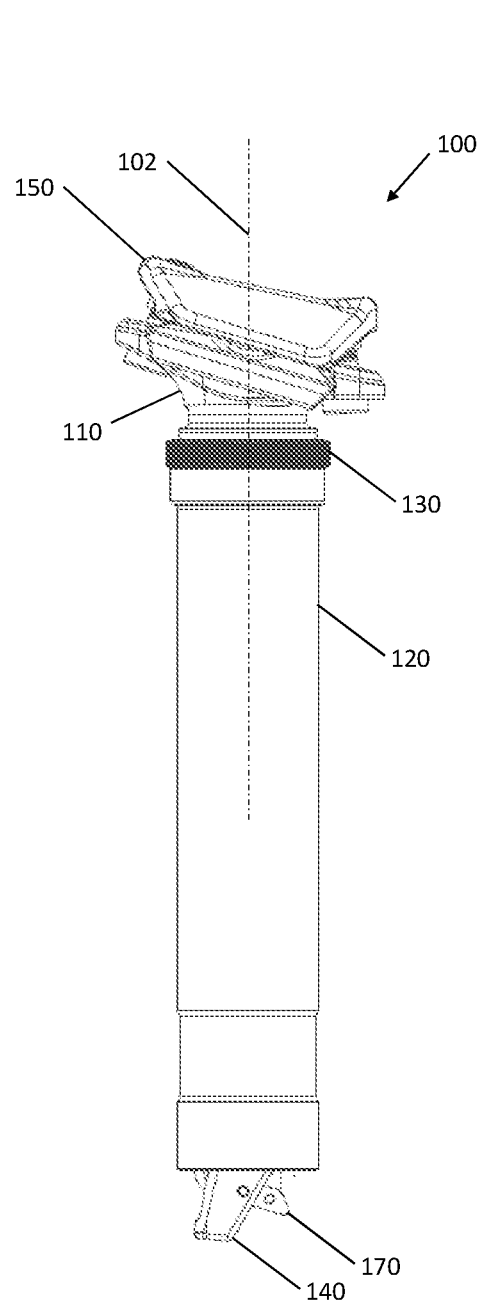
FIG. 1 is a side view of one example of a dropper post in a retracted position.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

Bicycle dropper seatposts allow a rider to change the height of their seat while riding without having to stop and adjust a mechanically tightened seat post collar. Dropper seat posts are available in different sizes, having different lengths of travel and different minimum and maximum seat heights. The dropper posts can include a lower or outer tube that can be connected to a bicycle, and an upper or inner tube that is telescopically slidable relative to the outer tube. A bicycle seat is connectable to the upper end of the inner tube, using a suitable clamping mechanism, and the lower end of the inner tube is usually nested within the outer tube. The inner tube is movable, relative to the outer tube, between a retracted position (in which the seat is relatively closer to the bicycle and most of the inner tube is received within the outer tube) and at least one extended position (in which the seat is relatively farther from the bicycle and a significant portion of the inner tube is exposed and extended outside the outer tube).

To help facilitate the desired extension and retraction of the inner tube, dropper seatposts can also include a biasing and locking mechanism that can be used to urge/bias the inner tube toward at least one of the retracted or extended positions and can also help secure the inner tube in place—such as in its extended position—if the rider wishes to keep the seat at a given height/position. Preferably, the biasing and locking mechanism can be arranged to bias the inner tube (and seat mounted thereon) to its extended position, and then maintain the inner tube in this position until the rider chooses to have the inner tube retracted. In the embodiments described below, the biasing and locking mechanism includes a locking spring cartridge assembly.

Preferably, the dropper seatposts also include some type of actuator mechanism that a rider can use to actuate/trigger the biasing and locking mechanism, to allow the rider to selectably alter the seat height. For example, the dropper seat post can include an actuator assembly that is used to trigger and/or selectable lock and unlock the locking spring cartridge assembly. The locking spring cartridge assembly, as described herein, can be configured so that it remains fixed/lock when not engage by the actuator assembly, and will stay in either its extended or retracted position. The locking spring cartridge assembly is preferably biased toward its extended position, whereby if the locking spring cartridge assembly is retracted and is then unlocked by the rider via the actuator, the locking spring cartridge assembly can apply a biasing, extension force that urges the inner tube (and seat) toward its extended position—thereby raising the seat. With the actuator disengaged, the locking spring cartridge assembly is considered locked and will resist movement/retraction of the inner tube. That is, the locking spring cartridge assembly force will resist the axial/vertical loads on the inner tube while in use to help keep the seat at the desired height, but the resistance of the locking spring cartridge assembly may be overcome if a sufficiently large axial/vertical force is applied. Allowing the locking spring cartridge assembly to yield in response to an overload situation (e.g. when the applied force passes a predetermined load threshold), while remaining sufficiently rigid when subjected to loads below the predetermine load/yield threshold may be advantageous because it can allow the post to support the weight of the rider when in use (in a manner that is perceived to be stable by the rider), while allowing the post to yield when overloaded to avoid damaging or bending portions of the post or injuring the rider. Having a cushion quotient, $Q_C$, which is sufficiently high can help achieve this desired performance.

When a rider wishes to lower the seat height, the actuator is engaged, and the rider can apply a downward force on the seat (typically using their body weight) that is sufficient to overcome the biasing force of the locking spring cartridge assembly so that the inner tube can be retracted into the outer tube. Once retracted, the actuator is disengaged, thereby locking the locking spring cartridge assembly and keeping the inner tube in its retracted position. In this arrangement, the biasing force of the locking spring cartridge assembly when unlocked is preferably set relatively low so that the inner tube can be retracted using the body weight of the rider (and of riders of potentially different sizes and weights), whereas the force required to cause movement of the locking spring cartridge assembly when it is locked is relatively higher, but below the predetermined threshold.

To make things convenient for the rider, the triggering mechanism/remote for the actuator assembly can be provided at another location on the bicycle, such as on the handlebars, and can be operatively connected to an actuator assembly by a remote connector (such as a wire, cable, chain, lever, pneumatic or hydraulic link or the like). Because such remotes are usually connected to the actuator assembly in a mechanical/fluid power manner that transmits forces back to the user, it is preferable that the force required to engage the actuator assembly remains in a range that is feasible/comfortable for the rider to apply using the remote, and more preferably the force required to engage the actuator assembly remains relatively constant whether the inner tube is extended or retracted. This may help provide a more consistent tactile experience for the rider.

The inventor has determined that the extension force, overload yield force and other parameters of the dropper post can be configured by modifying aspects of the locking spring cartridge assembly design, such that a new dropper post has been created in which the actuation force of the spring cartridge assembly device is not materially affected by the instantaneous load that is being applied to the seat (e.g. can operate in substantially the same way when the seat is loaded or unloaded), and/or where, when the spring cartridge assembly is locked (e.g. the piston valve is closed), the upper tube can remain sufficiently rigid to resist loading of the seat up to a pre-determined, overload force above which the post can compress slightly to help protect the post from damage and/or the rider from injury. Examples of suitable locking spring cartridges that can be used in such dropper posts are described herein.

FIGS. 1-5 illustrate one example of a dropper seat post 100 includes an inner tube 110, seat clamps 150 (for connecting to a bicycle seat—not shown), an outer tube 120, a seat collar 130, an actuator assembly 140, including actuator mechanism 170, and a locking spring cartridge assembly 160. In this arrangement, both the inner tube 110 and outer tube 120 are elongate, tubular members that extend along a post axis 102. While the post axis 102 is shown as generally vertical in FIGS. 1 and 2, when the dropper post 100 is installed on a bicycle the post axis may be inclined and need not be vertical.

Figure 2:
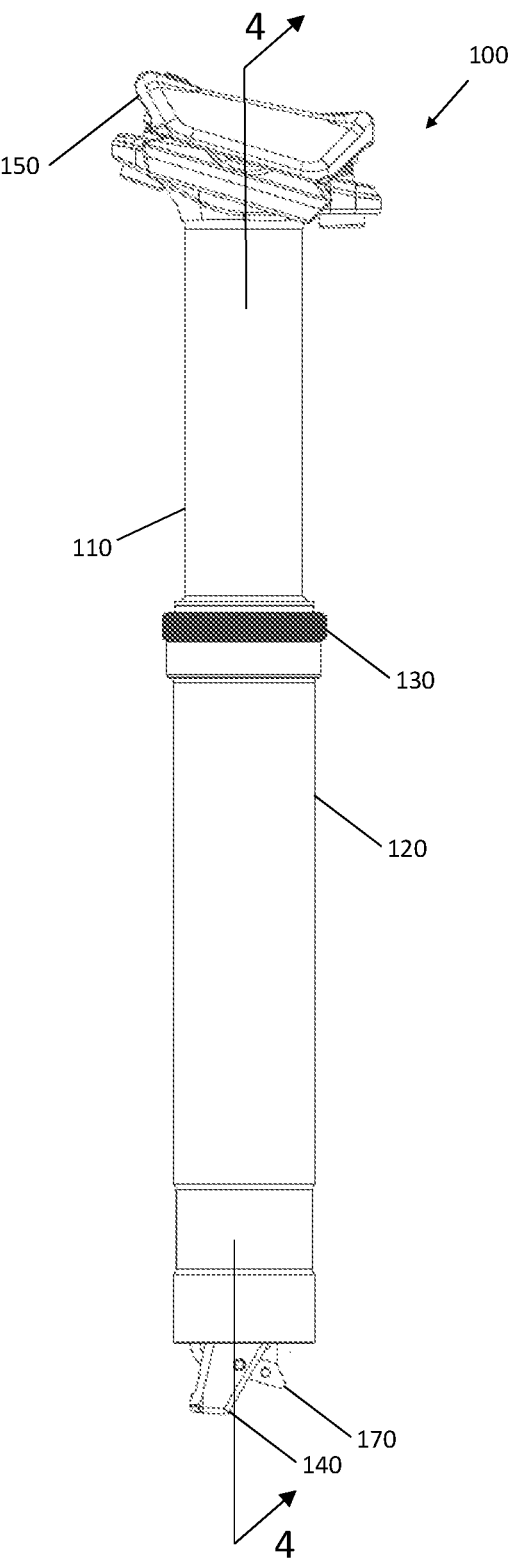
FIG. 2 is a side view of the dropper post of FIG. 1 in an extended position.

In this example, the inner tube 110 is configured to slide telescopically within the outer tube 120 between a retracted position (FIG. 1) and an extended position (FIGS. 2 and 4, for example). The inner tube 110 includes a lower end 112 that is sized to fit within the outer tube 120 and that is intended to be retained within the outer tube 120 in both of the seat post's 100 retracted (FIG. 1) and extended configurations (FIG. 2). The inner tube 110 also has sidewall with an inner wall surface 111 and defines an inner tube outer diameter ($D_{TO}$) 113 and inner tube inner diameter ($D_{TI}$) 114. While the term inner tube diameter is used for convenience in this description, it is possible in some examples that the inner wall does not have a circular cross-sectional shape, and may have an oval shape, rectangular shape or other suitable shape, even if the outer shape is circular or substantially circular. As described herein, the interior of the upper tube is preferably sized to accommodate the associated spring cartridge assembly (as described herein) and can influence the formula that is used to calculate its moment of inertia (as described herein), but the values for the moment of inertia can be compared for different shapes. Therefore, references to inner diameters can be understood to mean inner width and/or other relevant interior measurement that is useful for calculating the moment of inertia for a given shape. The term diameter is not intended to limit the present teachings to only be applicable to posts with a circular interior shape.

Figure 3:
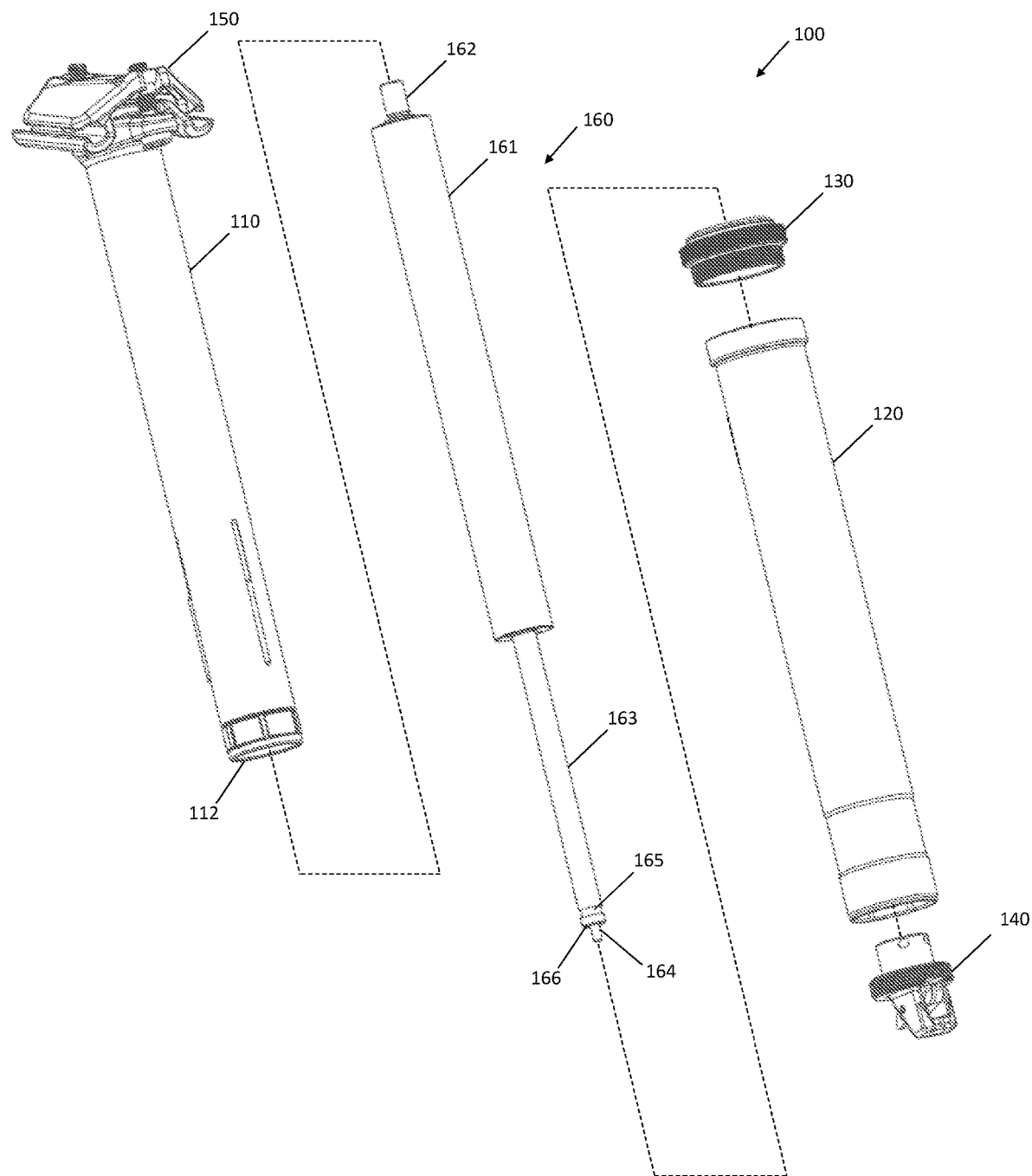
FIG. 3 is a partially exploded view of the dropper post of FIG. 1.

Referring to FIGS. 3-5, one example of a locking spring cartridge assembly 160 that is suitable for use with the dropper posts described herein includes a cartridge outer tube 161 that has a sidewall with an inner surface that can be engaged by portions of the cartridge and can form part of the boundary of internal cartridge chambers and/or may be part of the sealing structures. In this example, the inner surface of the cartridge outer tube 161 can be referred to as an inner sliding surface 191 that defines a sliding surface diameter 191a. The cartridge outer tube 161 is preferably connectable to the inner tube 110 in a manner that is sufficiently strong enough to carry the forces described herein, and that allows the inner tube 110 to move with the cartridge outer tube 161. In the illustrated example, the cartridge outer tube 161 includes upper connection portion 162 for attaching cartridge 160 to upper tube 110, but other fasteners could be used. In addition to the cartridge outer tube 161, the locking spring cartridge assembly 160 also includes a cartridge rod 163 with a cartridge rod diameter 163a, a locking groove 165 at a lower end 166 of the cartridge rod 163, and an actuation rod 164. Fixedly attached to sliding surface 191 are an upper seal assembly, including the upper seal head 192, and a lower seal assembly, including lower seal head 193, which together help seal in the interior of the cartridge outer tube 161 and substantially fluidly isolate the interior of the cartridge outer tube 161 from the surrounding environment (at least with a sufficient degree of sealing/isolation to facilitate the operation of the locking spring cartridge assembly 160 as described herein).

Within the interior of the cartridge outer tube 161 a piston assembly is provided to separate the interior of the cartridge outer tube 161 into two different chambers, and to help facilitate the translation of the cartridge outer tube 161 as described. The piston assembly can be of any suitable configuration that can operate as described herein. A valve mechanism is also preferably provided that can selectably allow fluid communication between the chambers on opposite sides of the piston assembly, as this can be used to lock and unlock the locking spring cartridge assembly 160. The valve, and related fluid flow path regions, can be of any suitable configuration. To help reduce the overall size of the locking spring cartridge assembly 160, it may be preferable to integrate a suitable valve mechanism within the piston assembly, as is shown in the present example that includes a piston valve 194 attached to the upper end 163*a* of a cartridge rod 163 that can extend from the piston valve 194 to the actuator assembly 140. The piston valve 194 is sized to generally fill the cartridge outer tube 161, is positioned axially between the upper and lower cartridge seal heads 192 and 193 and has a sealing portion that is positioned opposite and configured to seal against the sliding surface 191 and includes a body-sliding-surface o-ring 198 (or other suitable translatable sealing member). The piston valve 194, in this example, also includes a valve body 195, a plunger 196 that can move relative to the valve body 195, a body-piston o-ring 197, and valve cap 199. In this embodiment the valve cap 199 defines a valve cap channel 199*a* and the valve body 195 defines a corresponding valve body channel 195*a* and a valve inner pathway 195*b*. The plunger 196 includes a seal surface 196*a*, that can seal against the valve body 195 (e.g., against o-ring 197 in this example) to inhibit fluid flow through the piston valve, and neck portion 196*b*.

In this arrangement, the piston 194 divides the interior of the cartridge outer tube 161 into two operating chambers that can be fluidly isolated from each other while the locking spring cartridge assembly 160 is in use to selectably lock and unlock the locking spring cartridge assembly 160. For example, when the operating chambers are fluidly isolated from each other the locking spring cartridge assembly 160 can be considered to be in a locked configuration and will resist movement of the cartridge outer tube 161 and seat post inner tube 110. In contrast, when the operating chambers are fluidly connected, such as by activating the piston valve 194 and allowing fluid (liquid) to pass through the piston 194 and flow between the operating chambers, the locking spring cartridge assembly 160 can be considered to be in an unlocked configuration and will facilitate the relative movement of the cartridge outer tube 161 and seat post inner tube 110 relative to the outer tube 120. As described herein, when the locking spring cartridge assembly 160 is in use, and the piston valve 194 is opened, the cartridge outer tube 161 can translate relative to the piston 194 to allow the seat post inner tube 110 to translate relative to the outer tube 120.

Referring to FIGS. 4 and 5, in this example one, or a first, of the operating chambers is chamber 181, which is located axially between the piston valve 194 and the lower seal head 193 and is laterally bounded by the sliding surface 191. Preferably, the lower chamber 181 is configured to contain only, or at least substantially only liquid, such as the oil described herein, rather than a mixture of liquid and gas or other material and can also be referred to as a liquid chamber. When the locking spring cartridge assembly 160 is in use within the seat post 100 in the orientation illustrated these Figures (which is also the orientation of the locking spring cartridge assembly 160 when it is in use on a bicycle) the chamber 181 can be referred to as a lower chamber 181, but it is understood that the term lower is used for convenience and is not intended to limit the orientation of the locking spring cartridge assembly 160 when in use.

In the present example, the other, or second, operating chamber is chamber 182 which is located axially between the piston valve 194 and the upper seal head 192 and is also laterally bounded by the sliding surface 191. Because of its relative location within the locking spring cartridge assembly 160 as illustrated, the second chamber 182 can be referred to as an upper chamber 182, but it is understood that the term lower is used for convenience and is not intended to limit the orientation of the locking spring cartridge assembly 160 when in use. In contrast to lower chamber 181, the upper chamber 182 is preferably configured to contain a mixture of oil (or other suitable liquid) and pressurized air (or other suitable gas), instead of containing only oil/liquid, and can be referred to as a gas/liquid chamber.

Under the intended operating conditions of the locking spring cartridge assembly 160 the oil and air (or other liquid and gas) in the gas/liquid chamber 182 with tend to separate from each other due to the differences in their densities and mechanical properties, such that an air/oil interface or boundary 183 is defined between piston valve 194 and upper seal head 192 within chamber 182. In this arrangement, the gas/liquid chamber 182 will have a lower layer or region containing oil occupying the space located axially between the boundary 183 and the piston valve 194, and an upper layer or region that is above the oil layer and boundary 183 and is located axially between the boundary 183 and the upper seal head 192. When the piston valve 194 is actuated and its valve is open, fluid communication between the liquid layer within chamber 182 and the liquid within the lower chamber 181 is established.

While illustrated as separate members in this example of dropper seat post 100, the cartridge outer tube 161 and upper tube 110 may alternatively be integrally formed with each other and as is shown in another example of a dropper seat post 200. The seat post 200 is analogous to seat post 100 and like features are illustrated using like reference characters indexed by 100. As described further herein, seat post 200 can operate in substantially the same manner as seat post 100 but may have some slightly different components and configurations as a result of the integral formation of the cartridge outer tube 161 and upper tube 110 that do not materially alter how the posts 100 and 200 operate. For example, if the cartridge outer tube 161 and upper tube 110 are of integral, one-piece construction as shown in this second example then features such as the upper connection portion 162, that is used to connect the separate cartridge outer tube 161 to the upper tube 110 in the previous example, is not needed. Similar functioning components on dropper post 100 will now be described using characters indexed by 100 (i.e., 163 is now 263).

Figures 6, 7:
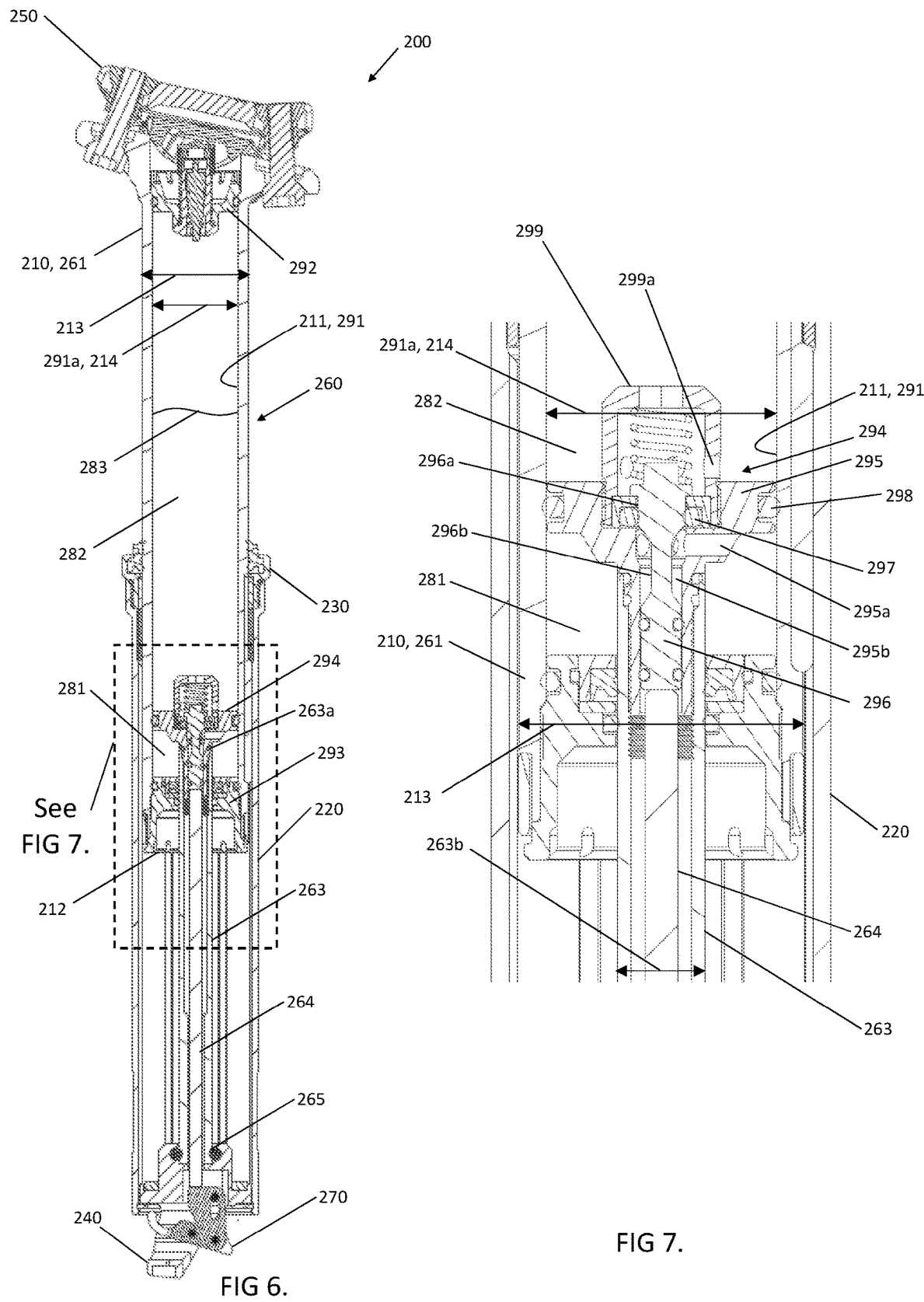
FIG. 6 is a cross-sectional view of another example of a dropper post.
FIG. 7 is an enlarged view of a portion of the cross-sectional view of FIG. 6.

FIGS. 6-7 illustrate an example of a dropper seat post 200 that embodies another preferred embodiment of the teachings described herein. In this example, the seat post 200 includes an inner tube 210, seat clamps 250, outer tube 220, seat collar 230, actuator assembly 240, including actuator mechanism 270. The inner tube 210 further includes lower end 212, inner wall surface 211, inner tube outer diameter (DTO) 213 and inner tube inner diameter (DTI) 214.

In contrast to the seat post 100, in this example the inner tube 210 and outer cartridge tube 261 are integrally formed together (i.e., are of integral, one-piece construction) so that the inner tube 210 forms a part of locking spring cartridge assembly 260. This example of the locking spring cartridge assembly 260 further includes an inner sliding surface 291 that defines a respective sliding surface diameter 291*a* (which is the same as tube inner diameter 214 in the case of dropper post 200), cartridge rod 263 defining a cartridge rod diameter 263b, locking groove 265 and actuation rod 264. Fixedly attached to sliding surface 291 are upper seal head 292 and lower seal head 293. While fixed during the operation of the locking spring cartridge assembly 260 to help contain the liquid and gas within the cartridge tube 261, the upper and lower seal heads 292 and 293 (and analogous seals 192 and 193) can be removed for maintenance, assembly of the mechanism and for any other reason while the seat post 200 (or 100) is not in use.

In this example, the piston valve 294 is attached to the upper end 263a of cartridge rod 263 and is positioned so that it can seal against and slide relative to the sliding surface 291 and is located axially between the upper and lower cartridge seal heads 292 and 293. In this example, the sliding surface 291 is an inner surface of the inner tube 210.

Piston valve 294 further contains a valve body 295, a plunger 296, a body-piston o-ring 297, body-sliding-surface o-ring 298 (or other suitable sealing member) and valve cap 299. In this example, the valve (including the valve body 295, plunger 296 and related sealing members, etc.) are included as part of the piston that separates the chambers 281 and 282, which can help reduce the overall size of the dropper post 200. Alternatively, a different type of valve and liquid flow path may be provided that does not necessarily require the flow path to extend through the piston as illustrated.

Valve cap 299 defines a valve cap channel 299a and valve body 295 defines a valve body channel 295a and a valve inner pathway 295b. Plunger 296 further defines seal surface 296a and neck 296b. Lower chamber 281 located within sliding surface 291 and between piston valve 294 and lower seal head 293 contains only oil (or other suitable liquid). Upper chamber 282 that is bounded by the sliding surface 291 and located axially between piston valve 294 and upper seal head 292 preferably contains a mixture of oil (or other suitable liquid) and pressurized air (or other suitable gas). When dropper post 200 is in a substantially upright position (as illustrated in FIGS. 6 and 7), the oil and air in chamber 282 will tend to separate from each other, with the oil occupying the lower portion of the space adjacent piston valve 294 and the relatively less dense air occupying the upper portion of the chamber 282 space adjacent the upper seal head 292. An air/oil boundary 283 is therefore defined between piston valve 294 and upper seal head 292 within chamber 282.

FIGS. 8-9 show the actuator 240, and lockable spring cartridge assembly 260 in use. While the operation of the actuator and cartridge is described with reference to the actuator 240, and lockable spring cartridge assembly 260, actuator 140 and lockable spring cartridge assembly 160 have substantially the same features and are operable in an analogous manner (regardless of whether the cartridge outer tube is a separate member or is integrally formed with the dropper post inner tube). Further, while a given actuator 240 is described for convenience, other suitable actuators may be used provided that they can selectably trigger the piston valve 294 (or 194) to enable the locking and unlocking of the spring cartridge assembly.

In the illustrated examples, actuator 240 includes a body 243, a cartridge rod receiving portion 247 for attaching cartridge rod 263 to body 243, an inner tube stop surface 246 and an actuation mechanism 270 to push actuation rod 264. Upper tube stop surface 246 may exist on body 243 or as illustrated may be the upper surface of cushioning member 244.

Cartridge rod 263 can be attached to rod receiving portion 247 of actuator body 243 in any suitable manner. In the illustrated example bolts 245a and 245b are provided and interact with locking groove 265 to securely connect the cartridge rod 263 to the actuator body 243. Alternatively, other suitable methods such as threaded engagement, a press-fit, a deformation fit, or the like could be used.

Actuator body 243 of actuator 240 can be attached to lower tube 220 using any suitable techniques or fasteners, and preferably may be removable connected to allow access to the interior of the lower tube 220. In the illustrated example, body 243 uses circlip 241 that engages with groove 221 of lower tube 220. Other suitable methods such as threads, a press-fit, a deformation fit, or the like could be used.

To operate the piston valve 294, the actuator 240 can also include a suitable actuator mechanism 270, which in this example includes a lower arm 271 that has a dynamic cable stop surface 277. An upper arm 272 is linked to the lower arm 217 and includes an actuation rod contact surface 278 that is configured to engage the lower end of the actuation rod 264. Pivot pins 273 and 274 are used to connect the lower and upper arms 271 and 272 to each other and to the body 243 and to facilitate the desired pivoting of the arms 271 and 272 when the actuator 240 is in use. An alignment pin 275 is used to help guide the movement of the upper arm 272, and preferably to limit movement of the upper arm 272 to a substantially axial translation as the pin 275 is captive, and slides within a corresponding slot in the upper arm 272.

In this example, the actuator mechanism 270 uses a cable and housing arrangement (not shown—but that can be connected to a suitable remote trigger unit) to lower the distance between static cable stop surface 242 of body 243 and dynamic cable stop surface 277 of lower arm 271 when tension is applied to the cable (i.e. to pull the cable stop surface 277 downwardly as illustrated in FIG. 8). Lowering the distance between cable stops 277 and 242 pivots lower arm 271 about pin 273 thereby pushing upper arm 272 upward while it pivots about pin 274. Upper arm 272 is aligned to body 243 by alignment pin 275.

When the lower arm 271 is pivoted in this manner in response to tension being applied on the actuating cable, the upper arm 272 moves upwardly and the actuation rod contact surface 278 pushes actuation rod 264 upward (as illustrated). Axial movement of the actuation rod 264 then causes a corresponding axial movement of the translating plunger 296 (upwardly as illustrated) thereby 'opening' the piston valve 294. FIG. 8 shows actuator assembly 240 in a relaxed (closed) position. FIG. 9 shows actuator mechanism 240 in an actuated (open) position. Because plunger 296 translates into the upper chamber 282 containing gas and oil, the gas can compress as the plunger 296 moves into the upper chamber 282 therefore the force required to move plunger 296 is less than it would be if attempting to translate into chamber that contained oil/liquid. This arrangement can help facilitate the actuating of the piston valve 294, via the translation of plunger 296, with a substantially constant amount of force being required regardless of the axial position and/or relative loading of the inner tube 210 (or 110), e.g. where a plunging force required to translate the plunger 296 when the inner tube 210 is subjected to an axial load is within about 20%, and preferably within about 10% or 5% of the force required to translate the plunger 296 when the inner tube 210 is loaded (whether measured as tension on the cable, axial force acting on the actuator rod 264, feedback experienced by a rider at the remote triggering unit, or the like).

Once actuated (opened) plunger 296 translates upward and seal surface 296a of plunger 296 unseats from o-ring 297 and the neck 296b is sufficiently smaller in diameter that it does not seal against o-ring 297. In this example, when the plunger 296 is translated in this way a fluid flow path (including channel 299a, pathway 295b and channel 295a) is established within the piston valve 294 and between the chambers 281 and 282, and they are in fluid communication with each other. That is, oil from chamber 282 can travel through channel 299a, pathway 295b and channel 295a into chamber 281, and vice versa. As such when the piston valve 294 is actuated (open) relative axial movement is possible between cartridge rod 263 and inner tube 210. Relative axial movement between upper tube 210 and lower tube 220 is therefore also possible.

When cartridge 260 is actuated (opened), and inner tube 210 is urged towards its retracted position, it can reach a lower limit in outer tube 220 when upper tube lower surface 212 contacts upper tube stop surface 246. The travel or drop length of the post is then defined, in this example, by the distance 248 between lower end 212 of the inner tube 210 when it is in its extended position (FIG. 8) and the upper tube stop 246. The drop length is preferably long enough to allow the seat to be in a comfortable riding position when the dropper post is extended, and to be sufficiently lowered so as to not substantially interfere with the rider when the dropper post is retracted. In some examples, the drop length 248 can be at least 190 mm, 195 mm, 200 mm, 205 mm, 210 mm, 215 mm, 220 mm, 225 mm, 230 mm, 235 mm, 240 mm, 245 mm or more, and preferably may be between about 190 mm and about 230 mm, or between about 200 mm and about 225 mm.

If valve 294 remains open and the force urging tube 210 towards its retracted position ceases (e.g., if the rider is not sitting on the seat or otherwise pushing to try and retract the inner tube 210), then the locking spring cartridge assembly 260 in this example will bias the inner tube 210 to extend with an extension force $F_E$. In the illustrated configuration, the extension force $F_E$ is defined by the product of the air pressure P in chamber 182 and the cross-sectional area of rod diameter ($D_R$) 263b as shown in the following equation.

$$F_E = P \times \pi \left(\frac{D_R}{2}\right)^2$$

The inventor has determined that configuring the air within the second chamber 282 to be at a predetermined, operating pressure, can help dictate the magnitude of the extension force $F_E$ for a given spring cartridge assembly geometry, which can in turn help determine the perceived stiffness of the dropper post and the yield force as described herein. The operating pressure can be varied based on the specific geometry of a given dropper post to help obtain the desired performance, but in the illustrated example can be about 300 psi, and in other examples may be equal or less than 300 psi, such as between 200 psi and 300 psi, and preferably between about 250 psi and about 300 psi. In other examples, the operating pressure and relevant diameters (e.g., 291a/214 and 263b) can be selected for a given arrangement so that the extension force $F_E$ and other relevant forces and ratios described herein fall within the desired ranges.

One example of a suitable operating pressure P for the gas within chamber 282 that can be used for exemplary description purposes is an operating pressure of about 300 psi, and one example of a suitable $D_R$ would be 8 mm (0.315") Therefore the $F_E$ calculation would be as follows:

$$F_E = 300 \times \pi \left(\frac{0.315}{2}\right)^2$$

$$F_E = 23.37 \text{ lbs}$$

The inventor has discovered that the extension force $F_E$ under these conditions is sufficient to overcome the anticipated friction between inner tube 210 and outer tube 220 while the inner tube 210 is moved toward its extended position but is also low enough to allow the rider's body weight to overcome in order to urge inner tube 210 toward a retracted position while piston valve 294 is open. Preferably, the inventor has determined that the extension force $F_E$ should be between about 15 and 35 lbs and preferably may be between about 20 and 25 lbs. As noted herein, the parameters of any given spring cartridge assembly can be selected so that the resulting extension force $F_E$ is within this desired range.

Figure 10:
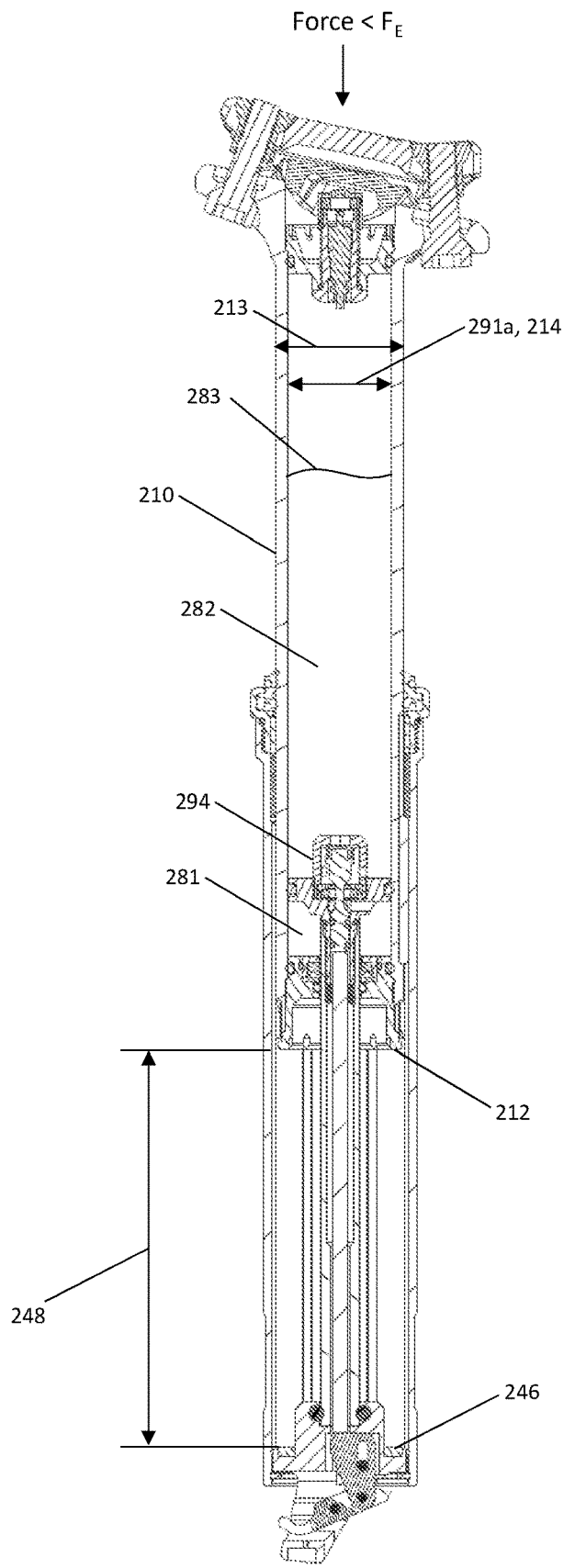
Figure 11:
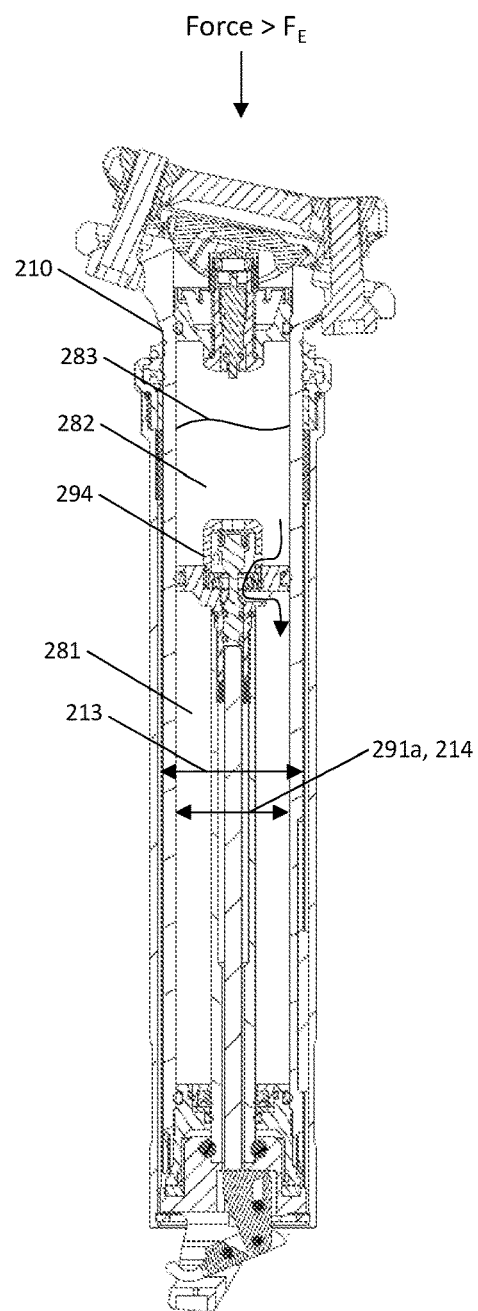

Referring also to FIGS. 10 and 11, the dropper post 200 is shown with its piston valve 294 in its open configuration, as it would be when a rider has triggered the actuator 240. With the dropper post 200 In this configuration, if the rider wishes to move the inner tube 210 to its retracted position (FIG. 11) the axial force applied to the inner tube 210 must exceed the extension force $F_E$ (and any friction forces and losses, which are considered to be negligible as compared to the main extension force). Once extension force $F_E$ threshold has been exceeded the inner tube 210 will proceed to translate towards a retracted position while oil is transferred from upper chamber 282 to lower chamber 281. FIG. 11 shows dropper post 200 in a fully retracted position.

FIGS. 12 and 13 show actuation mechanism 270 in its relaxed (closed) position and with the piston valve 294 in its closed position. In this arrangement, the fluid path between the upper chamber 282 and the lower chamber 281 is interrupted and the spring cartridge assembly 260 can be considered to be locked. When in this state, a force used to urge inner tube 210 towards a retracted position will place the oil in lower chamber 281 in tension, as moving the inner tube 210 downwardly relative to the piston valve 294 would lead to an to increase the volume of lower chamber 281, which would tend to lower the pressure acting on the liquid within the chamber 281. The generally incompressible nature of the liquid in the lower chamber 281 will tend to resist such movement while the piston valve 294 is closed. The combination of the liquid and gas in the upper chamber 282 may also tend to resist such relative movement of the piston valve 294 into the upper chamber 282 and compression of the interior of the upper chamber 282. However, because the gas in the upper chamber 282 is relatively compressible, the resistance to the movement of the piston valve 294 provided by the upper chamber 282 may be less than the resistance provided by the lower chamber 281.

In this arrangement (e.g., while the piston valve is closed and the spring cartridge assembly is locked) the inner tube 210 will remain substantially, axially fixed relative to outer tube 220 (and piston valve 294) until a sufficient force is applied to overcome the tensile, resistive force that is generated by the oil under tension in lower chamber 281. That is, the spring cartridge assembly will provide a resistive force that opposes axial movement of the inner tube when the spring cartridge assembly is locked, and in particular a resistive force that will oppose the retraction of the inner tube 210 (e.g., will oppose movement of the inner tube 210 toward the retracted position). If a sufficiently large force is applied to the inner tube 210 that the magnitude of the applied force exceeds the resistive force of the cartridge, then relative motion between the piston 294 and the cylinder can occur, which will then result in an expansion of the volume of the chamber 281 which in turn lowers the vapour pressure within the chamber 281 and can pull dissolved gas(es) out of solution from the oil within chamber 281. This resistance force that opposes axial movement of the inner tube when the spring cartridge assembly is locked can be referred to as a degassing force ($F_D$), and a force that exceeds the degassing force can be referred to as an overload force. The inventor has determined that the degassing force should preferably be between about 80 and 160 lbs and preferably between about 90 lbs and 140 lbs or between 90 and 120 lbs, and more preferably is less than 100 lbs, and is between 90 and 100 lbs. This range of forces has been found to offer a satisfactory rider experience and seat feel, while also allowing the seat post to yield when subjected to the overload forces as described herein. The inventor has also determined that this degassing force ($F_D$) can be a function of the geometry of the spring cartridge assembly 260 and can be expressed as a force multiplier ($M_F$) of extension force ($F_E$) of a given cartridge, according to the relation below:

$$F_D = M_F \times F_E$$

To obtain a desired balance of extension and degassing forces in a commercial dropper post, the inventor has determined that the desired for force multiplier $M_F$ value may be between 3 and 6 and may preferably be between 4 and 5.

Using these novel parameters, if, in one example, a low-end of extension force $F_E$ range may be about 15 lbs, which if multiplied by an $M_F$ of 6 could result in a force $F_D$ of about 90 lbs. If the cartridge is designed so that the extension force $F_E$ is toward the higher end of preferred range and is about 35 lbs, which if multiplied by an $M_F$ of 3 this would result in a degassing force $F_D$ of about 105 lbs.

When developing the present inventions, the inventor further determined that the force multiplier ($M_F$) is also proportional to the quotient of sliding surface diameter ($D_S$) 291a of the spring cartridge assembly upper tube 261 and rod diameter ($D_R$) 263b. That is:

$$M_F \propto \left(\frac{D_S}{D_R}\right)$$

Preferably, when constructing dropper posts in accordance with the present teachings, the sliding surface diameter $D_S$ may be between about 18 and 25 mm and preferably between about 20 and about 23 mm, as this may help provide a dropper post of a reasonable size that may fit many standard bicycles. The inventor has determined that acceptable rod diameters $D_R$, e.g., that provide a suitable level of strength while still fitting into the other size limitations and area ratios that are used to provide the desired performance of the dropper posts described herein, may optionally be between about 6 and 10 mm and preferably between about 7 mm and about 9 mm.

As one of the factors that can be balanced in a given dropper post embodiment, the ratios of sliding surface diameter $D_S$ to rod diameter $D_R$ may therefore be between about 1.8 (18 divided by 10 or 18/10) and 4.17 (25 divided by 6 or 25/6), between about 2.22 (20 divided by 9 or 20/9) and about 3.29 (23 divided by 7 or 27/3) and preferably about 2.625 (21 divided by 8).

Figure 15:
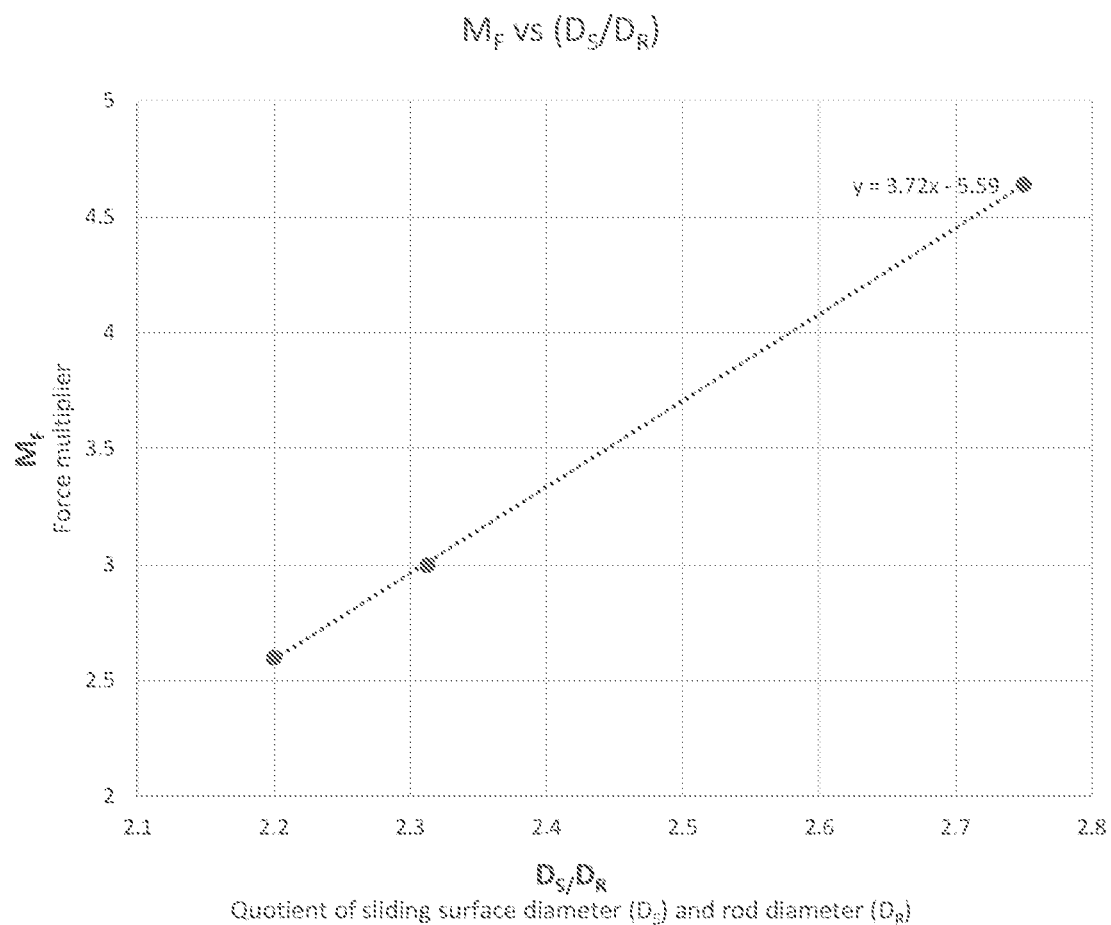
FIG. 15 is a graph showing $M_F$ vs $(D_S/D_R)$.

Based on one known experimental data set that was obtained from a publication entitled Lockable Gas Springs "Gas Top" produced in 2021 by Vapsint(R) Gas Springs and Dampers, and available at, the force multiplier ($M_F$) versus the quotient of sliding surface diameter ($D_S$) 291a and rod diameter ($D_R$) 263b can be expressed as graph of $M_F$ vs ($D_S/D_R$) as shown in FIG. 15.

One way of determining the force multiplier $M_F$ can be further defined based a line of best fit from the graph in FIG. 15 as:

$$M_F = 3.72\left(\frac{D_S}{D_R}\right) - 5.59$$

While fitting different lines of best fit may produce slightly different slope and y-intercept values, the inventor has determined that the preferred spring cartridge assembly performance can be obtained using values that are not materially different than those provided herein. That is, the $M_F$ for a given example may be within about 10% of the value of the line of best fit equation.

One exemplary calculation for force multiplier $M_F$ using this experimental line of best fit and a ratio of sliding surface diameter $D_S$ to rod diameter $D_R$ of 2.625 (from above) is:

$M_F = 3.72(2.625) - 5.59$ $M_F = 9.77 - 5.59$ $M_F = 4.18$

While allowing for some variation in the constants in this example equation, the $M_F$ that is within about 10% of this calculated value may be between about 3.76 and about 4.6. Given these exemplary ratios above of sliding surface diameter $D_S$ to rod diameter $D_R$, force multiplier $M_F$ may be calculated as being between about 1.11 ($D_S/D_R = 1.8$) and 9.91 ($D_S/D_R = 4.17$), between about 2.67 ($D_S/D_R = 2.22$) and about 6.65 ($D_S/D_R = 3.29$) and preferably about 4.18 ($D_S/D_R = 2.625$). Based on this, the preferred force multipliers $M_F$ may be between 3 and 6 and may preferably be between 4 and 5.

In these illustrated examples, if, while the piston valve 294 is closed and the spring cartridge assembly is considered to be locked, inner tube 210 is urged towards its retracted position with a force that less than degassing Force $F_D$, inner tube 210 will remain axially fixed with outer tube 220. This can help facilitate the desired rider experience and the desired feeling of solidity and stability of the dropper post. However, when the force urging the inner tube 210 toward its retracted position exceeds the degassing force $F_D$ (and any associated losses, friction forces and the like), dissolved air is pulled out of solution within lower chamber 281. Small air bubbles 285 form in lower chamber 281 and this can allow a relatively small amount of relative axial movement of the inner tube 210 relative to the piston valve 294, shown as the overload cushion distance 284 (as shown in FIGS. 12 and 13). Preferably, the overload cushion distance 284 is less than the expected drop length 248 of the dropper post 200, and more preferably may be at least, and optionally can be between about 1 mm and 40 mm or between 10 mm and about 30 mm and can between about 0% and about 20% of the travel length 248, and preferably can be between about 5% and about 15% of the travel length 248 to help provide a desired deflection or cushioning. This axial movement 284 therefore acts as a cushion if a rider overloads the post, such as while when riding or during a crash. Once the force urging inner tube 210 toward the retracted position drops back below the degassing force $F_D$, the air bubbles 285 can go back into solution and the inner tube 210 returns to its original height (FIG. 12).

FIG. 12 further shows the location of a plane A, illustrated when the inner tube 210 of dropper post 200 is in its extended position. The plane A in this arrangement is at a location that is located along the length of the inner tube 210 and is adjacent the upper end of outer tube 220 and seat collar 230. The moment of inertia at plane A relates to the strength of inner tube 210 for a given material and load. This location, adjacent the seat collar 230 is a location where the inner tube 210 may be subjected to relatively high bending loads, as the portions of the inner tube 210 that are below the seat collar 230 are nested in and supported by the outer tube 220, while portions of the inner tube 210 that are exposed above the seat collar 230 are not supported in the same manner. Providing an inner tube 210 that is sufficiently strong at this location can help resist bending of the inner tube 210 when in use and extended.

In addition to conforming with the multiple geometric parameters described herein to provide the desired spring cartridge assembly parameters, the moment of Inertia lx for inner tube 210 at Plane A is defined by tube outer diameter $D_{TO}$ and tube inner diameter $D_{TI}$ as follows:

$$I_x = \frac{\pi(D_{TO}^4 - D_{TI}^4)}{64}$$

To help the dropper post 200 fit with standard bicycle tubes, the inner tube outer diameter $D_{TO}$ may be 25.5-30 mm and preferably is about 26-28 mm. The ratio of tube inner diameter $D_{TI}$ to tube outer diameter $D_{TO}$ may preferably be less than about 82.5% and preferable less than about 80%.

For example, the moment of inertia lx for one preferred embodiment would have a diameter $D_{TO}$ of about 26 mm and a diameter $D_{TI}$ of about 20.8 mm (80% of diameter $D_{TO}$). The resulting moment of inertia calculation would be as follows:

$$I_x = \frac{\pi(26^4 - 20.8^4)}{64}$$

$$I_x = \frac{\pi(269{,}798.6)}{64}$$

$$I_x = \pi(4215.6)$$

$$I_x = 13{,}243.7 \text{ mm}^4$$

Similarly, the inventor has discovered that the moment of inertia lx for the preferred ranges of tube outer diameters DTO and tube inner diameters DTI described herein may be between about 11,140 mm 4 (DTO=25.5, DTI=21.0 (82.5% of diameter DTO)) and about 23,474 mm 4 (DTO=30, DTI=24.0 (80% of diameter DTO)).

FIG. 14 shows the cross section of inner tube 210 taken at Plane A of the illustrated embodiment and includes an inner tube outer diameter (DTO) 213 and inner tube inner diameter (DTI) 214 as two co-axial diameters. While in these examples the tubes 210 and 220 are shown as being circular in cross-sectional shape, other shapes and be used including ovular, non-coaxial circles or various sided polygons and the moment of inertia calculation would change to another known formula, but analogous ratios could be utilized.

Using the preferred geometries of the tubes 110 and 210 that can help provide the desired areas and forces described herein, the inventor has discovered that the moment of inertia at plane A for such designs may be greater than about 11,000 mm$^4$, and in some more preferred examples can be greater than about 13,000 mm$^4$. Similarly, the tube outer diameter $D_{TO}$ may be 25.5-30 mm and preferably 26-28 mm, and therefore the ratio of tube inner diameter $D_{TI}$ to tube outer diameter $D_{TO}$ may be less than about 82.5% and preferable less than about 80%, and the ratio of lx of inner tube 210 (in mm$^4$) at plane A to the force multiplier $M_F$ (IX/$M_F$) may define a ratio described herein as the cushion quotient $Q_C$, and the inventor has determined that preferred examples of the dropper posts described herein can have a cushion quotient that is equal to or greater than about 2400 mm$^4$, 2500 mm$^4$, 2600 mm$^4$, 2700 mm$^4$ or more. The table below shows moment of inertia, force multiplier and cushion quotient values for two examples dropper posts considered by the inventor.

| Post | $D_{TI}$ (mm) | $D_{TO}$ (mm) | $D_S$ (mm) | $D_R$ (mm) | Ds/Dr | $M_F$ | Operating pressure (psi) | $F_E$ (lbs) | $F_D$ (lbs) | Ix at Plane A (mm$^4$) | Cushion Quotient Ix/$M_F$ (mm$^4$) |
|---|---|---|---|---|---|---|---|---|---|---|---|
| 1 | 26 | 20.8 | 20.8 | 8 | 2.6 | 4.082 | 300 | 23.37 | 95.41 | 13243.70 | 3244.41 |
| 2 | 28 | 24 | 24 | 8 | 3 | 5.57 | 300 | 23.37 | 130.19 | 13885.83 | 2492.96 |

As described herein, dropper seat posts usually consist of an inner (upper) tube and an outer (lower) tube that selectively move relative to each other is a telescoping fashion. This allows the rider to change the height of their seat without having to stop and adjust a mechanically tightened seat post collar. It is advantageous to lower the bicycle seat as far as possible when riding through technical terrain to allow the rider to change body position or bend their knees deeply without contacting the seat.

Modern dropper post locking spring cartridge assemblies are typically configured with two or more chambers containing liquid (i.e., hydraulic oil), gas (i.e., air) or a combination thereof. There is typically an internal piston valve controlled by an actuator/remote and an actuation rod translatable between an open and a closed position. When the piston valve is closed and a rider sits on a seat attached to the top of the post, the chamber containing, by design, only oil is placed in compression thereby allowing the post to be loaded without retracting.

A locking spring cartridge assembly typically consists of at least a cartridge outer tube and a cartridge rod. In some configurations the cartridge outer tube may be fixedly attached to the upper end of the seatpost inner tube by some form of suitable fastener. The cartridge rod may also be fixedly attached to the lower end of the seatpost lower tube and/or to the actuator body. When a valve inside the locking spring cartridge assembly is opened the cartridge outer tube can translate relative to the cartridge rod in a telescoping fashion. In this configuration the cartridge outer tube moves with the seatpost inner tube, and the cartridge rod moves with the seatpost outer tube. When the cartridge valve is selectively closed relative movement between the seatpost inner and outer tube ceases to be possible.

Dropper seatposts are typically sold in multiple drop lengths within a given model of a given manufacturer. For example, OneUp Components sells a "Dropper post V2" product in drop lengths on 90 mm, 120 mm, 150 mm, 180 mm, 210 mm, 240 mm. Because the outer diameter of known cartridges is the same for all drop lengths the inner diameter of the inner post tube is also the same because it is usually sized to fit/accommodate the specific cartridge outer diameter. The outer sizes/diameters of components of a dropper seatpost are also usually constrained by other practical factors, such as having to fit within the relatively standard sized tubes on a bicycle frame. Therefore, the inner post tubes on conventional dropper seat posts typically have the same inner post tube diameters and wall thicknesses for different drop lengths.

However, the drop length is also correlated to the bending stress the inner tube is exposed to during riding, as described in more detail herein, with relatively longer inner tubes that can provide relatively longer drop lengths being subjected to relatively larger bending stresses when in the raised configuration, as compared to a shorter tube having a shorter drop length. Due to the practices described above where long and short inner post tubes are formed with the same diameters and wall thicknesses, the inner post tubes for a given manufacturer that are intended to be used with a given spring cartridge assembly are conventionally designed to be able handle the highest expected loads—i.e. the situation that would be faced by a long inner post tube—even if the inner post tube in a specific dropper post assembly is a shorter post with a shorter travel length. This means that relatively shorter inner tubes that are to be used on relatively shorter dropper posts can have thicker sidewalls and are manufactured with more material (and therefore have a higher weight) than would be required to only support the expected bending forces on a short inner post tube due to the relatively higher bending strength requirements and extra material/wall thickness needs of the longer inner post tubes sized to fit the same spring cartridge design.

Figure 16:
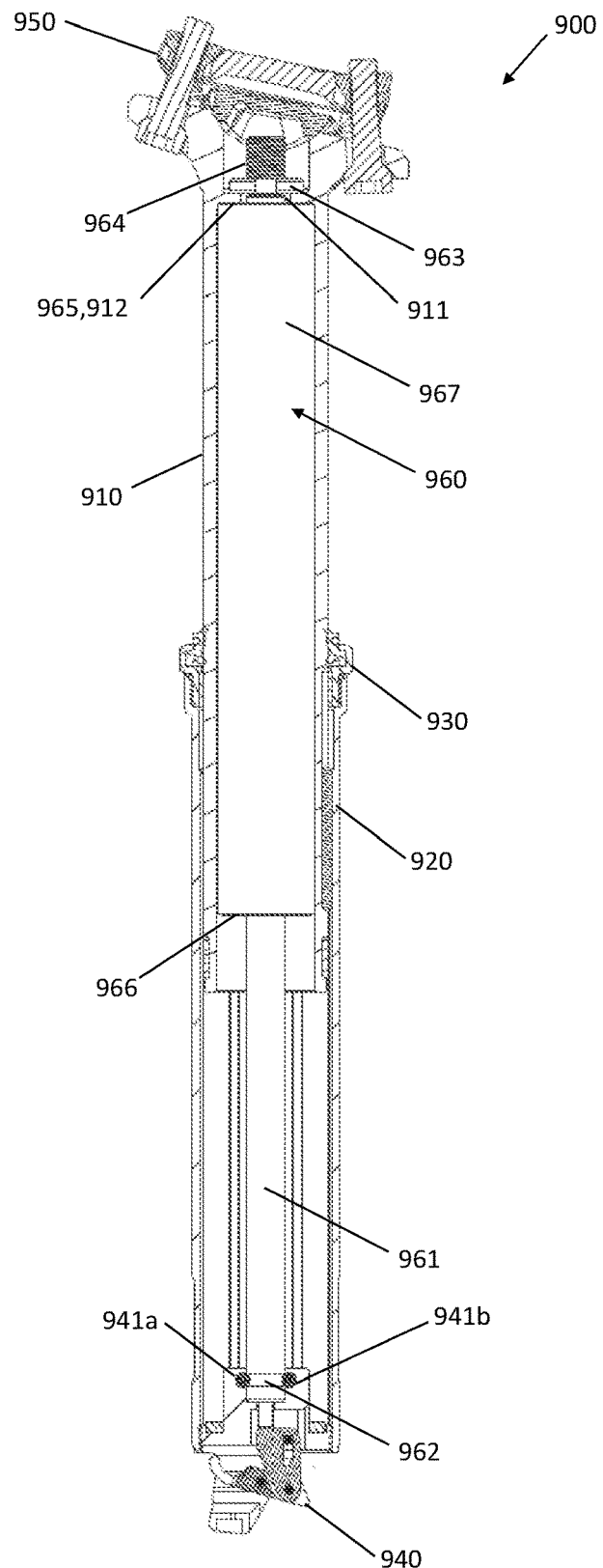
FIG. 16 is a partial cutaway view of one example of a dropper post assembly in which a spring cartridge is mounted in a manner that is known in the prior art.

FIG. 16 is a cross-sectional view of one example of a dropper post 900 having an outer tube 920, collar 930 and an inner tube 910 in which a spring cartridge 960 is mounted in a manner that is known in the prior art shows an example of prior art. In this configuration, threaded protrusion 964 of the upper end 965 of cartridge 960 extends through aperture 911 of seat post inner tube 910. Nut 963 may be used to interface with threaded protrusion 964 of the upper end 965 of cartridge 960. Cartridge upper end 965 is thereby pulled into contact with flange 912 of tube 910. Groove 962 of rod 961 interfaces with fasteners 941*a* and 941*b* to fixedly attach rod 961 to actuator 940.

In this illustrated example the cartridge outer tube 967 and rod 961 are not rotationally fixed to each other about their respective, longitudinal axes (the vertical direction as illustrated in FIG. 16). Cartridge upper tube 967 and threaded protrusion 964 that are part of the cartridge 960 may tend to rotate relative to the inner tube 910, including when trying to tighten or loosen the nut 963. With other portions of the cartridge 960, including specifically the cartridge outer tube 967, being generally inaccessible to the user during this process it can be quite difficult to tighten or loosen the nut 963 because a user cannot easily hold the cartridge outer tube 967 in a fixed position (i.e. it will tend to rotate with the nut 963), even if the user were to hold rod 961 because rotation of the rod 961 relative to the cartridge outer tube 967 is possible.

Also, in this illustrated example it is very difficult, if not impossible to access the nut 963 with appropriate tools or the hands of a user when the seat clamps 950 (and a seat thereon) are installed as shown in FIG. 16. Accordingly, in this illustrated example the nut 963 can only be practically accessed by removing seat clamps 950.

In this illustrated example the lower end 966 of cartridge outer tube 967 is not constrained or fixed relative to the inner surface of the inner tube 910. As such, if the inner diameter of inner tube 910 and the outer diameter of cartridge upper tube 967 are not selected to be substantially the same size there can be an increased risk of cartridge 960 buckling or rattling within inner tube 910 while the seat post 900 is in use. This condition may lead to the seatpost inner tube 930, cartridge outer tube 967 or both needing to be designed to be heavier than required in order to reduce the gap between their respective diameters as described herein.

Referring to FIGS. 17-30, another example of a dropper post assembly 300 for supporting a bicycle seat (not shown) is illustrated. Many aspects of the seat or dropper post assembly 300 are analogous to the dropper post assembly 100 and like features are illustrated using like reference characters indexed by 200. Notably, the design of the locking spring cartridge assembly 360 differs somewhat from the design of the locking spring cartridge assembly 160 and the manner that the locking spring cartridge assembly 360 is connected to the rest of the assembly (notably the inner post tube 310) is different than in other embodiments described herein. Portions of the inner post tube 310 are accordingly different than portions of the inner post tube 110 with regards to how the cartridge 360 engages the inner post tube 310, but the inner post tube 310 can otherwise operate in a manner that is analogous to the inner post tube 110. However, the internal operation of the cartridge 360 can be analogous to the operation of cartridge 160 and is consistent with the descriptions herein. In addition to the differences in the attachment features of the cartridge 360, the dropper post assembly 300 can operate in substantially the same manner as seat post 100 but may have some slightly different components and configurations as a result of the design of cartridge 360 or other factors that do not materially alter how the posts 100 and 300 operate. Similar functioning components on dropper post assembly 300 will now be described using characters indexed by 200 (i.e., 110 is now 310).

In this example, the dropper seat post assembly 300 includes an inner tube 310, seat clamps 350 disposed at an upper end of the inner tube 310 for connecting to a bicycle seat (not shown), an outer tube 320, a seat collar 330, an actuator assembly 340, including actuator mechanism 370, and a locking spring cartridge assembly 360.

Referring to FIGS. 19-24, in this example the locking spring cartridge assembly 360 that is suitable for use with the dropper posts described herein includes a cartridge outer tube 361 that has a sidewall with an inner surface that can be engaged by portions of the cartridge and can form part of the boundary of internal cartridge chambers and/or may be part of the sealing structures. The locking spring cartridge assembly 360 also includes a cartridge rod 363, locking groove 365 and compatible actuator rod 364

In this example, the inner surface of the cartridge outer tube 361 can be referred to as an inner sliding surface 391 that defines a sliding surface diameter 391*a*. The outer surface of the cartridge outer tube 361 defines a cartridge outer diameter 400, which in the illustrated example is substantially constant along the axial length of the cartridge outer tube 361 (but which could vary along its length in other examples).

Figure 33:
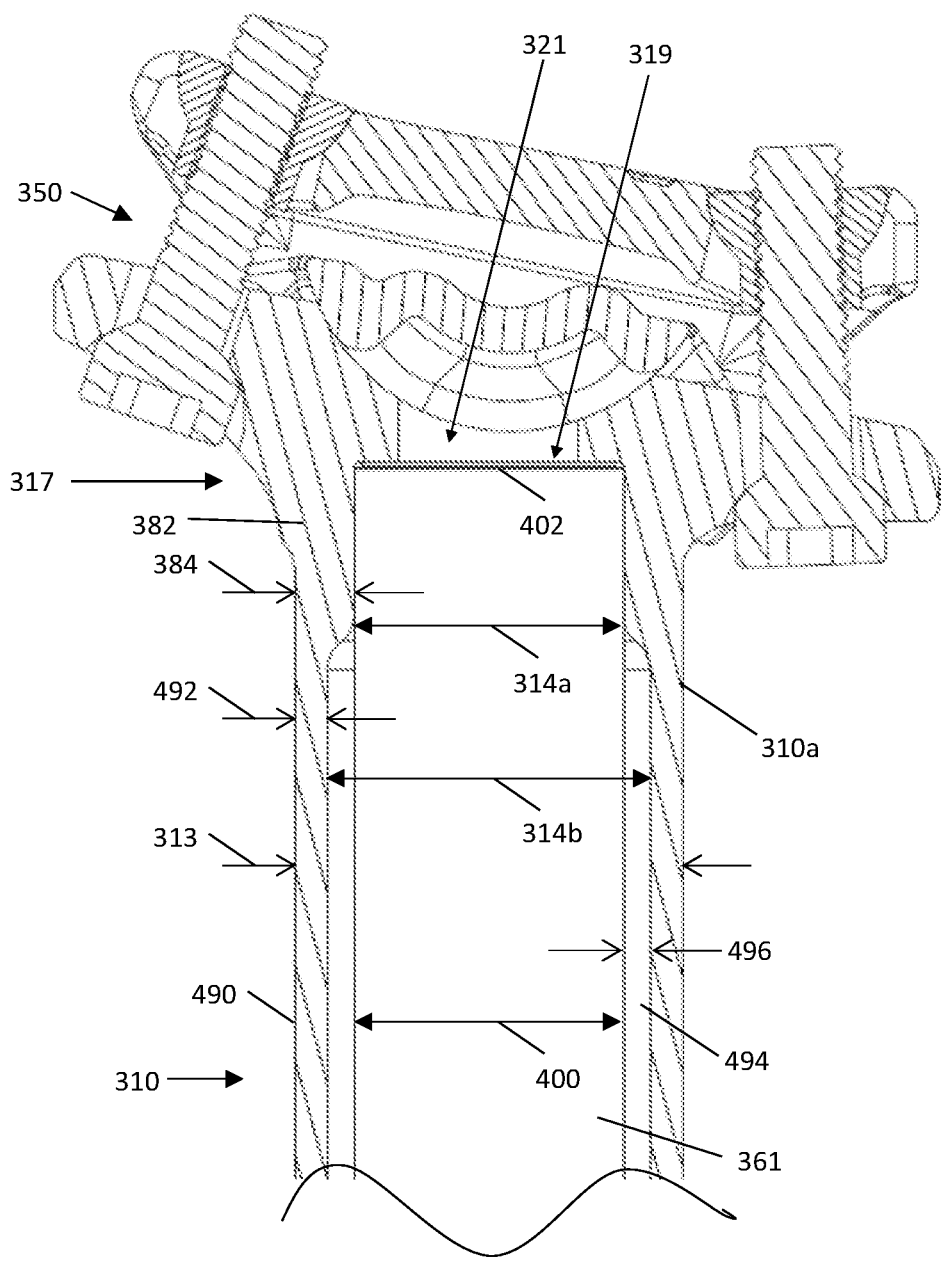
FIG. 33 is an enlarged view of a portion of FIG. 32.

The cartridge outer tube 361 also includes an upper end wall with an upper cap surface 402 that covers and optionally seals an upper end of the cartridge outer tube 361 and that does not need to include the upper connection portion (such as portion 162 described herein) because the connection between the outer cartridge tube 361 and the inner post tube 310 is different in this example. That is, the upper cap surface 402 can be any desired configuration, including a substantially flat, planar surface as illustrated in this example. The upper cap surface 402 could also have other configurations, including non-planar configurations, which are desirable to interface with a given inner post tube 310, but preferably the the upper end 404 of the outer cartridge tube 361 does not include a fastening mechanism for connecting the cartridge to the inner tube 310. Preferably, this means that the upper end 404 of the cartridge tube 361 does not include a fastening mechanism that is configured to engage the inner tube in a manner that would restrain axial movement of the cartridge relative to the inner tube, even in arrangements where there is some physical engagement between the upper end of the upper end 404 of the cartridge tube 361 and the inner post tube 310 and/or where the inner post tube 310 provides at least some lateral/radial restraint on the cartridge tube 361. Providing an upper end 404, including upper cap surface 402, that is substantially flat as illustrated may help reduce the overall axial length of the cartridge outer tube 361. In this example, the upper cap surface 402 forms the axially upper most or outer most portion of the cartridge outer tube 361 (and of the entire cartridge 360) and is configured such that is disposed within the interior of the inner post tube 310 and does not extend axially beyond the upper end of the inner post tube 310 and need not be accessible from the upper end of the inner post tube 310. This may help reduce the overall length of the cartridge 360 and may help simplify construction of the cartridge post tube 361 or inner post tube 310. In this arrangement, the entirety of the cartridge post tube 361, and of the locking spring cartridge assembly 360 is located axially below and inboard the upper end 317, and the inward facing surface of the upper end wall 319 of the post inner tube 310. The upper end of the post inner tube 310 may optionally include a recess 321 (FIG. 33) that connects to its interior or may be a solid upper wall that covers and seals the upper end 317 of the post inner tube 310.

The cartridge outer tube 361 is preferably connectable to the inner tube 310 in a manner that is sufficiently strong enough to carry the forces described herein, and that allows the inner tube 310 to move with the cartridge outer tube 361. In the illustrated example, instead of an upper connection portion (such as upper connection portion 162) that is configured to attach the cartridge 360 to an upper end of the post inner tube 310, the dropper post assembly 300 is configured such that the connection between the outer cartridge tube 361 and the inner post tube 310 is provided toward the lower end 406 of the outer cartridge tube 361 and toward the lower end of the inner post tube 310 as described herein. That is, in this example the inner post tube 310 includes a suitable tube engagement member that is configured to engage, and preferably removably or releasably engage with a complimentary second or cartridge-related engagement member. When the tube engagement member and second engagement member are engaged with each other, then the cartridge outer tube 361 is fixed relative to, and movable axially along with, the inner post tube 310, and when the tube engagement member and second engagement member are disengaged from each other, then the cartridge outer tube 361 is movable relative to, and preferably axially removable from, the inner post tube 310.

The tube engagement member can be any suitable structure and optionally be integrally formed with the post inner tube 310 or may be provided as a separate member that can be connected to the post inner tube 310. In this example, referring to FIGS. 20 and 22, the tube engagement member includes threads 408 that are formed in the inner surface of the post inner tube 310, at its lower or inner end 312. Other structures are possible.

The second or cartridge related engagement member can be any structure that is compatible with the corresponding tube engagement member, such as threads that can engage the tube threads 408. Optionally, as shown in this example, the dropper post assembly 300 can include a separate fastening member that is configured to include an appropriate second or cartridge related engagement member and that can be fastened and unfastened to secure or release the spring cartridge assembly 360 relative to the post inner tube 310. Providing the second engagement member on a separate fasting member, instead of having it integrally formed on the cartridge outer tube 361 for example, may help simply the construction of the cartridge 360 and may allow the walls of the cartridge outer tube 361 to be relatively thinner or smooth as compared to what would be required if a fastening element was integrated into the sidewall.

For example, referring also to FIGS. 20, 25-26 and 34, in the present example the dropper post assembly 300 has a fastening member in the form of a cartridge lockring 420 that includes one example of a suitable second engagement member in the form of outer threads 422 that are sized and configured to mesh with the inward facing threads at the lower end 312 of the post inner tube 310.

Figure 34:
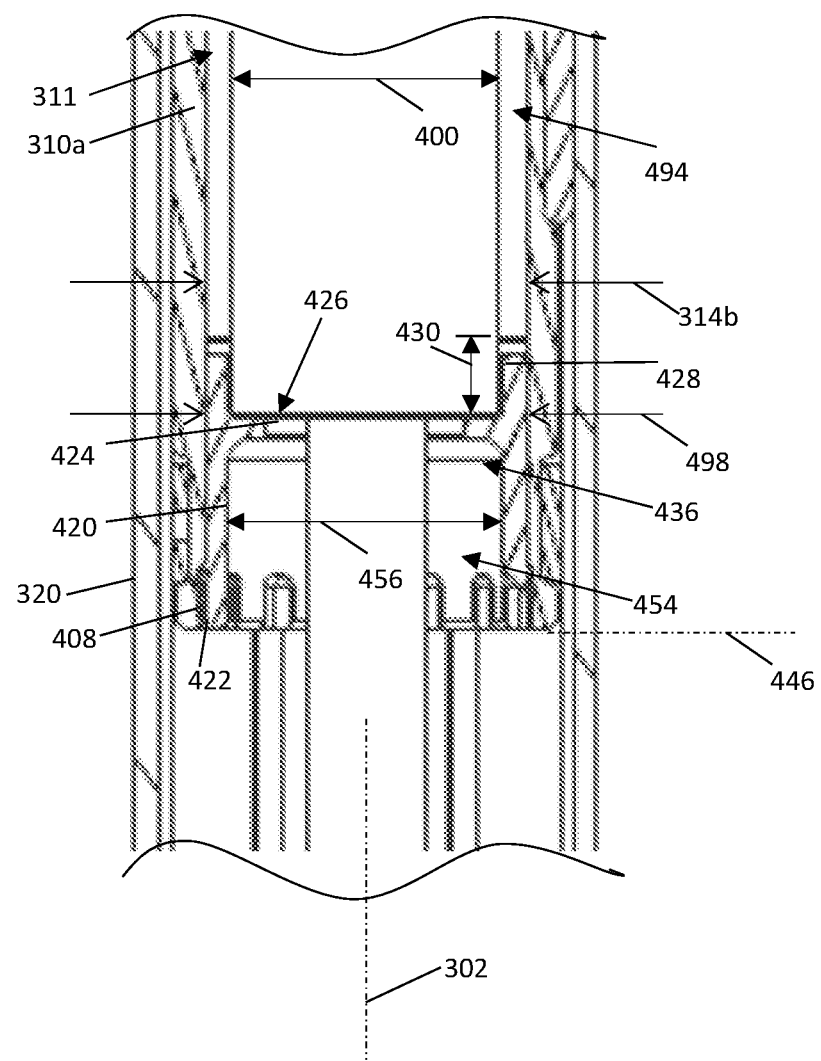
FIG. 34 is an enlarged view of a portion of FIG. 31.
Figure 37:
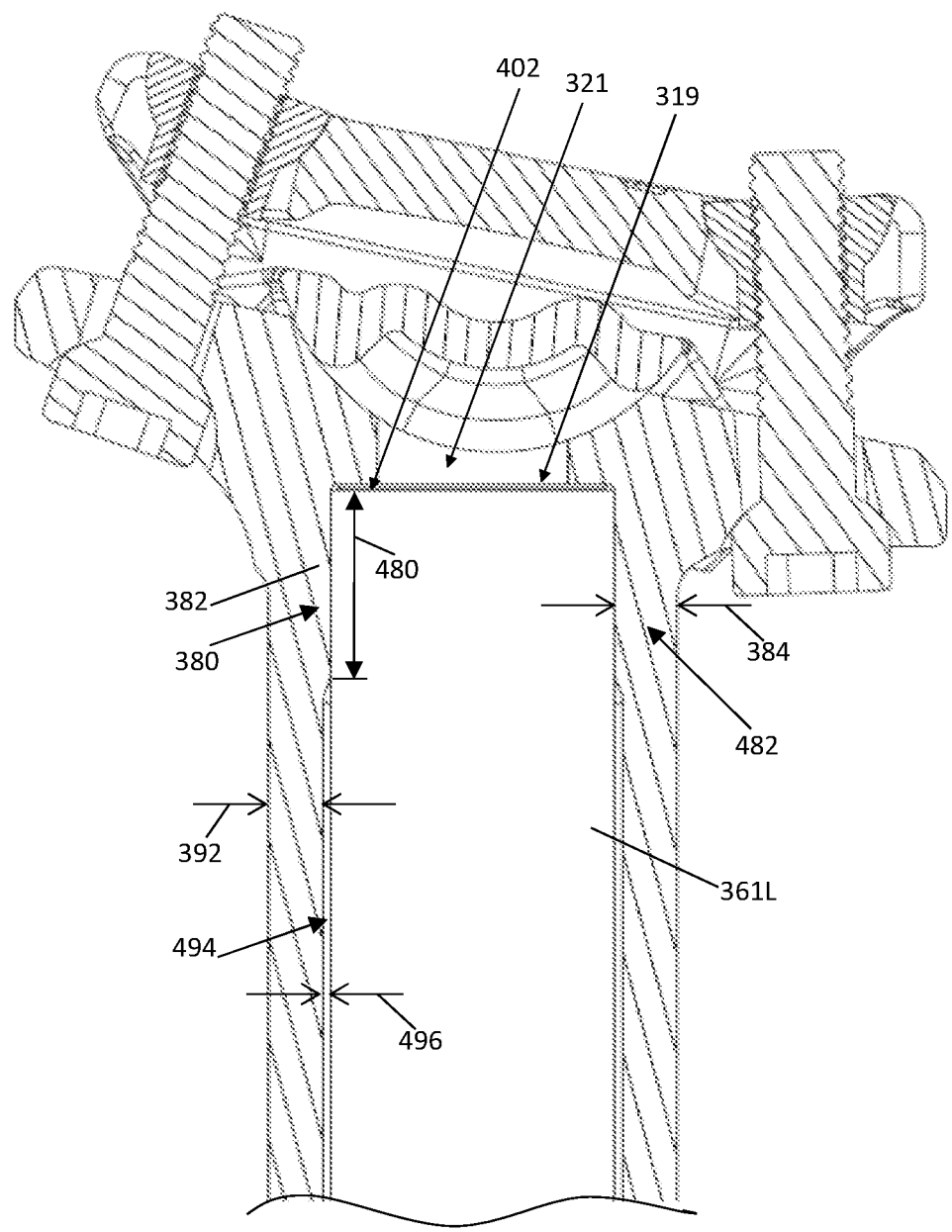
FIG. 37 is an enlarged view of a portion of FIG. 36.

In this example, the lockring 420 is configured to be removably insertable in the lower end 312 of the inner tube 310, by threading and unthreading the threads 422. In addition to the second engagement member, the lockring 420 also includes other suitable abutment and retaining features to interface with the cartridge outer tube 361 and post inner tube 310 and also to accommodate the extension of other cartridge features, such as the cartridge rod 363 when the lockring 420 is in place. In this example, the lockring 420 has an abutment surface 424 that is positioned to face and bear against an opposing lower surface on the cartridge outer tube 361 when the lockring 420 is installed as shown in FIG. 34 (for example). In this arrangement, when the fastening member, such as lockring 420, is inserted into the lower end 312 of the inner tube 310 the abutment surface 424 bears against lower surface 426 thereby urging the cartridge outer tube 361 axially upward. When the lockring 420 is tightened, the cartridge outer tube 361 is compressed axially between the abutment surface 424 and the inner surface 319 at the upper end 317 of the post inner tube 310. This arrangement can help inhibit, and preferably stop any relative axial movement between the cartridge outer tube 361 and the post inner tube 310 when the lockring 420 is installed.

Optionally, the fastening member, such as the lockring 420 or analogous member, may only be configured to engage the cartridge outer tube 361 in the axial direction. Alternatively, it may be preferable for the fastening member to also provide at least some degree of lateral alignment and/or restraint for the cartridge outer tube 361 when the fastening member is installed. This may help align the cartridge outer tube 361 relative to the post inner tube 310 and/or may help keep a lower end of the cartridge outer tube 361 laterally centred (or otherwise positioned) relative to the lower end 312 of the post inner tube 310 when the fastening member is installed and the dropper post assembly 300 is in use. This may help prevent misalignment, buckling and/or rattling of the cartridge 360 relative to the inner tube 310.

In the illustrated example, the lockring 420 is configured to also help laterally constrain the movement of at least the lower end 406 of the cartridge outer tube 361 relative to the post inner tube 310. In this example, the lockring 420 has a lateral alignment member in the form of a captive sidewall 428 that extends axially away from the abutment surface 424 by a captive wall height 430. Together, the abutment surface 424 and captive sidewall 428 cooperate to least partially define a tube recess 432 at the upper end of the lockring 420 that is sized and shaped to closely receive and to accommodate the lower end 406 of the cartridge outer tube 361. When the lockring 420 is installed, as shown in FIG. 34, at least a portion of the captive sidewall 428 is located laterally (radially) between the cartridge outer tube 361 and the sidewall 310a of the post inner tube 310.

In this arrangement, the captive sidewall 428 laterally surrounds the tube recess 432 and defines a recess diameter 434. The recess diameter 434 can be any suitable diameter, and preferably is substantially the same as an outer diameter 400 of the cartridge outer tube 361. This can help provide a relatively snug fit between the cartridge outer tube 361 and the captive sidewall 428, and lockring 420, so that the lateral movement of the lower end 406 of the cartridge outer tube 361 relative to the lockring 420, and also between the lower end 406 of the cartridge outer tube 361 the lower end 312 of the post inner tube 310 is inhibited, and preferably eliminated.

Other portions of the lockring 420 can be sized and shaped to accommodate or receive other positions of the cartridge 360 or other components of the dropper post assembly 300. For example, in this embodiment the lockring 420 is configured as a generally annular or ring-like member having a central aperture 436 through which the cartridge rod 363 can extend when the lockring 420 is in place. That is, the aperture 436 a rod aperture that is sized to laterally surround and axially receive the cartridge rod 363 when the lockring 420 is inserted. In this configuration, the abutment surface 424 is configured as an annular or ring-like surface that at least partially laterally surrounds the rod aperture 436. While the abutment surface 424 is shown as a generally continuous surface in the illustrated example it could alternatively include gaps or other non-uniform features.

Preferably, the lockring 420, or other fastening member, can be configured so that when it is installed within the assembly 300 it is at least partially nested within the interior of the post inner tube 310. This may help reduce the overall axial length of the combination of the post inner tube 310 and the cartridge outer tube 361 and the associated fastening members. Reducing the overall, assembled length of these components may help reduce the overall size of the assembly 300 and may help facilitate desired drop lengths and performance. More preferably, at least 50%, 60%, 70%, 80%, 90%, 95% and/or 100% of the fastening member can be axially nested within the interior of the post inner tube 310 when the fastening member is installed.

For example, in this embodiment the lockring 420 is configured so that the threads 422 are disposed toward a lower end 440 of the lockring 420 and the abutment surface 424 is disposed axially toward an opposing, upper end 442 of the lockring 420. In this arrangement the abutment surface 424 is axially between the ends 440 and 442 and is axially above and inboard from the threads 422 when the lockring 420 is in use.

With the threads 422 located toward, and preferably at the lower end 440, the lockring 420 is configured so that the entire lockring 420 is nested axially within the post inner tube 310 when it is installed. That is, the lockring 420 is located such that it is located above or intersects a plane 446 (FIG. 34) that is defined by the lower face/end of the post inner tube 310. In other arrangements portions of the lockring 420 could extend below the plane 446.

To help install and remove the lockring 420 the post assembly can include a suitable driving tool that is compatible with the lockring 420. A convention screwdriver or the like may not be the most appropriate driving tool because the lower end 440 of the lockring 420 does not have solid surface. Instead, the lower end 440 includes the rod aperture 436. To help facilitate driving, in this example, an inner surface 450 of the lower end 440 of the lockring 420 includes a drive portion 452 that is configured to be engaged by a corresponding driving tool used to secure the lockring 420 within the post inner tube 310. This drive portion 452 extends around the perimeter of a lower recess 454 that has an inner diameter 456 and an axial length 458. This lower recess 454 can accommodate other portions of the assembly and, for example, when the inner post tube 310 is in its retracted position at least a portion of the actuator 340 that is at the lower end of the post outer tube 320 can be received within the lower recess 454, such that the lockring 420 at least partially overlaps the actuator 340 when the inner post tube 310 is retracted (such as in a configuration that is the same as shown in FIG. 1). This may help provide a relatively longer drop length/travel distance for the inner post tube 310 as compared to an arrangement in which the lockring 420 does not axially overlap with the actuator 340.

To help ensure the lower recess remains relatively clear and unobstructed to provide the desired clearance for the cartridge rod 363 and nesting of other components (such as the actuator 340), the drive portion 452 in this example includes a plurality of axially extending grooves 460 spaced apart from each other around a perimeter lower recess 454. To engage the grooves 460 of the drive portion 452, a compatible driving tool, such as tool 462, can have a plurality of corresponding tool splines 464 designed to engage the grooves 460 and a mounting portion 466 that is configured to be engaged by a driver (not shown), such as a wrench, spanner wrench, fingers, pliers/grips/channel locks, a ratchet or the like. Like lockring 420, the drive tool 462 preferably includes an axial aperture 470 that extends through the body of the drive tool 462. The aperture 470 is sized to allow the cartridge rod 363 to pass through the drive tool 462 when it is engaged with the lockring 420. When the splines 464 are engaged with the grooves 460, the aperture 470 in the drive tool 462 is registered with the rod aperture 436 in the lockring 420 and the cartridge rod 363 can extend through both.

Figure 29:
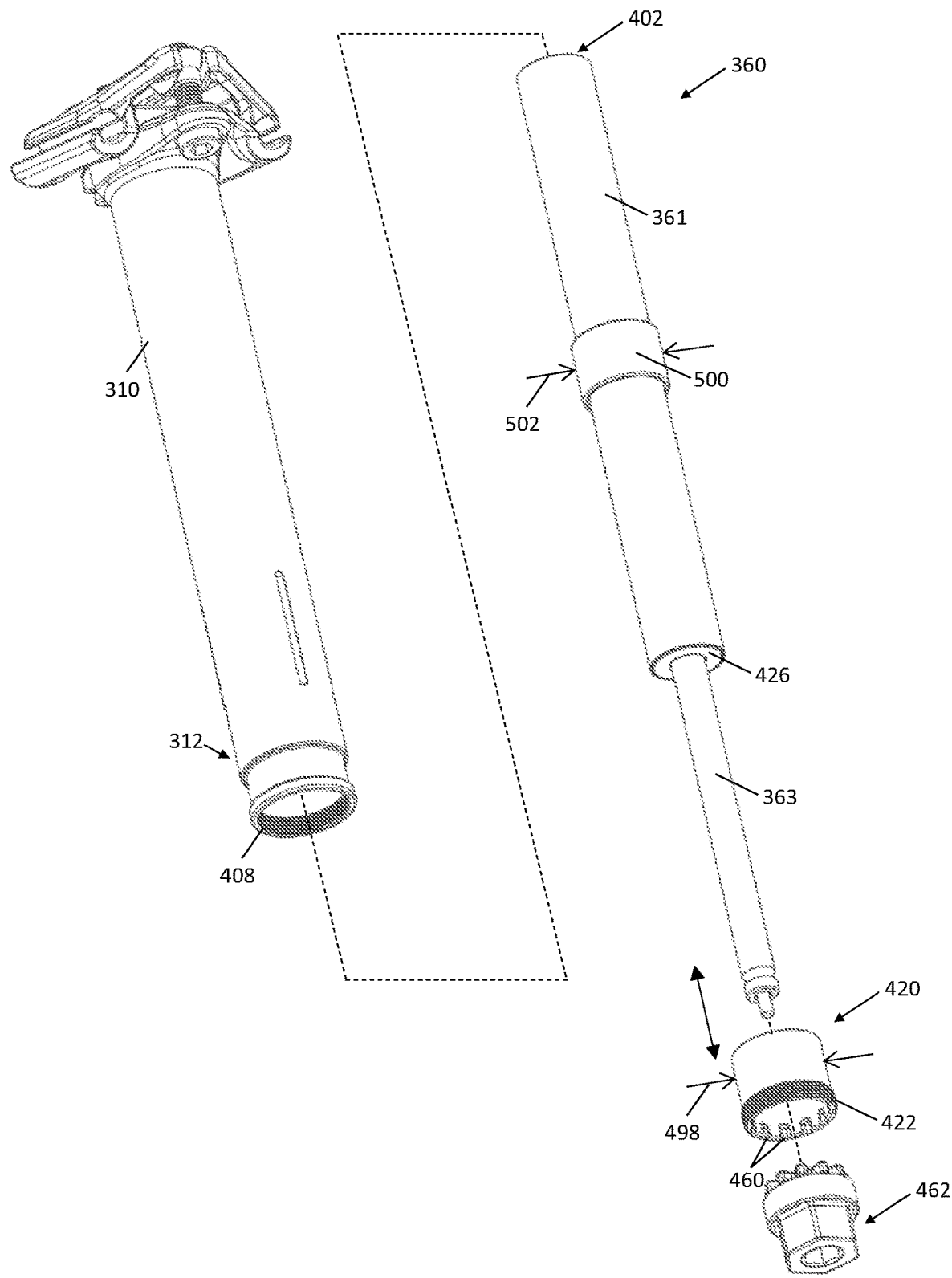
FIG. 29 is a partially exploded view of the dropper post assembly of FIG. 17.
Figure 30:
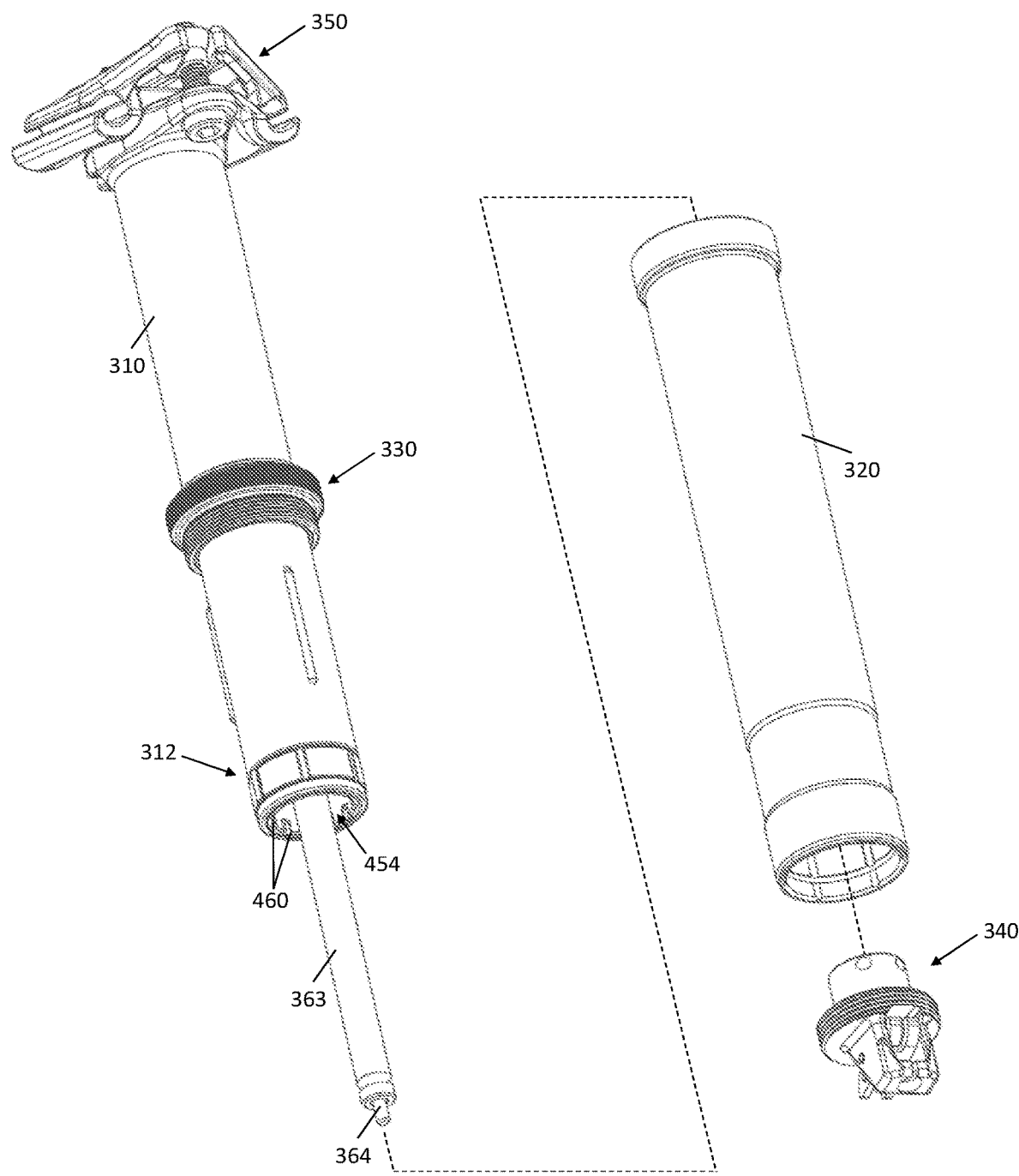
FIG. 30 is another partially exploded view of the dropper post assembly of FIG. 17.
Figure 31:
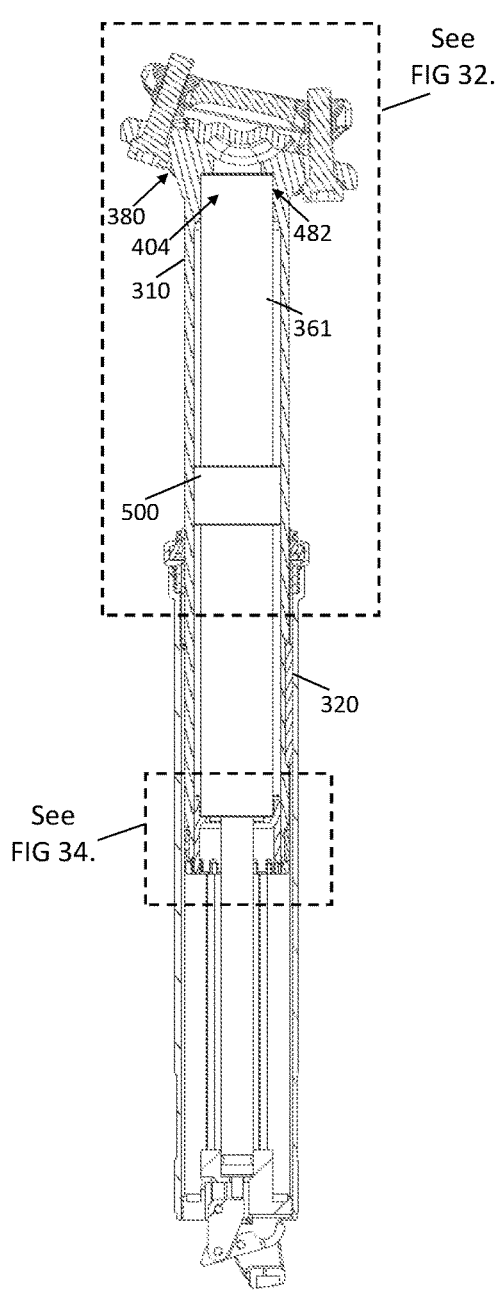
FIG. 31 is a partial cross-section view of the dropper post assembly of FIG. 17.
Figure 32:
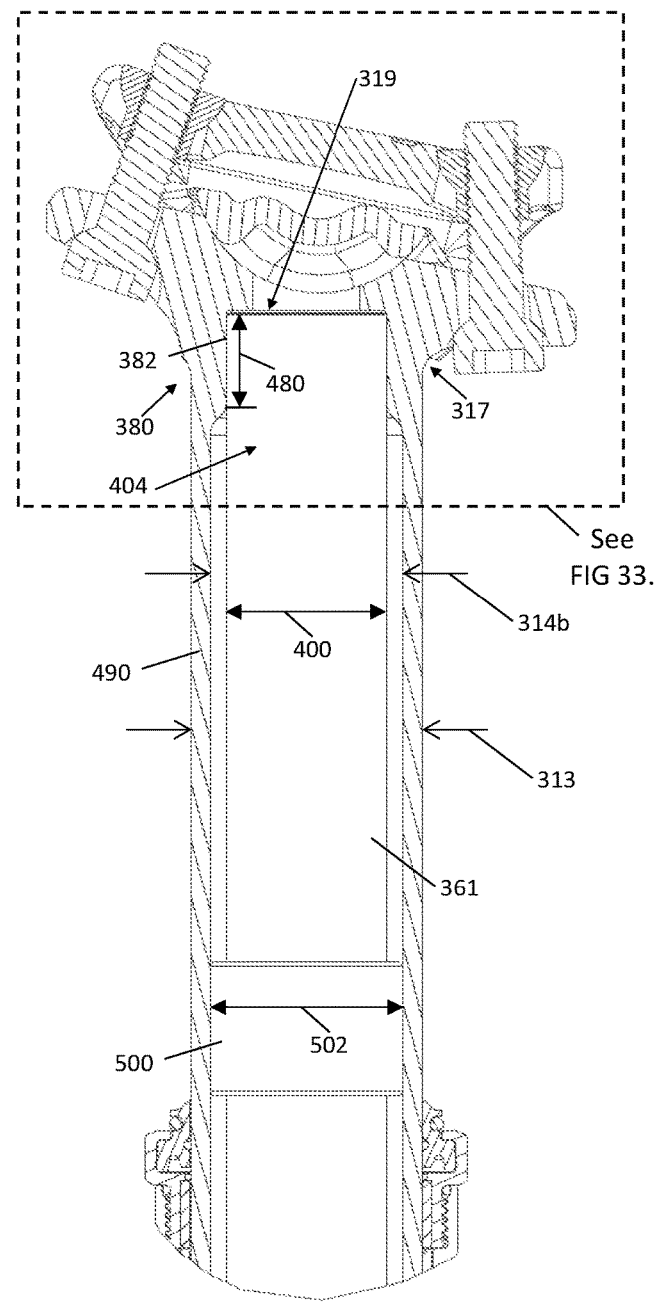
FIG. 32 is an enlarged view of a portion of FIG. 31.

Referring also to FIGS. 29 and 30, to insert or remove the spring cartridge assembly 360 from the post inner tube 310 when using the dropper post assembly 300, the cartridge outer tube 361 can be axially inserted into the open, lower end 312 of the post inner tube 310. With the cartridge outer tube 361 inserted, the lockring 420 and drive tool 462 can be slide along the length of the cartridge rod 363 until the lockring 420 reaches, and engages, the threads 408 on the post inner tube 310. The lockring 420 can then be tightened, and the drive tool 462 removed by axially sliding it down the length of the cartridge rod 363. This can create an inner tube subassembly that includes at least the post inner tube 310, the cartridge 360 and lockring 420, and optionally can include the seat clamp 350. Subassembly can now be inserted into outer tube 320 and secured to actuator 340 is the typical manner. Referring to FIG. 30 which shows the lockring 420 installed and nested within the post inner tube, the lower end 312 of the inner post tube 310 can then be inserted into the post outer tube 320 and the collar 330 can be tightened to secure the assembly together. The actuator 340 can be attached to the lower end of the post outer tube 320 in a manner where it can engage the cartridge rod 363 and actuator rod 364 as described herein. In this configuration, the lockring 420 can be inserted and removed from the lower end 312 of the post inner tube 310 independently of, and without requiring modification of the seat clamp assembly 350. With outer tube 320 installed on inner tube 310 and fastened to collar 330 but with actuator 340 removed from rod 363, lockring 420 is accessible through the lower end of lower tube 320 when lower tube 320 is slide towards the upper end of inner tube 310.

Figure 39:
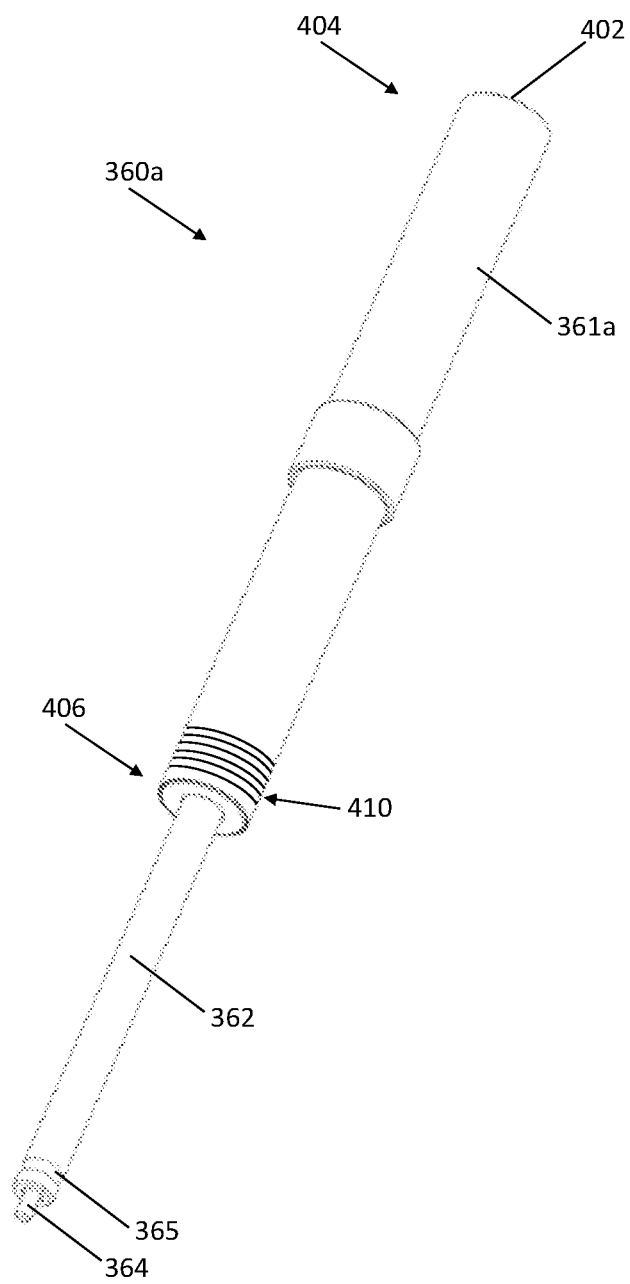
FIG. 39 is a perspective view of another example of a locking gas spring cartridge assembly.
Figure 42:
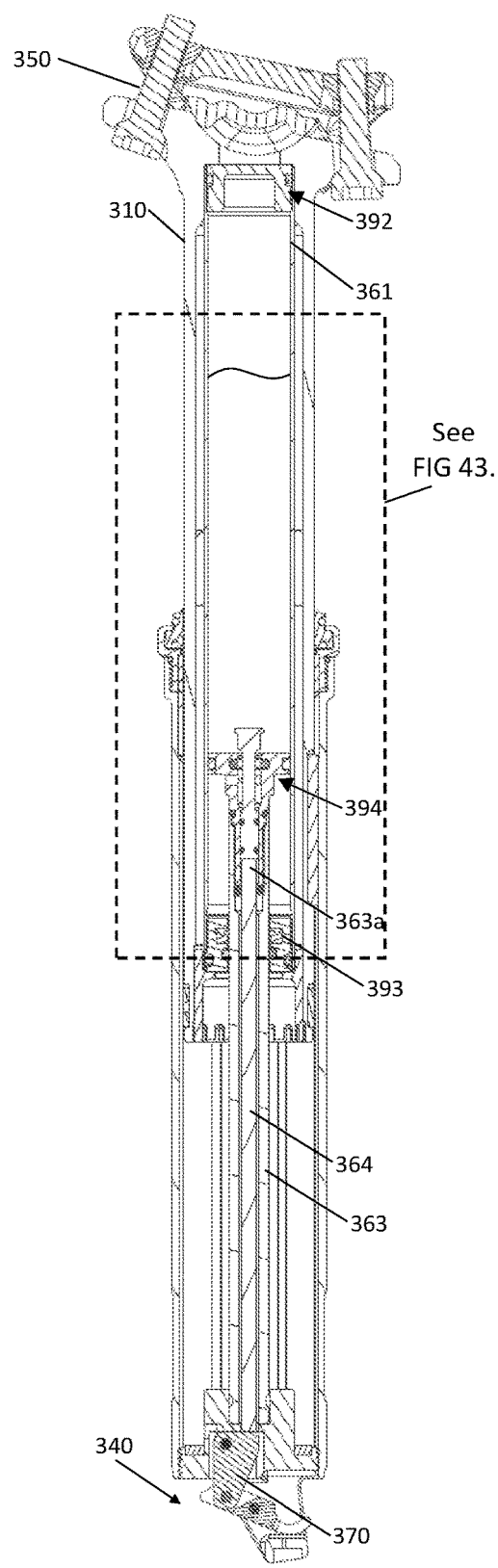
FIG. 42 is the partial cross-section view of a dropper post assembly of FIG. 40 in an unlocked configuration.

Alternatively, in other configurations the second engagement member can be provided as part of the cartridge outer tube 361, and optionally may be integrally formed therewith. Referring, for example, to FIG. 39, an alternative configuration of the locking spring cartridge assembly 360a is configured to include a second engagement member in the form of threads 410 that are formed in the outer surface of the outer cartridge tube 361 and can threadingly engage the threads 408 on the inside of the lower end 312 of the inner post tube 310. In this arrangement, the outer cartridge tube 361 can be axially inserted into the lower end 312 of the post inner tube 310 and rotated until its threads 410 have threaded into the thread 408 at which point the spring cartridge assembly outer tube 361 can be generally rotationally and axially fixed relative to the post inner tube 310. To remove the spring cartridge assembly 360, the cartridge outer tube 361 can be unthreaded from the thread 408 and the spring cartridge assembly 360 can be axially withdrawn from the post inner tube 310.

Figure 17:
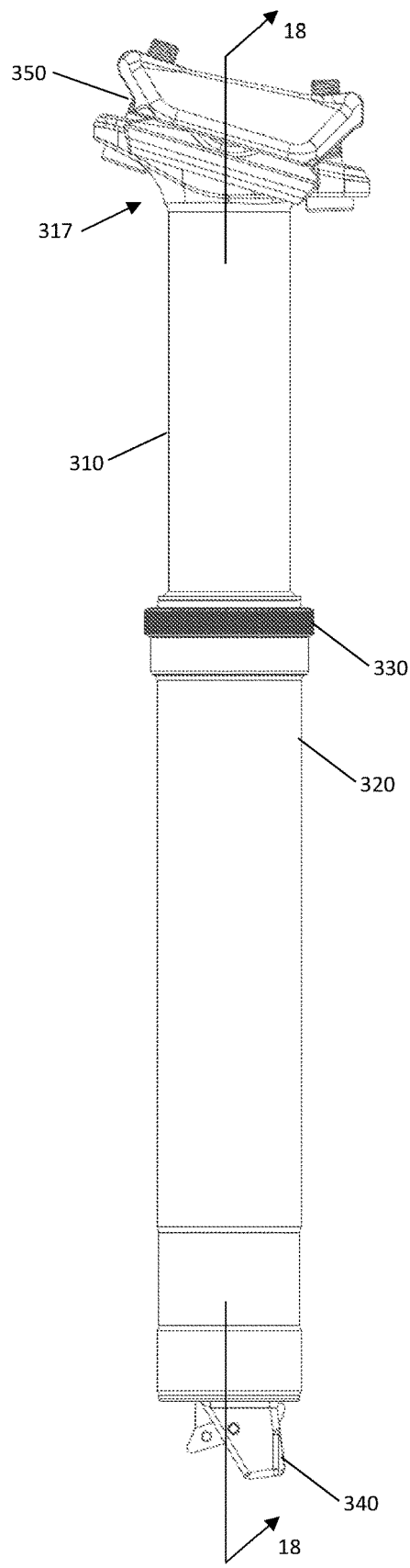
FIG. 17 is a side view of another example of a dropper post assembly.
Figure 18:
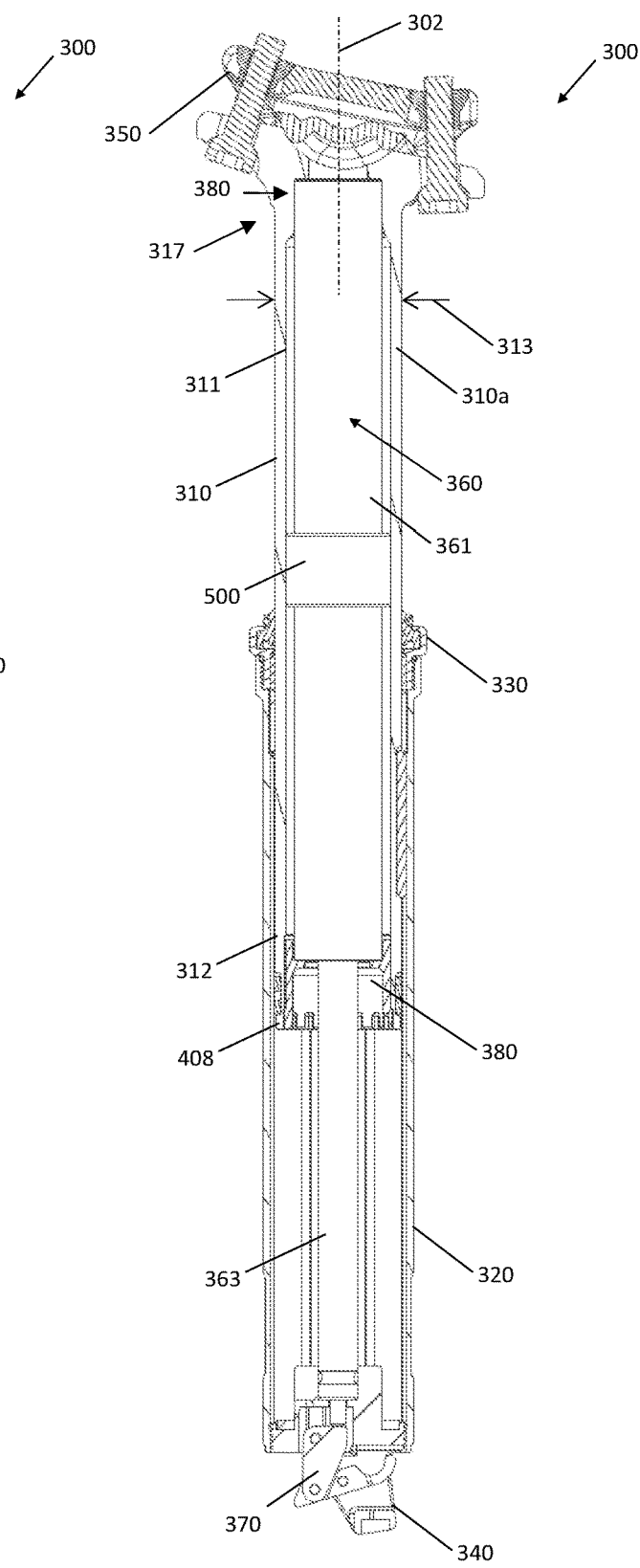
FIG. 18 is a partial section view of the dropper post assembly of FIG. 17, taken along line 18-18 to reveal the interior of the post inner tube and post outer tube.
Figure 19:
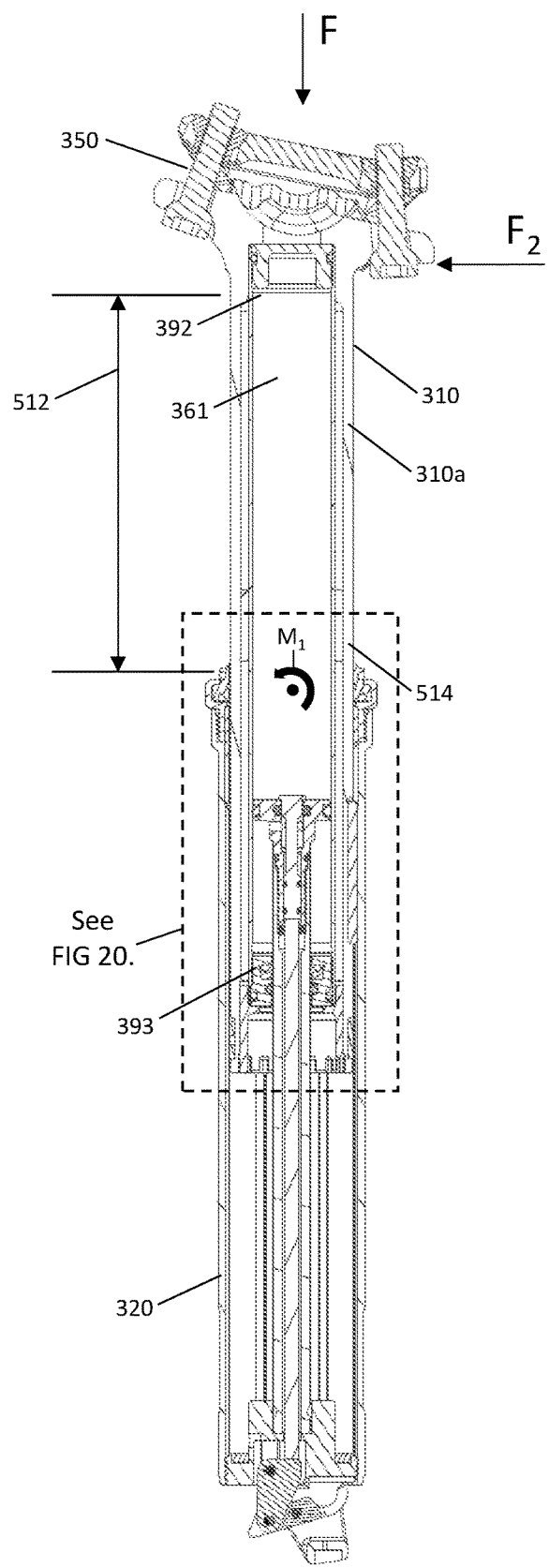
FIG. 19 is a further section view of the dropper post assembly of FIG. 17, revealing the interior of the locking gas spring cartridge.
Figure 20:
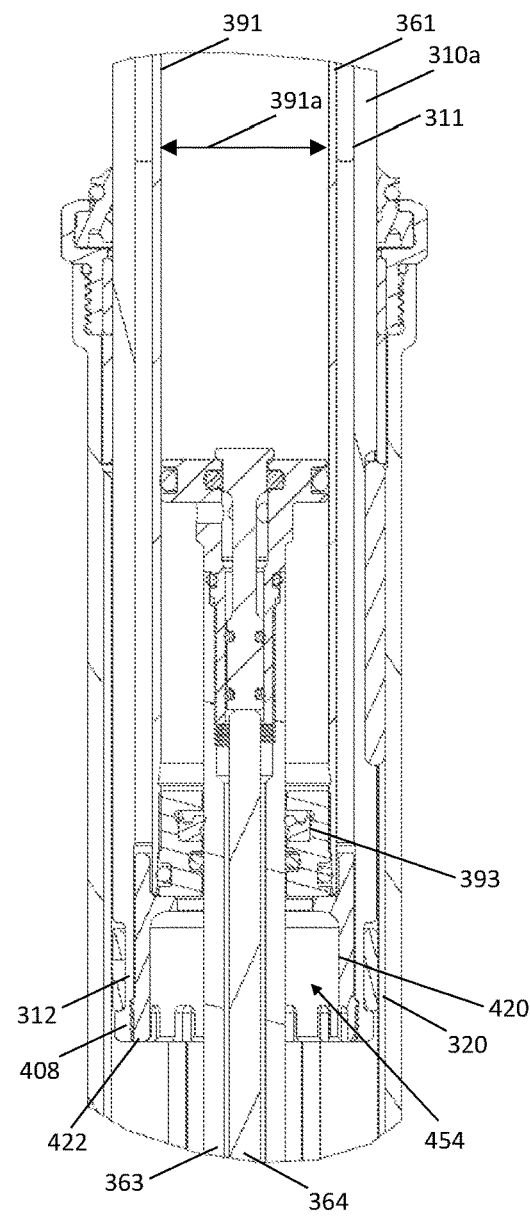
FIG. 20 is an enlarged view of a portion of FIG. 19.
Figure 21:
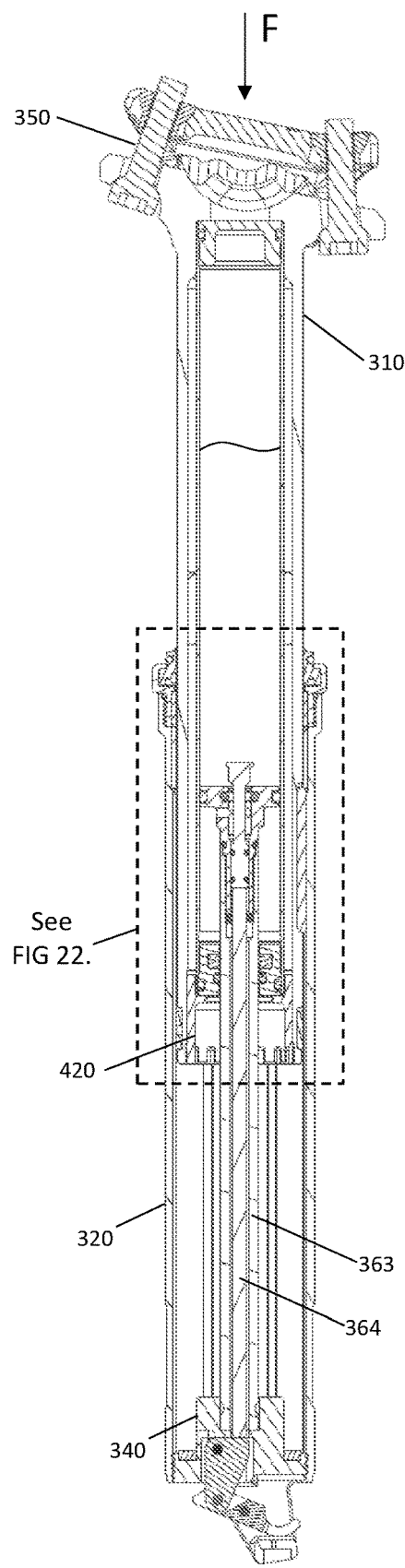
FIG. 21 is a further section view of the dropper post assembly of FIG. 17, revealing the interior of the locking gas spring cartridge in a different configuration.
Figure 22:
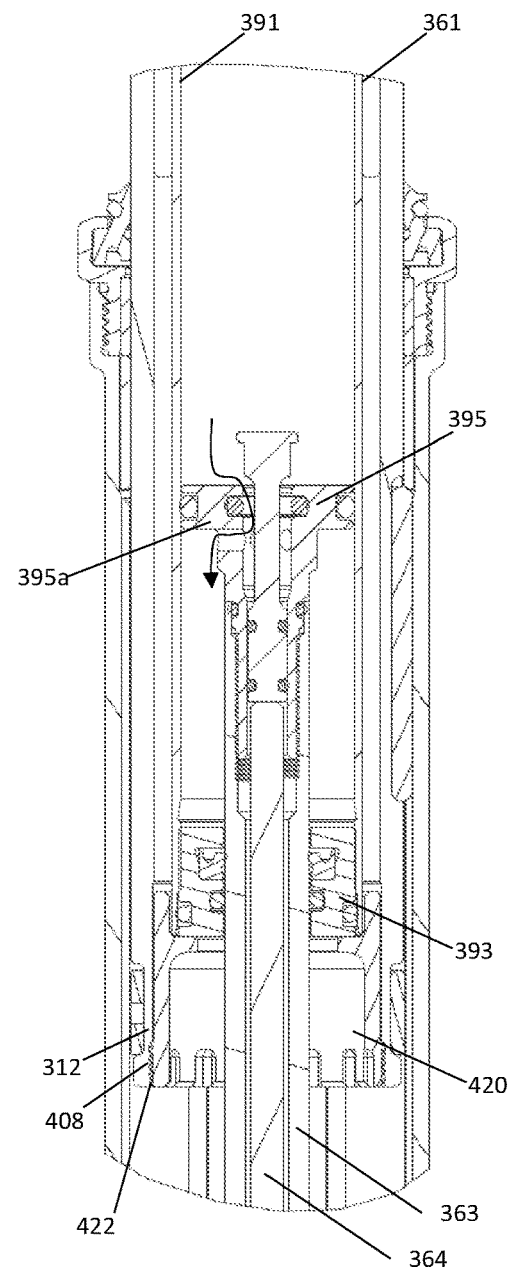
FIG. 22 is an enlarged view of a portion of FIG. 21.
Figures 23, 24:
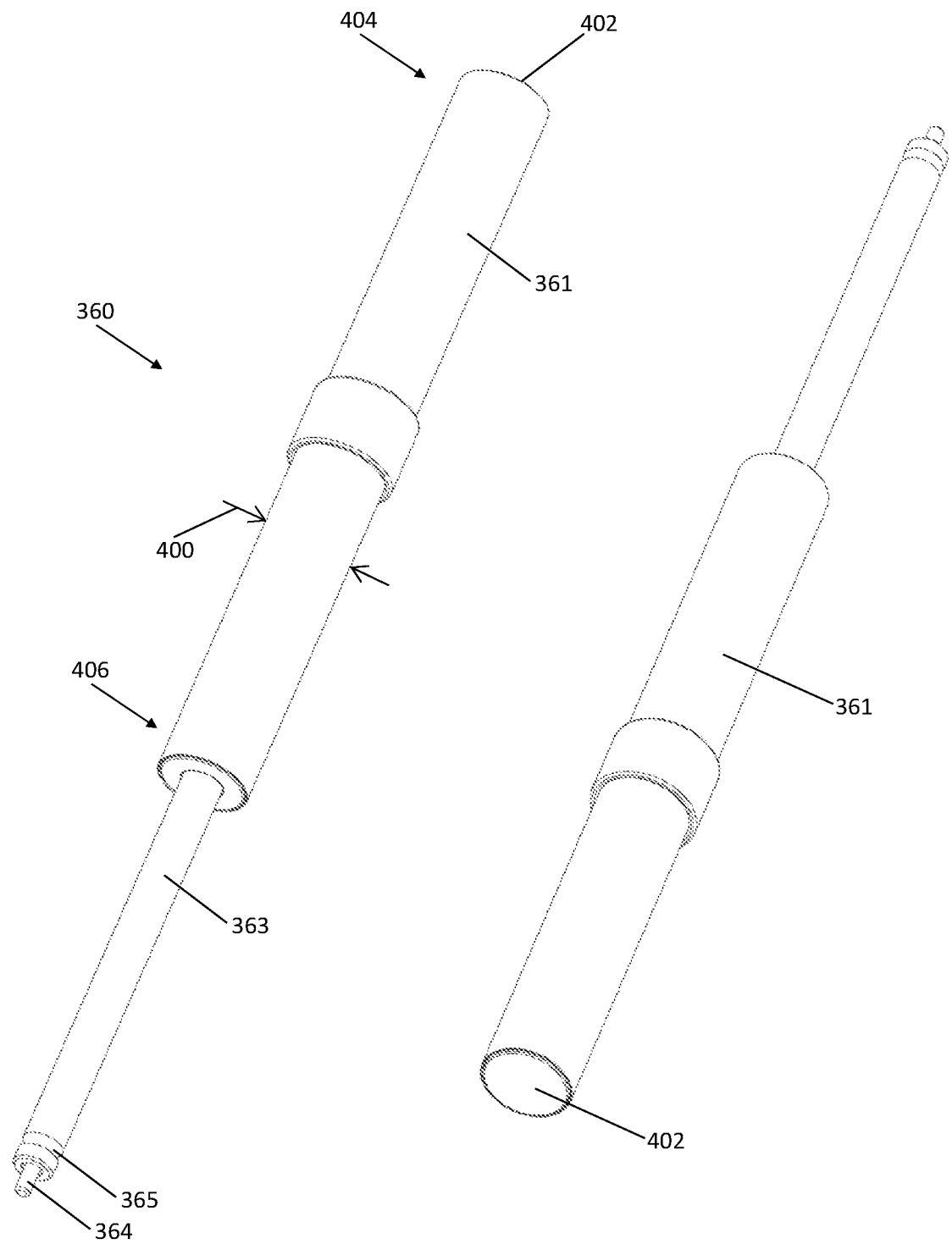
FIG. 23 is a perspective view of one example of a locking gas spring cartridge from below.
FIG. 24 is a perspective view of the locking gas spring cartridge of FIG. 24 from above.
Figure 25:
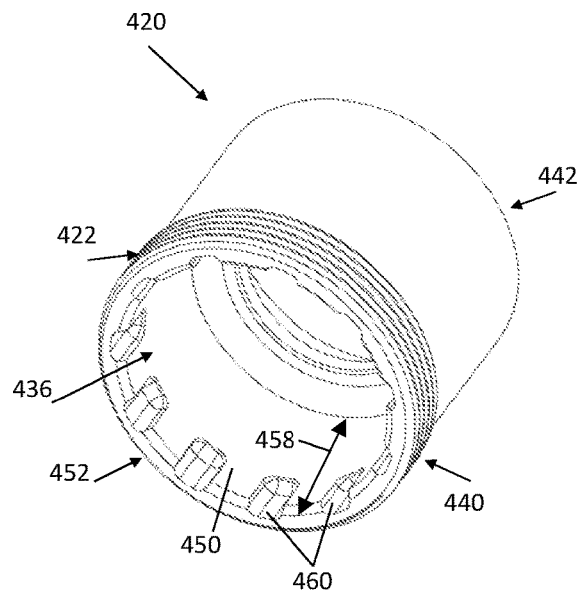
FIG. 25 is a perspective view of one example of a lockring from below.
Figure 26:
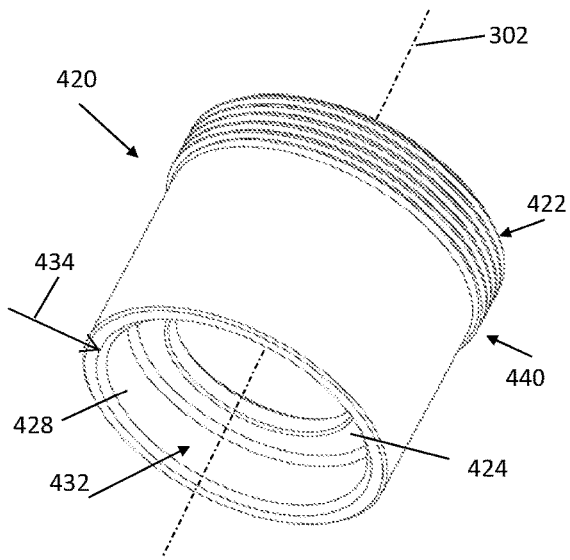
FIG. 26 is a perspective view of the lockring of FIG. 25 from above.
Figure 27:
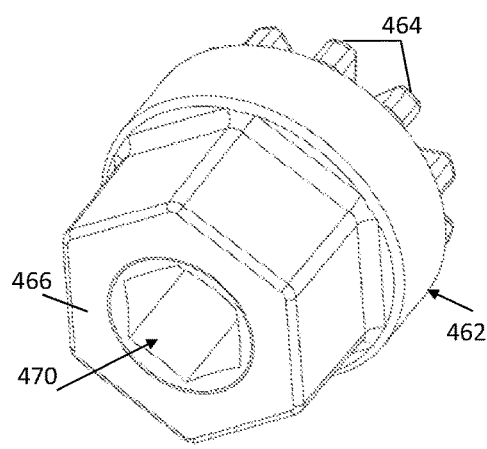
FIG. 27 is a perspective view of one example of a driving tool form one side.
Figure 28:
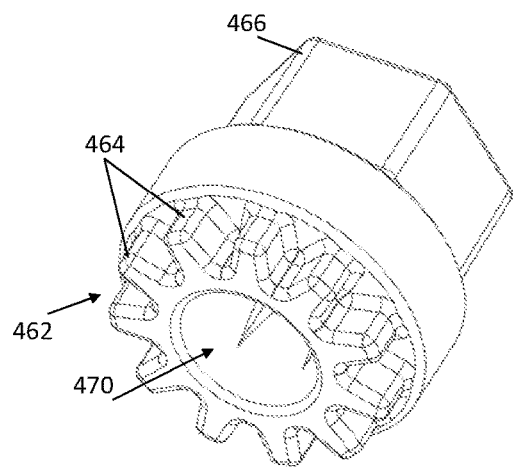
FIG. 28 is a perspective view of the driving tool of FIG. 27 from above.

Referring again to FIGS. 17-20 and 31-33, in this arrangement, both the inner tube 310 and outer tube 320 are elongate, tubular members that extend along a post axis 302. In this example, the inner tube 310 is configured to slide telescopically within the outer tube 320 between a retracted position and an extended position (FIGS. 17-19, for example). The inner tube 310 includes a lower end 312 that is sized to fit within the outer tube 320 and that is intended to be retained within the outer tube 320 in both the retracted and extended configurations. The inner post tube 310 also has sidewall 310a with an inner wall surface 311 and defines an inner tube outer diameter 313 that is sized to fit within the post outer tube 320.

Configuring the assembly such that the fastener used to secure the cartridge outer tube 361 is located toward the lower end 312 of the post inner tube 310, rather than at its upper end 317, can help facilitate the use of different interior surface features on tube 310 than were shown on post inner tube 110. For example, in this embodiment, the inner wall surface 311 preferably includes at least two regions or portions that have different respective inner diameters (and therefore different wall thicknesses if a constant outer diameter 313 is used) and can engage, or not engage, with the cartridge 360 in different ways, and optionally can have different internal diameters and wall thicknesses.

For example, the post inner tube 310 in this example includes an upper captive portion 380 disposed toward its upper end 317 and the sidewall 310a of the inner post tube 310 has a captive sidewall portion 382 that has a first, captive inner diameter 314a and therefore defines a corresponding captive wall thickness 384 in the lateral direction, which in this example is a difference between the outer diameter 313 and the captive inner diameter 314a. The captive sidewall portion 382 has an axial length 480 (FIG. 32) and, together with the inner surface 319 of the upper end wall cooperates to define an upper cartridge pocket 482.

The captive inner diameter 314a is preferably sized so that is slightly larger than the outer diameter 400 of the cartridge outer tube 361, and preferably is substantially the same as the outer diameter 400. This can allow the upper end 404 of the cartridge outer tube 361 to be axially inserted into the upper cartridge pocket 482 and be generally snugly received by the captive sidewall portion 382. When the upper end 404 of the cartridge outer tube 361 is fully inserted in this manner, i.e., when the lockring 420 is tightened, the upper cap surface 402 can bear against the inner surface 319 to inhibit axial movement of the cartridge outer tube 361, and the captive sidewall portion 382 can engage the cartridge outer tube 361 to inhibit lateral movement of the upper end 404. With the cartridge outer tube 361 inserted in this manner and with the lockring 420 installed, both the upper end 404 and lower end 406 of the cartridge outer tube 361 are both axially and laterally constrained relative to the post inner tube 310. Because cartridge outer tube 361 is constrained by captive diameter 314a on the post inner tube 310 and by recess diameter 434, both of which are smaller than clearance diameter 314b, cartridge 360 is at less buckling risk when loaded than prior art dropper 960 configuration described herein.

The inner surface 319 and upper cap surface 402 are preferably complimentary to each other such that they can interface/abut in a desired manner. While both surfaces 319 and 402 are shown as flat planar surfaces in this example, other complimentary arrangements are possible.

However, instead of having a constant inner diameter along its length, the post inner tube 310 includes a second, clearance portion 490 that has a different inner diameter 314b (FIG. 33) that is larger than the diameter 314a and preferably is larger than the outer diameter 400 of the cartridge outer tube 361. In this configuration, the wall thickness 492 of the clearance portion 490 is less than the thickness 384 of the captive portion, which can reduce the amount of material used to create the post inner tube 310 and may reduce its weight. This arrangement also creates a generally annular gap 494 between the cartridge outer tube 361 and clearance portion 490, that has a gap width 496.

Optionally, as shown in this embodiment, the clearance portion 490 can extend to the lower end 312 of the post inner tube 310 and in this example, the inner diameter 314b is substantially the same as the outer diameter 498 (FIGS. 29 and 34) of the lockring 420 to allow the lockring 420 to be inserted. In this arrangement, the captive diameter 314a can be the smallest internal diameter of the post inner tube 310, and the clearance diameter 314b is the largest internal diameter and is below the captive diameter 314a.

Preferably, the interior of the post inner tube 310 is configured so that its internal diameter remains generally constant or widens toward its lower end 312, and it is generally free from undercuts or regions in which an inner diameter at a lower portion is smaller than an inner diameter of a relatively higher portion. Configuring the post inner tube 310 in this manner may help simplify manufacture of the post inner tube 312.

Optionally, to help fill a portion of the gap 494 a bumper 500 can be provided, having a bumper diameter 502 (FIG. 29) that fits between the cartridge outer tube 361 and clearance portion 490. The bumper 500 can help reduce rattling and/or lateral movement of a central portion of the cartridge outer tube 361 relative to the post inner tube 360, and may be formed from any suitable material, including materials like plastic, metal, rubber, foam, wood and the like that may also help damper vibrations and/or reduce noise. The bumper 500 may be formed from the same material or a different material than the cartridge outer tube 361 and may be either integrally formed with the cartridge outer tube 361 (if made of the same material) or may be a separate member that is connectable, and optionally removable from the cartridge outer tube 361. Different bumpers 500, with different diameters 502, could be used in combination with a common cartridge outer tube 361 to help facilitate the desired fit between the cartridge outer tube 361 and post inner tubes having different internal diameters and configurations.

Referring to FIGS. 35-38, another example configuration of the dropper post assembly 300 is shown, with a relatively longer post inner tube 310L and a relatively longer post outer tube 320L and using locking spring cartridge assembly 360L. The post inner tube 310L and a post outer tube 320L are analogous to post inner tube 310 and a relatively longer post outer tube 320 and can include the features described herein and are annotated using like reference characters. One difference with this example is that because the tube inner post 310L is longer, it can have a longer travel distance/drop length and it may need to be somewhat stronger/stiffer than the post inner tube 310. Therefore, in this example the post inner tube is 310L is configured so that its upper captive portion 380 has the same configuration as the captive portion 380 on post inner tube 310 and the sidewall 310a of the inner post tube 310L has a captive sidewall portion 382 that has a first, captive inner diameter 314a that can be the same as the diameter 314a in post inner tube 310, and therefore defines a corresponding captive wall thickness 384 in the lateral direction. The captive inner diameter 314a in this example is preferably sized so that is slightly larger than the outer diameter 400 of the cartridge outer tube 361L, and preferably is substantially the same as the outer diameter 400.

Figure 38:
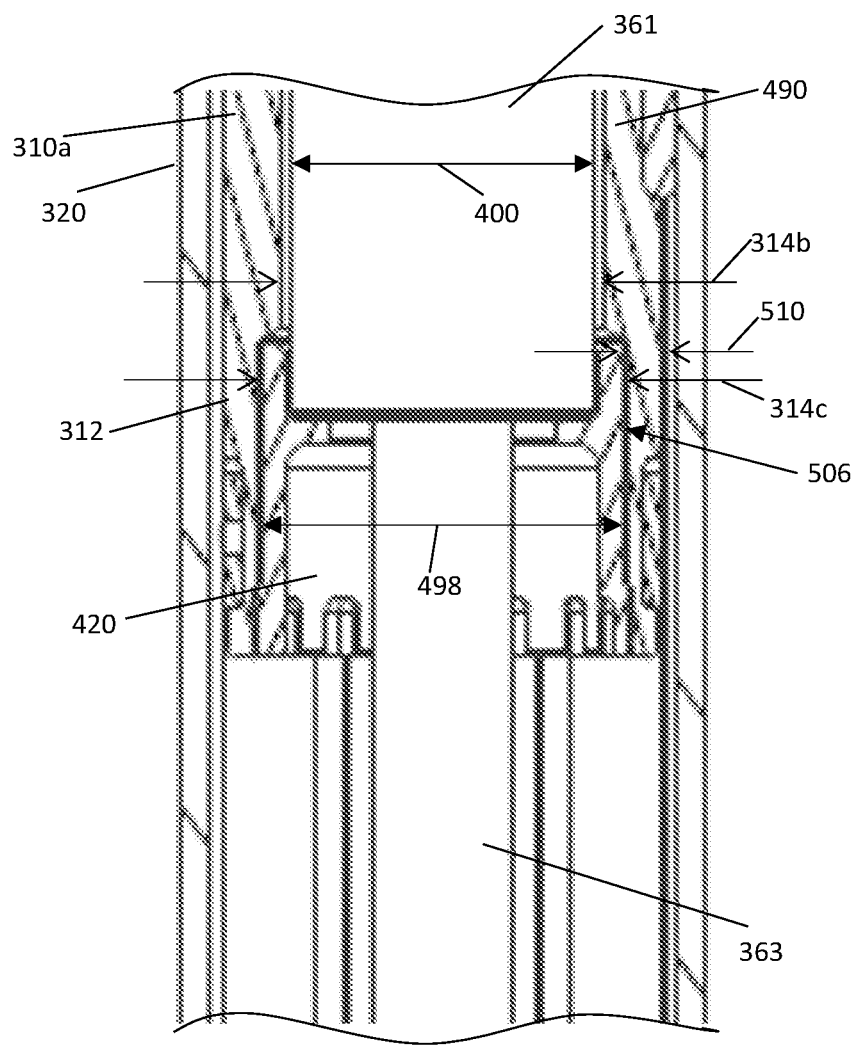
FIG. 38 is an enlarged view of a portion of FIG. 35.

However, to help provide a stronger post, the clearance section 490 of post inner tube 310L a different inner diameter 314b that is larger than the diameter 314a and preferably is larger than the outer diameter 400 of the cartridge outer tube 361L but is smaller than the corresponding diameter 314b in the shorter, post inner tube 310. In this configuration, the wall thickness 492 of the clearance portion 490 is less than the thickness 384 of the captive portion but is greater than the clearance wall of the shorter, post inner tube 310 to allow for more material to be used to create the post inner tube 310L and may increase its strength. This arrangement also creates a generally annular gap 494 between the cartridge outer tube 361L and clearance portion 490, that has a gap width 496 that is narrower than the corresponding width 496 in the shorter, post inner tube 310. The diameter 314b of the clearance portion 490 of the longer post inner tube 310L is still preferable larger than the outer diameter 400 of the cartridge outer tube 361L to help facilitate axial insertion of the cartridge outer tube 361L. However, the diameter 314b is, in this example, smaller than the outer diameter 498 of the lockring 420 (FIG. 38). In this arrangement, the lockring 420 cannot fit within the clearance portion 490.

Therefore, to help accommodate the lockring 420, the post inner tube 310L includes a third section/portion at its lower end 312 that can be referred to as a fastener region/portion 506 that is at the lower end of the longer post inner tube 310L. In this configuration, the clearance portion 490 is axially between the captive portion 380 and the fastener portion 506. The fastener portion 506 has an internal diameter 314c that is larger than the diameters 314a and 314b in this example and defines a wall thickness 510 that is less than the wall thicknesses 384 and 392. Optionally, as shown in this embodiment, the fastener portion 506 can extend from the lower edge of the clearance portion 490 to the lower end 312 of the post inner tube 310L and in this example, the inner diameter 314c is substantially the same as the outer diameter 498 of the lockring 420 to allow the lockring 420 to be inserted. In this arrangement, the captive diameter 314a can be the smallest internal diameter of the post inner tube 310, and the clearance diameter 314b is an intermediary diameter and the diameter 314c is the largest internal diameter within the longer post inner tube 310L.

Preferably, the interior of the post inner tube 310L is also configured so that its internal diameter widens toward its lower end 312, and it is generally free from undercuts or regions in which an inner diameter at a lower portion is smaller than an inner diameter of a relatively higher portion. That is, the post inner tube 310L is configured so that 314c is larger than 314b, and 314b is larger than 314a. Configuring the post inner tube 310L in this manner may help simplify manufacture of the post inner tube 312.

Referring to FIGS. 19 and 35, a post assembly 300 with a relatively shorter post inner tube 310 can be compared to the post assembly having the relatively longer post inner tube 310L. As described herein, due at least in part to external design constraints and a desire for both versions of the post assembly 300 to be compatible with the same type of bicycle frame, and to use the same collar 330 and well as other assembly parts, the outer diameters 313 of the inner post tubes 310 and 310L are substantially the same. In these examples, when the inner post tubes 310 and 310L are in their extended positions (FIGS. 19 and 35), they each have different exposed lengths 512 and 512L, which can also be described as the travel or drop length, with 512L being greater than 512. Because long travel version 310L has a longer drop, exposed tube length 512L is greater that exposed length 512 and therefore the forces experienced by the post inner tubes 310 and 310L during riding can be different. In general, the "torque" or "moment" can be described as Moment (M) equals force (F) multiplied by distance (D) or:

$$M = F \times D$$

When the post inner tubes 310 and 310L, having different drop length options 512 and 512L, are loaded with the same rearward force FX, a maximum moment is located at the lowest exposed portions 514 and 514L (respectively) of the sidewalls of the post inner tubes 310 and 310L that are just above and proximate the collar 330 and upper end of the post lower tubes 320 and 320L. In the case, length 512 can be represented as D1 and length 512L can be represented as D2, where:

$$M_1 = F \times D_1$$

and $$M_2 = F \times D_2$$

Because 512L is larger than 512, $M_2$ is also larger than $M_1$ for a given for force F.

Bending stress experienced by the post inner tubes 310 and 310L can further be defined as Stress ($\sigma$)=Moment (M)×the perpendicular distance from the outermost fiber to the neutral axis (c) divided by Moment of inertia (I) or $$\sigma = \frac{Mc}{I}$$

For a given family of generally analogous dropper post assemblies (such as the assemblies shown herein) it can be preferable in some circumstances that the maximum bending stress for all drop lengths is substantially the same. This may help ensure that all drop lengths (such as 512 and 512L and other variations) are strong enough to resist force FX and that relatively lower amounts of unnecessary, extra weight (for example from extra post inner tube 310 material) is carried on any of the variations where it is not needed. For the maximum stress on the shorter post inner tube 310 to be equal to the maximum stress on the longer post inner tube 512L the following relation is applied:

$$\frac{M_1 c_1}{I_1} = \frac{M_2 c_2}{I_2}$$

In the equation above the perpendicular distance from the outermost fiber to the neutral axis (c) is equal to half of the external diameters 313 at their respective exposed portions 514 and 514L. because diameters 313 are equal, $c_1$ and $c_2$ are also equal. The equation thus simplifies to:

$$\frac{M_1}{I_1} = \frac{M_2}{I_2}$$

Because $M_2$ is larger than $M_1$ for the above equation to be equal $I_2$ is also larger than $I_1$. In general, Moment of inertia (I) for a hollow cylinder is defined as $$I = \pi \frac{d_o^4}{64} - \pi \frac{d_i^4}{64}$$

Where $d_0$ equals outer diameter and di equals inner diameter. In order for $I_2$ to be larger than $I_1$ the following relation applies:

$$\pi \frac{d_{o1}^4}{64} - \pi \frac{d_{i1}^4}{64} < \pi \frac{d_{o2}^4}{64} - \pi \frac{d_{i2}^4}{64}$$

Because outer diameters 313 are the same, $d_{o1}$ equals $d_{o2}$ and the equation can be simplified to:

$$d_{i1} > d_{i2}$$

In other words, for the maximum bending stress at the lowest exposed portions 514 and 514L of inner tubes 310 and 310L to be substantially equal, the inner diameter 314b of inner tube 310 of shorter dropper length option 512 must be larger than inner diameter 314b of inner tube 310L of longer dropper length option 512L. While the inner cross-sectional shapes of the post inner tubes are illustrated as being circular, other cross-sectional shapes can be used and analogous strength and stiffness calculations can be used. For example, while it may be preferred for the captive portions to have a circular shape (to match the cartridge outer tube 361) at least some of the clearance portions may have a different, non-circular shape. That is, instead of being a circle, the diameter 314b may instead represent the minor axis of an oval/ellipse and therefore the lx at a lower portion of 512 is smaller for upper tube 310 than the lx at a lower portion of 512L of upper tube 310L.

Configuring the components in this manner can allow multiple different variations of the dropper post assemblies to be manufactured in a common product line or family of products using a variety of shared/common components. For example, as described herein the teachings herein can facilitate the production of aa given dropper post in a family of dropper posts where at least some, and preferably most or optionally all components are shared between the models except upper tube 310/310L, lower tube 320/320L and cartridge 360/360L and where the diameter 314b of tube 310 is larger than diameter 314b of tube 310L.

Referring to FIGS. 40-43, the interior features of this example of the locking gas spring cartridge assembly 360 are described. The spring cartridge assembly 360 operates in an analogous manner to cartridge 160 and like features are described using like reference characters indexed by 200.

In this example, fixedly attached to sliding surface 391 are upper seal head 392 and lower seal head 393, which together help seal in the interior of the cartridge outer tube 361 and substantially fluidly isolate the interior of the cartridge outer tube 361 from the surrounding environment (at least with a sufficient degree of sealing/isolation to facilitate the operation of the locking spring cartridge assembly 360 as described herein).

Within the interior of the cartridge outer tube 361 a piston assembly is provided to separate the interior of the cartridge outer tube 361 into two different chambers, and to help facilitate the translation of the cartridge outer tube 361 as described. The piston assembly can be of any suitable configuration that can operate as described herein. A valve mechanism is also preferably provided that can selectably allow fluid communication between the chambers on opposite sides of the piston assembly, as this can be used to lock and unlock the locking spring cartridge assembly 360. The valve, and related fluid flow path regions, can be of any suitable configuration.

Figure 43:
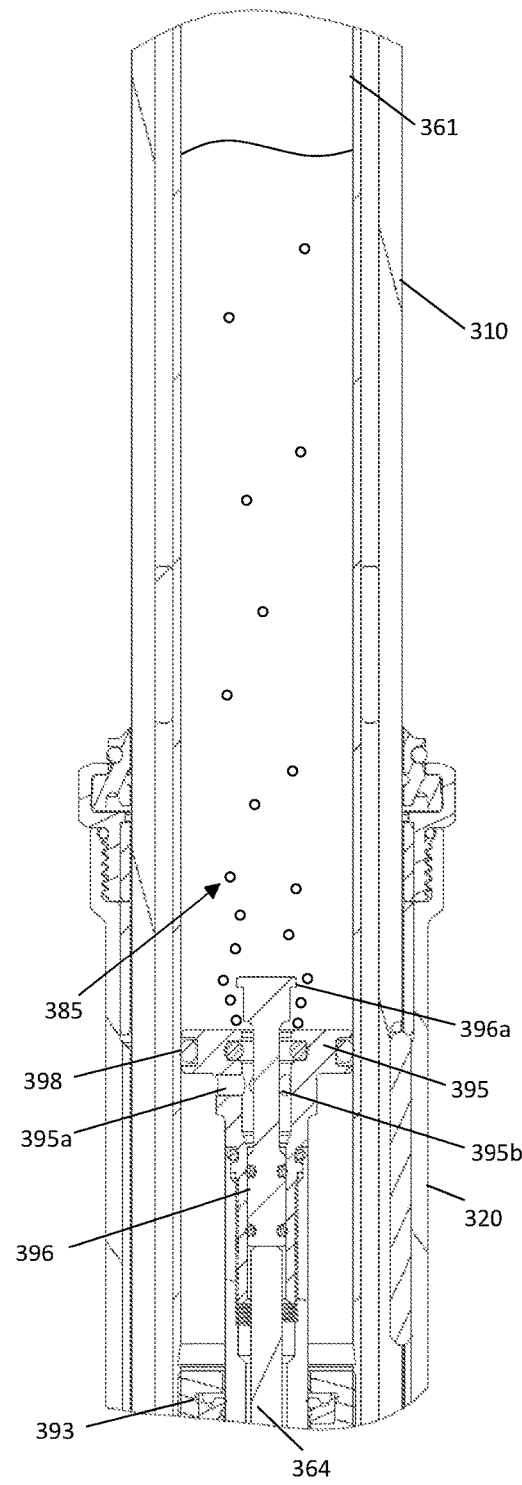
FIG. 43 is an enlarged view of a portion of FIG. 42.

To help reduce the overall size of the locking spring cartridge assembly 360, it may be preferable to integrate a suitable valve mechanism within the piston assembly, as is shown in the present example that includes a piston valve 394 attached to the upper end 363a of a cartridge rod 363 that can extend from the piston valve 394 to the actuator assembly 340. The piston valve 394 is sized to generally fill the cartridge outer tube 361, is positioned axially between the upper and lower cartridge seal heads 392 and 393 and has a sealing portion that is positioned opposite and configured to seal against the sliding surface 391 and includes a body-sliding-surface o-ring 398 (or other suitable translatable sealing member). The piston valve 394, in this example, also includes a valve body 395, a plunger 396 that can move relative to the valve body 395, a body-piston o-ring 397, and valve cap 399. In this embodiment the valve body 395 defines a corresponding valve body channel 395a (see also FIG. 22) and a valve inner pathway 395b (FIG. 43). The plunger 396 includes a seal surface 396a, that can seal against the valve body 395 (e.g., against o-ring 397 in this example) to inhibit fluid flow through the piston valve, and neck portion 396b.

In this arrangement, the piston 394 divides the interior of the cartridge outer tube 361 into two operating chambers that can be fluidly isolated from each other while the locking spring cartridge assembly 360 is in use to selectably lock and unlock the locking spring cartridge assembly 360. For example, when the operating chambers are fluidly isolated from each other (e.g., the valve is closed—FIGS. 40 and 41) the locking spring cartridge assembly 360 can be considered to be in a locked configuration and will resist movement of the cartridge outer tube 361 and seat post inner tube 310. In contrast, when the operating chambers are fluidly connected, such as by activating the piston valve 394 and allowing fluid (liquid) to pass through the piston 394 and flow between the operating chambers (FIGS. 42 and 43), the locking spring cartridge assembly 360 can be considered to be in an unlocked configuration, and will facilitate the relative movement of the cartridge outer tube 361 and seat post inner tube 310 relative to the outer tube 320. As described herein, when the locking spring cartridge assembly 360 is in use, and the piston valve 394 is opened, the cartridge outer tube 361 can translate relative to the piston 394 to allow the seat post inner tube 310 to translate relative to the outer tube 320.

As described herein, a first, of the operating chambers is chamber 381, is located axially between the piston valve 394 and the lower seal head 393 and is laterally bounded by the sliding surface 391 and is configured to contain only, or at least substantially only liquid, such as the oil described herein, rather than a mixture of liquid and gas or other material and can also be referred to as a liquid chamber. When the locking spring cartridge assembly 360 is in use within the seat post 300 in the orientation illustrated these Figures (which is also the orientation of the locking spring cartridge assembly 360 when it is in use on a bicycle) the chamber 381 can be referred to as a lower chamber 381, but it is understood that the term lower is used for convenience and is not intended to limit the orientation of the locking spring cartridge assembly 360 when in use.

In the present example, the other, or second, operating chamber is chamber 382 which is located axially between the piston valve 394 and the upper seal head 392 and is also laterally bounded by the sliding surface 391. Because of its relative location within the locking spring cartridge assembly 360 as illustrated, the second chamber 382 can be referred to as an upper chamber 382. In contrast to lower chamber 381, the upper chamber 382 is preferably configured to contain a mixture of oil (or other suitable liquid) and pressurized air (or other suitable gas), instead of containing only oil/liquid, and can be referred to as a gas/liquid chamber.

Under the intended operating conditions of the locking spring cartridge assembly 360 the oil and air (or other liquid and gas) in the gas/liquid chamber 382 with tend to separate from each other due the differences in their densities and mechanical properties, such that an air/oil interface or boundary 383 is defined between piston valve 394 and upper seal head 392 within chamber 382. In this arrangement, the gas/liquid chamber 382 will have a lower layer or region containing oil occupying the space located axially between the boundary 383 and the piston valve 394, and an upper layer or region that is above the oil layer and boundary 383 and is located axially between the boundary 383 and the upper seal head 392. When the piston valve 394 is actuated and its valve is open, fluid communication between the liquid layer within chamber 382 and the liquid within the lower chamber 381 is established.

In these illustrated examples, if, while the piston valve 394 is closed and the spring cartridge assembly is considered to be locked, inner tube 310 is urged towards its retracted position with a force that less than degassing Force $F_D$ (as described herein), inner tube 310 will remain axially fixed with outer tube 320. This can help facilitate the desired rider experience and the desired feeling of solidity and stability of the dropper post. However, when the force urging the inner tube 310 toward its retracted position exceeds the degassing force $F_D$ (and any associated losses, friction forces and the like), dissolved air is pulled out of solution within lower chamber 381. Small air bubbles 385 may form in lower chamber 381 and this can allow a relatively small amount of relative axial movement of the inner tube 310 relative to the piston valve 394, described as the overload cushion distance herein and that may be at least, and optionally can be between about 1 mm and 40 mm or between 10 mm and about 30 mm, and can between about 0% and about 20% of the travel length of the post inner tube 310. This axial movement therefore acts as a cushion if a rider overloads the post, such as while when riding or during a crash. Once the force urging inner tube 310 toward the retracted position drops back below the degassing force $F_D$, the air bubbles 385 can go back into solution and the inner tube 310 returns to its original height.

It is possible however, in some situations, that the air bubbles 385 may not all return to solution or that additional air bubbles may collect in the lower chamber 381 over time. For example, a leak in the system could allow air to enter the lower chamber 381 or operating the spring cartridge assembly 300 in sideways or inverted orientations may allow gas from the upper chamber 382 to enter the lower chamber 381 when the valve 394 is open. Gas may also be introduced into the lower chamber 381 during maintenance or other analogous activities. While a relatively small amount of gas bubbles 385 may provide some desirable cushioning effects, having too much gas (i.e., too many bubbles 385) in the lower chamber 381 may affect the stiffness or feel of the dropper post assembly in an undesirable manner.

In the examples illustrated herein, configuring the dropper post assembly 300 with the combined gas and air chamber as the upper chamber 382, and the lower chamber 381 as the lower chamber when the post assembly 300 is in its normal orientation (e.g., when the bicycle is upright and rolling on its wheels) can also enable the spring cartridge assembly 300 to be generally self-purging/correcting or self-bleeding. That is, as shown in FIGS. 41, when the valve 394 is closed the gas bubbles 385 are trapped in the lower chamber 381. However, when the valve 394 is opened (FIG. 43), such as when the dropper post assembly 300 is in normal use, the flow paths are open and the gas bubbles 385 will tend to travel upwardly, through the valve 394 from the lower chamber 381 to the upper chamber 382 due to their relative buoyancy as compared to the liquid, and/or if they are entrained with portions of the liquid that is also travelling thorough the valve 394. The gas bubbles 385 that reach the upper chamber 382 can then continue floating upwardly and collect in the lay of gas that is above the interface 383. In this arrangement, each time the dropper post assembly 100, 200 or 300 is triggered (e.g. when their respective cartridges 160, 260 and 360 are unlocked) gas bubbles 385 that were trapped in the lower chamber 381 can migrate to the upper chamber 382, thereby automatically resetting the balance of gas and liquid within the cartridges 160, 260 and 360, and self-bleeding the gas bubbles out of the lower, liquid-only chamber into the upper, mixed gas and liquid chamber where the presence of gas will not alter the intended performance of the cartridge assembly. That is, in the illustrated example the first chamber 381 contains, and is intended to contain, substantially only a liquid and the second chamber 382 contains, and is intended to contain, a mixture of a liquid and a gas. In this arrangement, when the dropper post assembly is oriented so that the second chamber 382 is above the first chamber 381 (as shown) the spring cartridge assembly operates as a self-bleeding cartridge, in which when the valve 391 is in its open position gas contained in the first chamber 381 (if any) escapes through the valve 391 and is collected in the second chamber 382. Configuring the dropper post assembly 300 may help the spring cartridge assembly 360 automatically bleed/purge gas bubbles from the lower chamber 381 into the upper chamber 382 each time the spring cartridge assembly is triggered and the piston valve 394 is opened. This self-bleeding configuration can help reduce the accumulation of gas within the lower chamber 381 (that may be intended to contain primarily only liquid in some arrangements) while the dropper post assembly 300 is in use and may reduce and/or eliminate the need for the spring cartridge assembly to be opened or accessed by a service technician for repair or servicing.

In the illustrated examples of dropper post assembly 300, the wherein the spring cartridge 360 is configured as a generally sealed, independent locking spring cartridge in which the cartridge outer tube 361 is separate from the walls of the post inner tube 310. In this arrangement, the spring cartridge assembly 360 is insertable and removable from within the post inner tube 310 in its charged/pressurized configuration and is operable independently of the inner tube 310 so that when the spring cartridge assembly 360 is axially removable via the lower end 312 of the inner tube 310 (for example, when the second engagement member is disengaged from the tube engagement member), the spring cartridge assembly biasing mechanism remains operable and does not need to be opened, discharged or otherwise modified. This may help simplify assembly and maintenance of the seat post assembly 300.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent, or patent application was specifically and individually indicated to be incorporated by reference in its entirety.

I claim:

1. A dropper post assembly for supporting a bicycle seat, the dropper post assembly comprising:
    a) an outer tube extending axially along a post axis between a lower end and an upper end;
    b) an inner tube extending axially between
        i. an upper end that is connectable to a bicycle seat; and
        ii. a lower end that is disposed within the outer tube and comprises a tube engagement member that is integrally formed on an inner surface of the inner tube, the inner tube being axially movable relative to the outer tube between an extended position and a retracted position;
    c) a spring cartridge assembly configurable in an unlocked configuration in which the spring cartridge assembly biases the inner tube toward its extended position and a locked configuration, the spring cartridge assembly comprising:
        i. a cartridge tube providing a cylinder and being disposed within and movable with the inner tube, the cartridge tube extending between an upper end disposed at the upper end of the inner tube and a lower end that is disposed at the lower end of the inner tube;
        ii. a lower seal assembly disposed at a lower end of the cartridge tube and sealing a lower end of the cylinder;
        iii. a piston movably received within the cylinder to provide a first chamber defined between the piston and the lower seal assembly and disposed on a lower side of the piston, and a second chamber between the piston and an upper end of the cylinder and disposed on an opposing, upper side of the piston, whereby moving the inner tube toward the retracted position expands the first chamber, the piston including a valve that is configurable in an open position in which fluid communication is established between the first chamber and second chamber and the spring cartridge assembly is in the unlocked configuration, and a closed position in which the first chamber is fluidly isolated from the second chamber and the spring cartridge assembly is in the locked configuration, and when the dropper post assembly is oriented so that the second chamber is above the first chamber the spring cartridge assembly operates as a self-bleeding cartridge, in which when the valve is in its open position gas contained in the first chamber escapes through the valve and is collected in the second chamber;
        iv. a cartridge rod extending axially through the lower seal assembly between an inner end engaging the piston and an outer lower end at the lower end the outer tube; and
        v. a fastening member that is removably insertable in the lower end of the inner tube, the fastening member comprising a second engagement member configured to releasably engage the tube engagement member so that when the fastening member is inserted so that the second engagement member engages the tube engagement member the cartridge tube is compressed axially between the abutment surface and the upper end of the inner tube so that the cartridge tube is axially fixed relative to the inner tube and movable with the inner tube relative to the outer tube;
    d) an actuator having a body disposed adjacent the outer end of the cartridge rod and being operable to actuate the valve to change the spring cartridge assembly between the locked configuration and the unlocked configuration,
    wherein the inner tube comprises an upper captive portion at its upper end having a first internal diameter that is substantially the same as an outer diameter of the cartridge tube so that the upper end of the cartridge tube is closely/snugly received in the upper captive portion but remains axially removable and lateral movement between the cartridge tube and the inner tube is inhibited.

2. The dropper post assembly of claim 1, wherein the tube engagement member comprises threads formed in the inner surface of the inner tube.

3. The dropper post assembly of claim 1, wherein the upper end of the cartridge tube does not include a fastening mechanism engaging the inner tube in a manner that restrains axial movement of the cartridge relative to the inner tube.

4. The dropper post assembly of claim 1, wherein an axially upper most portion of the spring cartridge is disposed within the inner tube and does not extend axially beyond the upper end of the inner tube, whereby an entirety of the spring cartridge is disposed axially inboard of the upper end of the inner tube.

5. The dropper post assembly of claim 1, wherein the inner tube comprises an upper end wall that covers the upper end of the inner tube and the cartridge tube comprises an axially facing upper cap surface that opposes the upper end wall when the cartridge tube is disposed within the inner tube, wherein the upper cap surface and upper end wall are complimentary to each other and generally planar and the cartridge tube is located axially inboard of the upper end wall.

6. The dropper post assembly of claim 1, wherein when the spring cartridge is axially removable via the lower end of the inner tube after removing the fastening member and wherein the cylinder remains sealed and the spring cartridge assembly remains operable when the spring cartridge assembly is removed from the inner tube.

7. The dropper post assembly of claim 1, wherein the fastening member further comprises a captive sidewall extending axially from the abutment surface and cooperating with the abutment surface to at least partially define a tube recess sized to accommodate the lower end of the cartridge tube, wherein when the fastening member is inserted the captive sidewall is disposed laterally between the cartridge tube and the inner tube.

8. The dropper post assembly of claim 7, wherein the captive sidewall surrounds the tube recess and defines a recess diameter that is substantially the same as an outer diameter of the cartridge tube so that the and lateral movement of the lower end of the cartridge tube relative to the fastening member and the lower end of the inner tube is inhibited cartridge tube is closely/snugly in the tube recess so that when the fastening member is inserted lateral movement between the lower end of the cartridge tube and the lower end of the inner tube is inhibited.

9. The dropper post assembly of claim 1, wherein the second engagement member is disposed toward a lower end of the fastening member and the abutment surface is disposed toward an opposing, upper end of the fastening member.

10. The dropper post assembly of claim 1, wherein an inner surface of the lower end of the fastening member comprises a drive portion configured to be engaged by a corresponding driving tool used to secure the fastening member within the inner tube.

11. The dropper post assembly of claim 1, wherein when the fastening member is inserted it is at least partially axially nested within the inner tube.

12. The dropper post assembly of claim 1, wherein when the fastening member is inserted it is entirely axially nested within the inner tube.

13. The dropper post assembly of claim 1, further comprising an openable seat clamp assembly connected to the upper end of the inner tube and configured to releasably retain a bicycle seat, and wherein the fastening member is insertable and removable from the inner tube independently from opening the seat clamp assembly, whereby the second engagement member is disengagable from the tube engagement member without opening the seat clamp assembly.

14. The dropper post assembly of claim 1, wherein the inner tube further comprises a clearance portion axially inboard from the upper captive portion and having a second internal diameter that is greater than the first internal diameter and the outer diameter of the cartridge tube, whereby an annular gap is formed within the clearance portion between an outer surface of the cartridge tube and an opposing inner surface of the inner tube.

15. The dropper post assembly of claim 14, further comprising a bumper having a length in the axial direction that is less than 20% of an axial length of the cartridge tube and being positioned laterally between the cartridge tube and the inner tube within the annular gap thereby inhibiting lateral movement of the cartridge tube relative to the inner tube.

16. The dropper post assembly of claim 15, wherein the lower end of the inner tube further comprises an engagement region that includes the tube engagement member and has a third internal diameter that is greater than the second internal diameter.

17. The dropper post assembly of claim 16, wherein the inner diameter of the inner tube increases from its upper end to its lower end.

18. The dropper post assembly of claim 1, wherein when the dropper post assembly is in use and oriented with the second chamber above the first chamber the first chamber contains substantially only a liquid and the second chamber contains a mixture of a liquid and a gas.

19. A dropper post assembly for supporting a bicycle seat, the dropper post assembly comprising:
  a) an outer tube extending axially along a post axis between a lower end and an upper end;
  b) an inner tube extending axially between
    i. an upper end that is connectable to a bicycle seat; and
    ii. a lower end that is disposed within the outer tube and comprises a tube engagement member that is integrally formed on an inner surface of the inner tube, the inner tube being axially movable relative to the outer tube between an extended position and a retracted position;
  c) a spring cartridge assembly configurable in an unlocked configuration in which the spring cartridge assembly biases the inner tube toward its extended position and a locked configuration, the spring cartridge assembly comprising:
    i. a cartridge tube providing a cylinder and being disposed within and movable with the inner tube, the cartridge tube extending between an upper end disposed at the upper end of the inner tube and a lower end that is disposed at the lower end of the inner tube;
    ii. a lower seal assembly disposed at a lower end of the cartridge tube and sealing a lower end of the cylinder;
    iii. a piston movably received within the cylinder to provide a first chamber defined between the piston and the lower seal assembly and disposed on a lower side of the piston, and a second chamber between the piston and an upper end of the cylinder and disposed on an opposing, upper side of the piston, whereby moving the inner tube toward the retracted position expands the first chamber, the piston including a valve that is configurable in an open position in which fluid communication is established between the first chamber and second chamber and the spring cartridge assembly is in the unlocked configuration, and a closed position in which the first chamber is fluidly isolated from the second chamber and the spring cartridge assembly is in the locked configuration, and when the dropper post assembly is oriented so that the second chamber is above the first chamber the spring cartridge assembly operates as a self-bleeding cartridge, in which when the valve is in its open position gas contained in the first chamber escapes through the valve and is collected in the second chamber;
  iv. a cartridge rod extending axially through the lower seal assembly between an inner end engaging the piston and an outer lower end at the lower end the outer tube; and
  v. a fastening member that is removably insertable in the lower end of the inner tube, the fastening member comprising a second engagement member configured to releasably engage the tube engagement member so that when the fastening member is inserted so that the second engagement member engages the tube engagement member the cartridge tube is compressed axially between the abutment surface and the upper end of the inner tube so that the cartridge tube is axially fixed relative to the inner tube and movable with the inner tube relative to the outer tube;
d) an actuator having a body disposed adjacent the outer end of the cartridge rod and being operable to actuate the valve to change the spring cartridge assembly between the locked configuration and the unlocked configuration,
wherein the inner tube comprises an upper end wall that covers the upper end of the inner tube and the cartridge tube comprises an axially facing upper cap surface that opposes the upper end wall when the cartridge tube is disposed within the inner tube, wherein the upper cap surface and upper end wall are complimentary to each other and generally planar and the cartridge tube is located axially inboard of the upper end wall.

20. The dropper post assembly of claim 19, wherein the tube engagement member comprises threads formed in the inner surface of the inner tube.

21. The dropper post assembly of claim 19, wherein the upper end of the cartridge tube does not include a fastening mechanism engaging the inner tube in a manner that restrains axial movement of the cartridge relative to the inner tube.

22. The dropper post assembly of claim 19, wherein an axially upper most portion of the spring cartridge is disposed within the inner tube and does not extend axially beyond the upper end of the inner tube, whereby an entirety of the spring cartridge is disposed axially inboard of the upper end of the inner tube.

23. The dropper post assembly of claim 19, wherein when the spring cartridge is axially removable via the lower end of the inner tube after removing the fastening member and wherein the cylinder remains sealed and the spring cartridge assembly remains operable when the spring cartridge assembly is removed from the inner tube.

24. The dropper post assembly of claim 19, wherein the fastening member further comprises a captive sidewall extending axially from the abutment surface and cooperating with the abutment surface to at least partially define a tube recess sized to accommodate the lower end of the cartridge tube, wherein when the fastening member is inserted the captive sidewall is disposed laterally between the cartridge tube and the inner tube.

25. The dropper post assembly of claim 24, wherein the captive sidewall surrounds the tube recess and defines a recess diameter that is substantially the same as an outer diameter of the cartridge tube so that the and lateral movement of the lower end of the cartridge tube relative to the fastening member and the lower end of the inner tube is inhibited cartridge tube is closely/snugly in the tube recess so that when the fastening member is inserted lateral movement between the lower end of the cartridge tube and the lower end of the inner tube is inhibited.

26. The dropper post assembly of claim 19, wherein the second engagement member is disposed toward a lower end of the fastening member and the abutment surface is disposed toward an opposing, upper end of the fastening member.

27. The dropper post assembly of claim 19, wherein an inner surface of the lower end of the fastening member comprises a drive portion configured to be engaged by a corresponding driving tool used to secure the fastening member within the inner tube.

28. The dropper post assembly of claim 19, wherein when the fastening member is inserted it is at least partially axially nested within the inner tube.

29. The dropper post assembly of claim 19, further comprising an openable seat clamp assembly connected to the upper end of the inner tube and configured to releasably retain a bicycle seat, and wherein the fastening member is insertable and removable from the inner tube independently from opening the seat clamp assembly, whereby the second engagement member is disengagable from the tube engagement member without opening the seat clamp assembly.

30. A dropper post assembly for supporting a bicycle seat, the dropper post assembly comprising:
  a) an outer tube extending axially along a post axis between a lower end and an upper end;
  b) an inner tube extending axially between
    i. an upper end that is connectable to a bicycle seat; and
    ii. a lower end that is disposed within the outer tube and comprises a tube engagement member that is integrally formed on an inner surface of the inner tube, the inner tube being axially movable relative to the outer tube between an extended position and a retracted position;
  c) a spring cartridge assembly configurable in an unlocked configuration in which the spring cartridge assembly biases the inner tube toward its extended position and a locked configuration, the spring cartridge assembly comprising:
    i. a cartridge tube providing a cylinder and being disposed within and movable with the inner tube, the cartridge tube extending between an upper end disposed at the upper end of the inner tube and a lower end that is disposed at the lower end of the inner tube;
    ii. a lower seal assembly disposed at a lower end of the cartridge tube and sealing a lower end of the cylinder;
    iii. a piston movably received within the cylinder to provide a first chamber defined between the piston and the lower seal assembly and disposed on a lower side of the piston, and a second chamber between the piston and an upper end of the cylinder and disposed on an opposing, upper side of the piston, whereby moving the inner tube toward the retracted position expands the first chamber, the piston including a valve that is configurable in an open position in which fluid communication is established between the first chamber and second chamber and the spring cartridge assembly is in the unlocked configuration, and a closed position in which the first chamber is fluidly isolated from the second chamber and the spring cartridge assembly is in the locked configuration, and when the dropper post assembly is oriented so that the second chamber is above the first chamber the spring cartridge assembly operates as a self-bleeding cartridge, in which when the valve is in its open position gas contained in the first chamber escapes through the valve and is collected in the second chamber;

iv. a cartridge rod extending axially through the lower seal assembly between an inner end engaging the piston and an outer lower end at the lower end the outer tube; and v. a fastening member that is removably insertable in the lower end of the inner tube, the fastening member comprising a second engagement member configured to releasably engage the tube engagement member so that when the fastening member is inserted so that the second engagement member engages the tube engagement member the cartridge tube is compressed axially between the abutment surface and the upper end of the inner tube so that the cartridge tube is axially fixed relative to the inner tube and movable with the inner tube relative to the outer tube;

d) an actuator having a body disposed adjacent the outer end of the cartridge rod and being operable to actuate the valve to change the spring cartridge assembly between the locked configuration and the unlocked configuration, wherein the fastening member further comprises a captive sidewall extending axially from the abutment surface and cooperating with the abutment surface to at least partially define a tube recess sized to accommodate the lower end of the cartridge tube, wherein when the fastening member is inserted the captive sidewall is disposed laterally between the cartridge tube and the inner tube.

31. The dropper post assembly of claim 30, wherein the tube engagement member comprises threads formed in the inner surface of the inner tube.

32. The dropper post assembly of claim 30, wherein the upper end of the cartridge tube does not include a fastening mechanism engaging the inner tube in a manner that restrains axial movement of the cartridge relative to the inner tube, and wherein an axially upper most portion of the spring cartridge is disposed within the inner tube and does not extend axially beyond the upper end of the inner tube, whereby an entirety of the spring cartridge is disposed axially inboard of the upper end of the inner tube.

33. The dropper post assembly of claim 30, wherein when the spring cartridge is axially removable via the lower end of the inner tube after removing the fastening member and wherein the cylinder remains sealed and the spring cartridge assembly remains operable when the spring cartridge assembly is removed from the inner tube.

34. The dropper post assembly of claim 30, wherein the captive sidewall surrounds the tube recess and defines a recess diameter that is substantially the same as an outer diameter of the cartridge tube so that the and lateral movement of the lower end of the cartridge tube relative to the fastening member and the lower end of the inner tube is inhibited cartridge tube is closely/snugly in the tube recess so that when the fastening member is inserted lateral movement between the lower end of the cartridge tube and the lower end of the inner tube is inhibited.

35. The dropper post assembly of claim 30, wherein the second engagement member is disposed toward a lower end of the fastening member and the abutment surface is disposed toward an opposing, upper end of the fastening member.

36. The dropper post assembly of claim 30, wherein an inner surface of the lower end of the fastening member comprises a drive portion configured to be engaged by a corresponding driving tool used to secure the fastening member within the inner tube.

37. The dropper post assembly of claim 30, wherein when the fastening member is inserted it is at least partially axially nested within the inner tube.

38. The dropper post assembly of claim 30, further comprising an openable seat clamp assembly connected to the upper end of the inner tube and configured to releasably retain a bicycle seat, and wherein the fastening member is insertable and removable from the inner tube independently from opening the seat clamp assembly, whereby the second engagement member is disengagable from the tube engagement member without opening the seat clamp assembly.

* * * * *